US011681364B1

(12) United States Patent
Zhang et al.

(10) Patent No.: US 11,681,364 B1
(45) Date of Patent: Jun. 20, 2023

(54) GAZE PREDICTION

(71) Applicant: Amazon Technologies, Inc., Seattle, WA (US)

(72) Inventors: Xu Zhang, Cambridge, MA (US); Yue Wu, Torrance, CA (US); Varsha Hedau, Sunnyvale, CA (US); Shih-Fu Chang, New York, NY (US); Pradeep Natarajan, Chicago, IL (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/361,939

(22) Filed: Jun. 29, 2021

(51) Int. Cl.
| | |
|---|---|
| *G06F 3/01* | (2006.01) |
| *G06T 7/73* | (2017.01) |
| *G06N 3/049* | (2023.01) |
| *G06F 40/40* | (2020.01) |
| *G06V 40/18* | (2022.01) |
| *G06V 40/16* | (2022.01) |

(52) U.S. Cl.
CPC .............. *G06F 3/013* (2013.01); *G06F 40/40* (2020.01); *G06N 3/049* (2013.01); *G06T 7/74* (2017.01); *G06V 40/171* (2022.01); *G06V 40/18* (2022.01)

(58) Field of Classification Search
CPC ........ G06F 3/013; G06F 40/40; G06F 40/171; G06F 40/18; G06T 7/74; G06N 3/049
See application file for complete search history.

(56) References Cited

U.S. PATENT DOCUMENTS

| | | | |
|---|---|---|---|
| 2013/0304479 A1* | 11/2013 | Teller ..................... | G06F 3/167 |
| | | | 704/E21.001 |
| 2016/0091967 A1* | 3/2016 | Prokofieva ............. | G06F 3/013 |
| | | | 345/156 |
| 2016/0098393 A1* | 4/2016 | Hebert ................ | G06F 16/3344 |
| | | | 704/9 |
| 2017/0277268 A1* | 9/2017 | Ono ....................... | G06V 40/23 |
| 2018/0144248 A1* | 5/2018 | Lu ......................... | G06K 9/6277 |
| 2019/0141181 A1* | 5/2019 | Wantland ............... | G06F 3/013 |

FOREIGN PATENT DOCUMENTS

WO    WO-2019130992 A1 *    7/2019    ............. G06F 3/013

\* cited by examiner

*Primary Examiner* — Stephen G Sherman
(74) *Attorney, Agent, or Firm* — Pierce Atwood LLP

(57) ABSTRACT

An image processing system may receive image data from a camera of a user device and perform gaze prediction processing of the image data to predict one or more gaze patterns. The gaze prediction processing may include processing the image data using a neural network to detect faces and/or objects and generate an image feature map. The gaze prediction processing may include performing gaze direction prediction operations using the feature map and detected faces and/or objects to determine gaze direction probability data. The gaze prediction processing may include predicting a gaze pattern based on the gaze direction probability data and the image feature map. The gaze pattern may be short-term (e.g., atomic-level) or long-term (e.g., event-level).

22 Claims, 16 Drawing Sheets

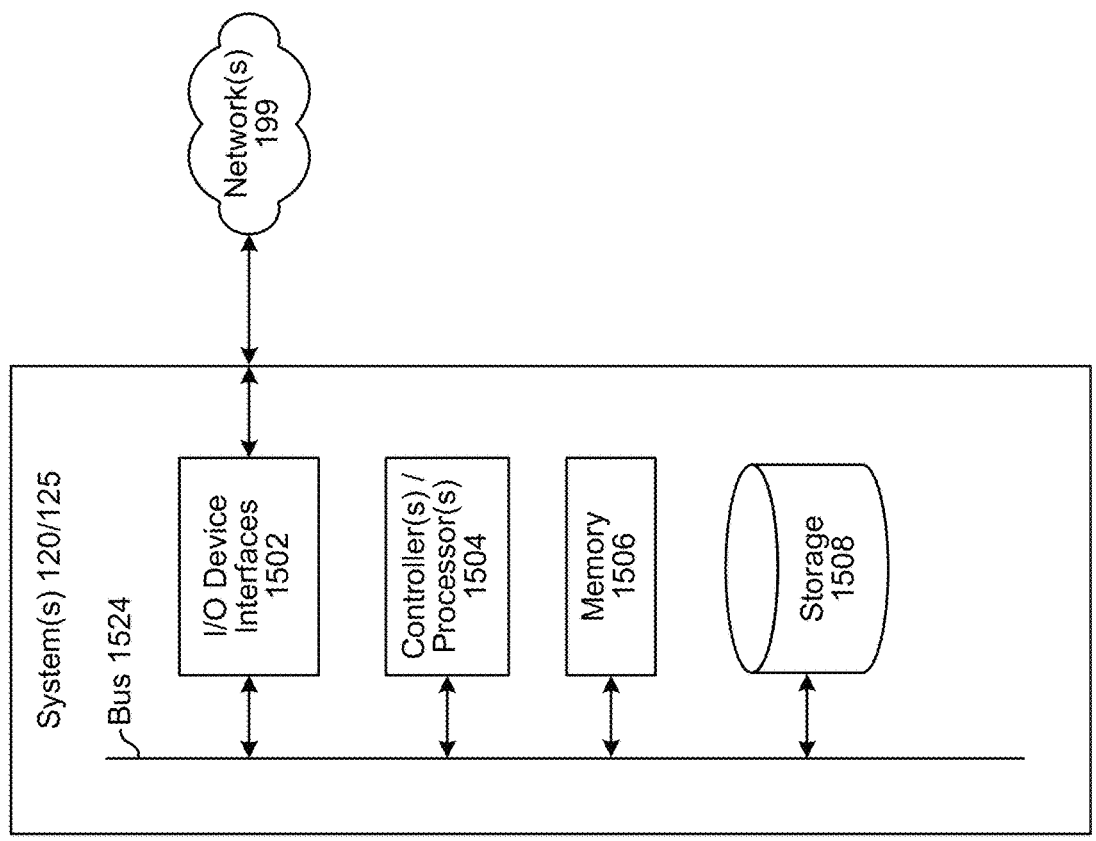

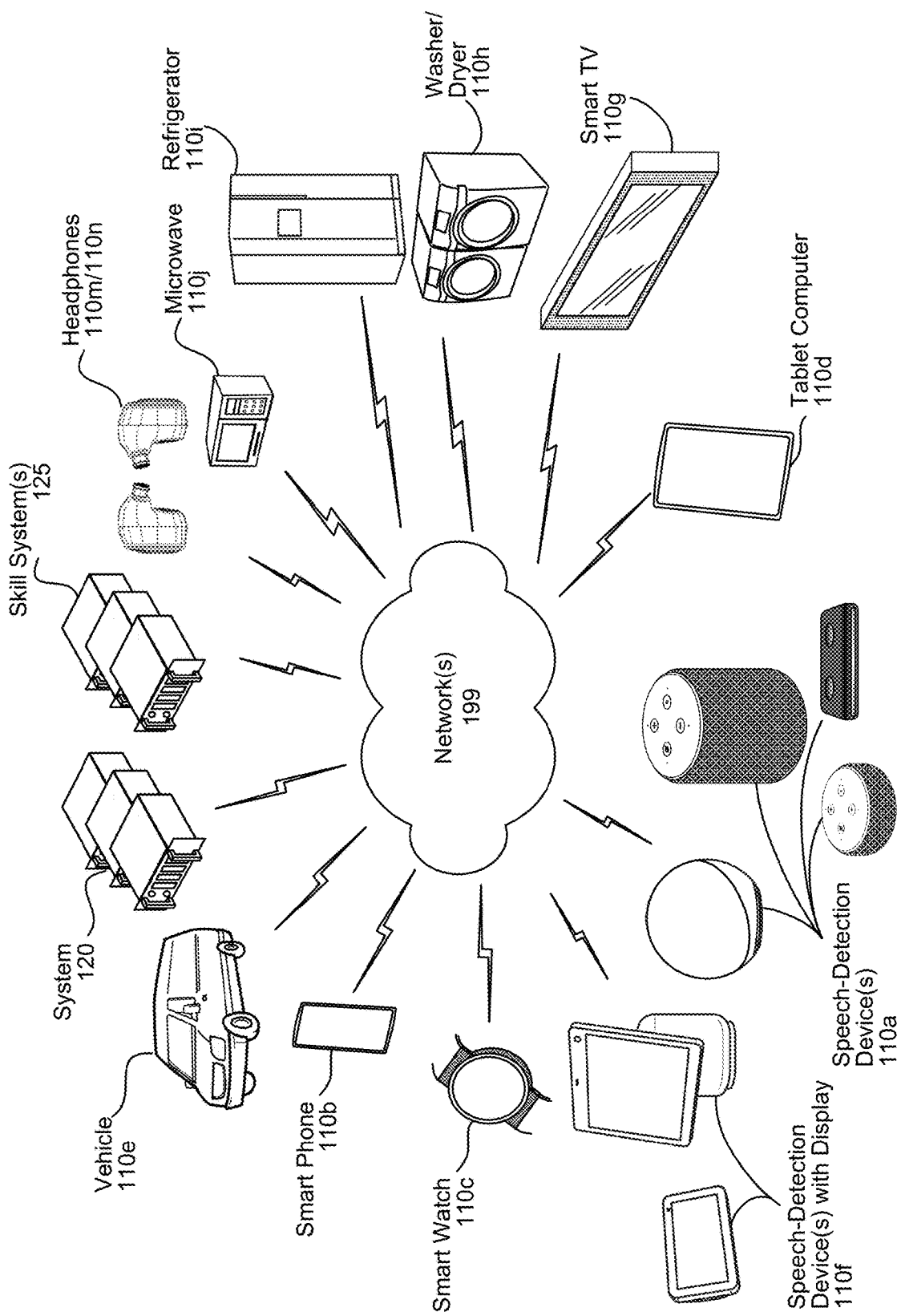

GAZE PREDICTION

BACKGROUND

Digital image processing can be used to analyze and/or alter image data. Digital image processing may include object recognition, in which a computer can detect and classify entities such as objects and people that appear in the image data. Feature data related to a detected entity and extracted from the image data may be further processed to measure or predict information about the entity such as physical dimensions, orientation, and/or position. An example application of digital image processing is predicting a gaze direction of a face present in the image data.

BRIEF DESCRIPTION OF DRAWINGS

For a more complete understanding of the present disclosure, reference is now made to the following description taken in conjunction with the accompanying drawings.

FIG. 15 is a block diagram conceptually illustrating example components of a system, according to embodiments of the present disclosure.

FIG. 16 illustrates an example of a computer network for use with the overall system, according to embodiments of the present disclosure.

DETAILED DESCRIPTION

Figure 1:
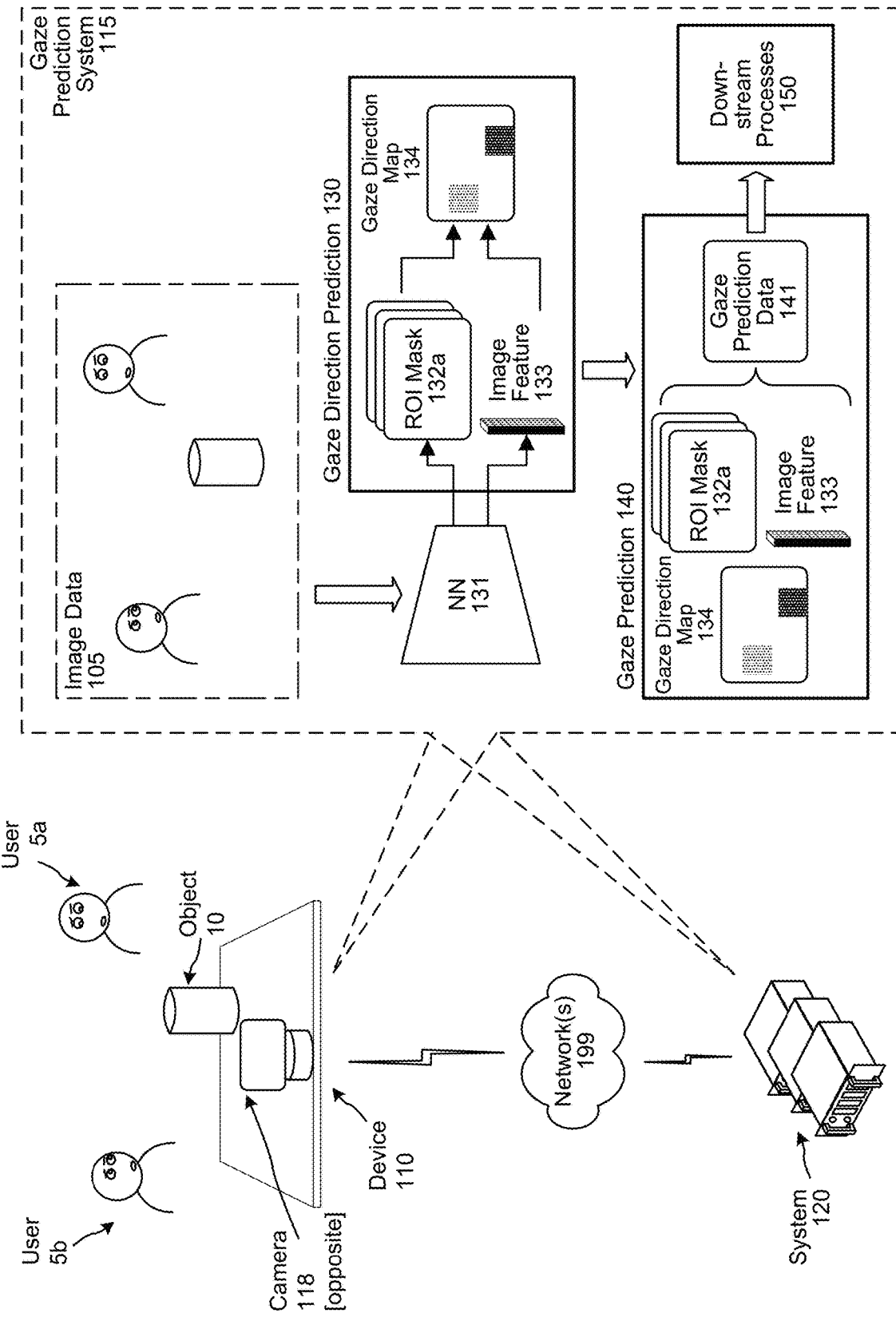
FIG. 1 is a conceptual diagram illustrating example operations of a human gaze prediction system, according to embodiments of the present disclosure.

A user interface system may combine image processing and language processing capabilities to perform tasks for and/or on behalf of a user. For example, the user interface system may, based on captured images, predict whether the user is looking at the device, and may handle received voice, text, or other type input differently depending on whether or not the user is looking at the device. The user interface system may further recognize other people and/or objects within its field of view, and use this information to predict, for example, whether the user's natural language input references a particular person/object within the field of view. The user interface system can, based on a user's gaze (e.g., where the user is looking), determine whether an utterance is directed toward the device/system or directed somewhere else (e.g., is part of a personal conversation, directed to a different device/system, etc.) that the system should disregard. The user interface system may also use information about a recognized object and the user's gaze towards the object to resolve an entity represented referentially, such as by using exophora, cataphora, or anaphora (e.g., saying "it," "this," or "that").

The user interface system may be able to predict user gaze patterns. A gaze pattern may represent a user's gaze behavior at a point in time, or over a period of time, which may convey information regarding the directedness related to the user's other contemporaneous or near-contemporaneous actions (e.g., speech, typing, physical movements, etc.). For example, a user's gaze behavior may indicate attention towards a person or an object, or an attempt to attract a person's attention to the user or to an object. Gaze behavior information may help a system understand or otherwise determine what the user is looking at, and how the user feels, or what the user is referring to. A user interface system, such as a multi-modal user interface system that processes both speech and human gaze behavior may perform better when interacting with multiple users, who may also be interacting with each other.

Gaze behaviors may be represented by, or categorized into, gaze patterns. The user interface system may include one or more models trained to recognize various gaze patterns, and predict whether a person's gaze behavior as exhibited in image data corresponds to one of the learned gaze patterns. Gaze patterns may be categorized based on duration. "Atomic-level gaze patterns" may be brief in duration (e.g., lasting one or several image frames up to several seconds). Some atomic-level gaze patterns may include:

Single: individual gaze behavior (e.g., directed toward the device or a person/object)

Mutual: two people look into eyes of each other

Avert: one person shifts away the gaze from another person's gaze

Refer: one person introduces one target for another person using gaze

Follow: one person accepts the gaze of another person and looking at the target referred by that person Share: two people are looking at the same target "Event-level gaze patterns" may be longer in duration (e.g., longer than a second or several seconds), and may include one atomic-level gaze patterns followed by another. Some event-level gaze patterns may include:

Non-communicative: Single gaze held for a period of time
Mutual Gaze: Mutual gaze held for a period of time
Gaze Aversion: starts with Mutual, follows by Avert, and finally Single
Gaze Following: Follow and Share without Mutual
Joint Attention: Starts with Mutual, then Refer, Follow and Share, and ends with Mutual again to confirm the Share event.

Understanding gaze behaviors presents several challenges over, for example, determining the gaze direction of a single user. For example, a gaze behavior may include multiple people, where predicting one or more gaze patterns may involve processing image data including more than one face, where the number of faces detected in the image data may change over time. Furthermore, an image may include multiple groups of people exhibiting independent gaze behaviors. Moreover, gaze behaviors may include long-term dependencies; for example, where the gaze direction of one or more people changes over time.

This disclosure proposes using an attention-based network to predict gaze patterns for faces in images. An image may be passed through the network to determine binary region of interest (ROI) masks to separate features corresponding to different entities (people and/or objects). The network can predict a person of interest (POI) gaze direction probability map representing a predicted likelihood that the POI's gaze is directed towards different entities in the image data. The network may use the gaze direction probability map to weight the features corresponding to each physical entity. In the context of gaze patterns, "physical entity" may refer to a face (e.g., other than the POI) or object detected in the image data; such as a car, book, building, animal, etc. The system may use the gaze direction probability map to predict whether the POI is exhibiting a gaze pattern with respect to one or more entities; for example, some gaze patterns involve the POI's gaze moving from a first physical entity to a second physical entity. The system may analyze time dependencies to predict event-level gaze patterns based on, for example, successive atomic-level gaze patterns. The system may thus address human gaze pattern prediction as a structured classification problem. An advantage of the proposed system is that a neural network or other type of component may be configured to leverage ROI masks to extract features of individual entities that may be represented in the feature map, without having to process the image data for each physical entity represented in the image data. The system can further leverage the gaze pattern information to improve other processes such as speech processing in a multi-user environment.

The user interface system may combine the gaze prediction system with various speech processing systems and other services in order to perform tasks on behalf of a user. The user may interact with the user interface system using natural language inputs such as speech, text, sign language, etc. The assistant may process natural language inputs and/or respond with natural language outputs by leveraging different computerized voice-enabled technologies. For example, when speech is used, automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Text-to-speech (TTS) is a field of computer science concerning transforming textual and/or other data into audio data that is synthesized to resemble human speech. ASR, NLU, and TTS may be used together as part of a speech user interface system. The assistant can leverage the speech user interface system as well as additional applications, skills, or systems to perform tasks for and/or on behalf of the user.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 is a conceptual diagram illustrating example operations of a gaze prediction system 115, according to embodiments of the present disclosure. The system 115 may process data received from a user device 110, including image data 105 acquired by a camera 118 of the device 110. In FIG. 1, the camera 118 is facing users 5a and 5b and thus is opposite the rear of the device 110 as shown. The camera 118 may have visibility over a region near the device 110. In the example shown in FIG. 1, the camera 118 may capture a scene including a first user 5a, a second user 5b (collectively "users 5"), and an object 10. The device 110 may send the image data 105 representing the scene to the system 115. The system 115 may reside on the device 110, a remote system 120, or have components and/or software split between the device 110 and the system 120. The device 110 may transmit data to and receive data from the system 120 via a computer network 199. The system 115 may process the image data 105 to predict gaze patterns; e.g., between the users 5. Resulting gaze prediction data 141 may be sent to one or more downstream processes 150 for use in performing actions for on behalf of one or more users 5. Downstream processes 150 can include one or more of NLU, entity resolution, a skill, the same or a different device, and/or additional gaze pattern prediction processes (e.g., using atomic-level gaze pattern prediction data to determine event-level gaze pattern prediction data).

The system 115 may process the image data 105 in two stages: gaze direction prediction 130 and gaze pattern prediction 140. Although the stages are conceptually illustrated separately, the stages may share hardware and/or software including one or more processors and one or more memory components or regions of physical memory. The system 115 may process the image data 105 through a neural network (NN) 131 to generate an image feature map 133. The NN 131 may be, for example, a convolutional neural network (CNN), transformer, conformer, or other network architecture capable of detecting objects in image data. The image features may be high-level features such as edges, corners, curves, horizontal or vertical lines, etc. The features may include lower-level features including tangible objects such as books, cars, animals, etc. Intermediate level features may include, for example, textures, patterns, and/or parts, etc. The image feature map 133 may be a data structure that correlates feature data with positional data; e.g., as a feature vector corresponding to each pixel of the image data, or feature vectors corresponding to groups of pixels of the image data.

The NN 131 may also generate a plurality of region of ROI masks 132a, 132b, 132c, etc. (collectively "ROI masks 132"). The NN 131 may generate the ROI masks 132 by detecting entities (e.g., faces or other objects) in image data 105, and determining a bounding box around each detected physical entity as represented in the image feature map 133. The ROI mask 132 may indicate a region within a bounding box that corresponds to the physical entity; for example, a region that corresponds to a face or an object. For example, an ROI mask 132 may be a data array such as a bit map with a depth of 1, where values in a region bounded by a bounding box may have a value of 1, and values outside of the bounding box may have a value of 0. Using an ROI mask 132, the system 115 can extract features of a physical entity from the image feature map 133 without processing the image data 105 through the NN 131 again.

The system 115 may select a person detected by the NN 131 as the POI. If the NN 131 detects a single person/face, the system 115 may select that person to be the POI. If the NN 131 detects two or more people, the system 115 may repeat gaze direction prediction 130 and gaze prediction 140 with each person selected as the POI for an iteration. For example, the system 115 may select a first person to be the POI for a first iteration, a second person to be the PIO for a second iteration, and so on. The NN 131 may determine a first ROI mask 132a corresponding to a bounding box bounding features corresponding to the POI. For example, the system 115 may select the user 5a as the POI; thus, the first ROI mask 132a may correspond to a bounding box for image features corresponding to the user 5a. (For a second iteration, the ROI mask 132a may correspond to a bounding box for image features corresponding to the user 5b, etc.) The NN 131 may determine a second ROI mask 132b corresponding to one or more bounding boxes corresponding to one or more people in the image data 105 other than the POI. In other words, the NN 131 may generate a first ROI mask 132a for the POI, and a second ROI mask 132b for all other people detected in the image data 105 other than the POI. People in the image data 105 other than the POI may simply be referred to as people. The NN 131 may generate a third ROI mask 132c for the object 10 detected in the image data 105. In some implementations, subsequent iterations of predicting POI gaze direction can be performed using the same ROI masks 132 and the image feature map 133, without reprocessing the image data 105 through the NN 131.

The NN 131 may generate the image feature map 133. The image feature map 133 may be a data structure having values arranged to correspond with locations in the image data 105 (e.g., where a certain portion in a first data structure corresponds to a region in an image and the same portion in a second data structure corresponds to the same region in a different image) and a channel depth related to a number of features detected by the NN 131. The features may correspond to classes of object such as face, book, car, house, etc. Thus, the image feature map 133 may include object recognition data that the system 120 can leverage, for example, during entity resolution, NLU hypotheses reranking, or elsewhere, for example as discussed in reference to operations of FIG. 13.

The NN 131 may include multiple neural networks, where each neural network may consist of one or more or many layers. A first neural network of the NN 131 may perform object detection. A second neural network of the NN 131 may extract features from the image data. Feature extraction may be performed using, for example, a ResNet50 architecture, as described in additional detail below with reference to FIG. 2. The NN 131 may use the object detection data and the extracted feature data to generate the image feature map 133 and/or the ROI masks 132.

Gaze direction prediction 130 may include processing the ROI masks 132 and the image feature map 133 to determine a gaze direction probability map 134. The gaze direction probability map 134 may represent a predicted probability that the POI is looking at a region corresponding to a particular physical entity. Each pixel in the gaze direction probability map 134 may indicate a likelihood that a user is looking at that pixel. For example, the gaze direction probability map 134 may have a first region 234a corresponding to a person indicating a predicted probability that the POI is looking at that person. The gaze direction probability map 134 may have a second region 234b corresponding to an object and indicating a predicted probability that the POI is looking at the object. The second region 234b may also correspond to the masked region in the object ROI 132c. In some cases, the POI's gaze may be directed to something outside of the image. In such a case, probability values in the gaze direction probability map 134 may be relatively low or close to zero, indicating a low likelihood that the POI is looking at a physical entity detected in the image. The gaze direction probability map 134 can be used in the gaze prediction 140 to generate gaze prediction data 141. Additional details and example implementations of the gaze direction prediction 130 are described below with reference to FIG. 2.

Gaze prediction 140 may include using the ROI masks 132, image feature data 133, and gaze direction probability map 134 to generate the gaze prediction data 141. In particular, the system may use the ROI masks 132 to extract features related to the POI, people, and object, respectively. The system 115 may apply a weighting to the extracted person and/or object features using the gaze direction probability map 134. The gaze prediction 140 may include performing respective pooling operations on the image feature map 133, the extracted POI features, the weighted extracted person features, and the weighted extracted object features to generate respective feature vectors. The gaze prediction 140 may combine these feature vectors—for example, by concatenating them—to determine a combined feature vector. The gaze prediction 140 may include performing additional processing on the combined feature vector, such as processing the combined feature vector using an LSTM, to determine the gaze prediction data 141. The system 115 may send the gaze prediction data 141 to downstream processes 150, such as NLU, entity resolution, reranking, or for use by a skill 1090. In some implementations, the gaze prediction data 141 may include an atomic-level gaze prediction 141a, for example, processing using separate time-dependent networks. Atomic-level gaze predictions may be referred to collectively as gaze prediction data 141. Additional details and example operations of the gaze prediction 140 are described below with reference to FIG. 3. In some cases, gaze direction prediction 130 and gaze prediction 140 may be repeated for other faces appearing in the image data 105 to generate additional gaze direction probability maps 134 and gaze prediction data 141; for example, to predict pairwise event-level gaze patterns that may involve two faces. Pairwise gaze pattern prediction is discussed in additional detail below with reference to FIG. 5.

Figure 2:
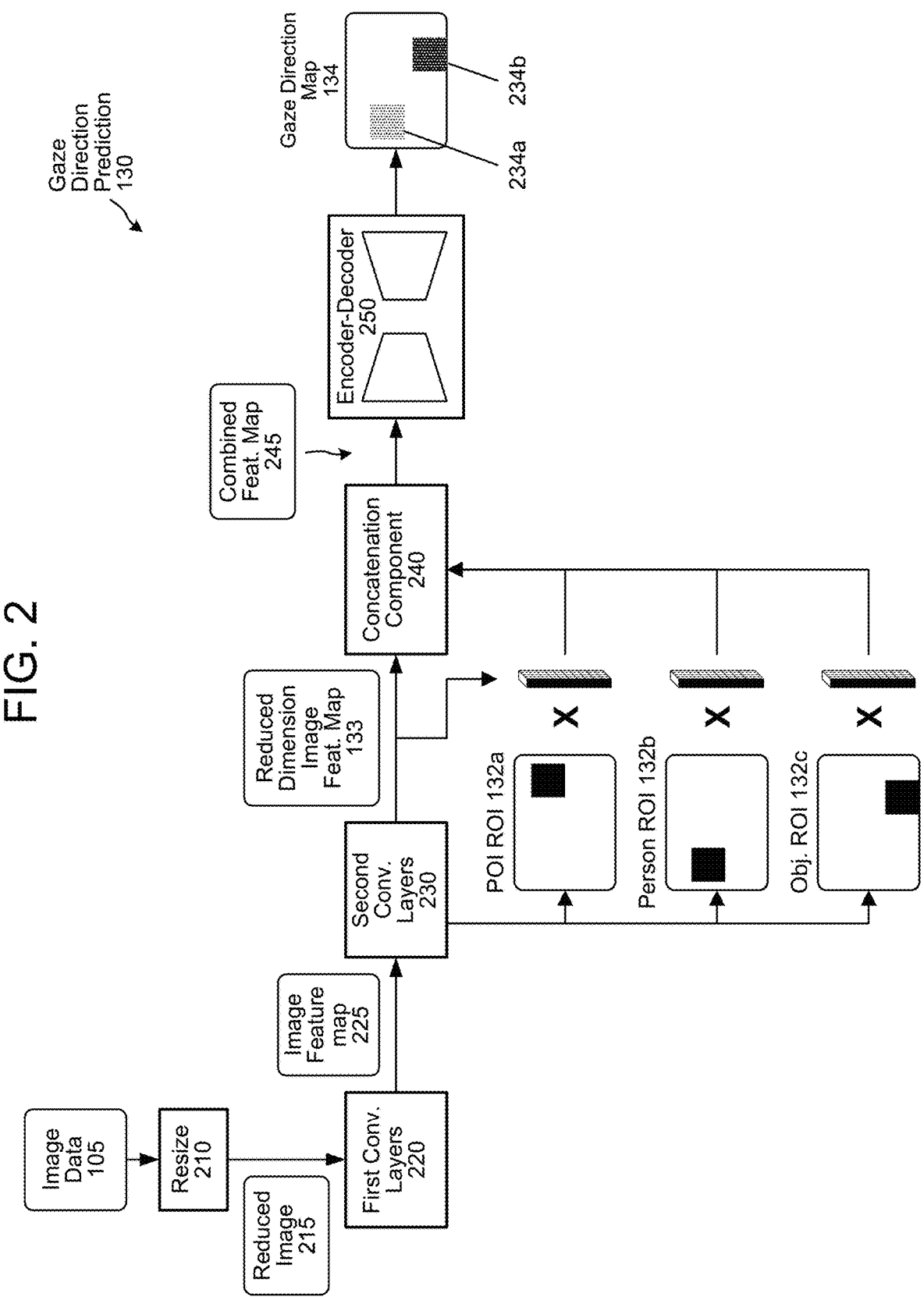
FIG. 2 illustrates example gaze direction prediction operations of the human gaze prediction system, according to embodiments of the present disclosure.

FIG. 2 illustrates example gaze direction prediction 130 operations of the gaze prediction system 115, according to embodiments of the present disclosure. In an example operation of gaze direction prediction 130, the system 115 may receive and resize the image data 105 using the image resizing component 210 to generate reduced resolution image data 215. Various device 110 cameras 118 may acquire images in different resolutions (HD, 4K, etc.) while the neural networks in the gaze direction prediction 130 and the gaze prediction stage may be configured to work with an image having a particular resolution in terms of w×h; for example, 640×360, 256×256, 224×224, etc.

The reduced resolution image data 215 may have a width w and a height h, and may be represented as $I \in \mathbb{R}^{w \times h}$. Gaze direction prediction 130 may include sending the image I to the backbone network f(•) (e.g., the NN 131) to generate an image feature map 225 of size w'×h' and with d channels (or dimensions), represented as $f(I) \in \mathbb{R}^{w' \times h' \times d}$. The NN 131 may include, for example, a ResNet50 neural network. The NN 131 may contain multiple layers, or groups of layers, including first convolution layers 220 and second convolution layers 230. The first convolution layers 220 may generate a multi-dimensional feature representing the image. The feature data may be in the form of an image feature map 225, which may have a width and height corresponding to the two dimensions of the reduced resolution image data 215, although possibly with a resolution less than that of the reduced resolution image data 215. For example, while the reduced resolution image data 215 may have a w×h of 224×224, the image feature map 225 may have a w'×h' of 7×7. The depth of the image feature map 225 may correspond to the dimensionality d of the image feature map 225. This dimensionality may be large; for example, hundreds or even thousands of dimensions. In some implementations, the image feature may have 2,048 dimensions. The second convolution layer 230 may include a 1×1 convolution layer to project the feature from, for example, a d of 2,048 dimensions to a d' of 256 dimensions. The resulting reduced dimension image feature map 133 (or simply "image feature map 133") may thus have a w'×h'×d' of 7×7×256.

In generating the image feature map 225 and the reduced dimension image feature map 133, the NN 131 may retain information regarding the position of classified entities. The position information may be used to, for example, determine bounding boxes for a detected physical entity, where the bounding box may be a square or rectangle indicating the image feature values corresponding to the detected entity. The position information may be used to generate entity ROI masks such as the POI ROI mask 132a, person ROI mask 132b, and/or the object ROI mask 132c. The ROI masks 132 may be data arrays or other data structure having a size w'×h' with elements having binary values, where values at positions within the bounding box corresponding to the entity are 1, and values outside the bounding box are 0. Specifically, for an entity having a bounding box of [left, top, right, bottom], where left, top, right, bottom are the left, top, right, and bottom coordinates of the bounding box respectively, a rectangle region with left-top corner of (left w×w', top h×h') and a right-bottom corner of (right w×w', bottom h×h') may have the value 1, and the remaining area will have the value 0. A feature for each person/object may be isolated by multiplying the image feature map 133 by the corresponding ROI mask 132 in an element-wise fashion such that feature values outside the bounding box are set to zero. When the image feature map 133 is multiplied by an ROI mask 132, the resulting entity feature may include features of the entity corresponding to the ROI mask 132, while the other features may be set to a value of 0. Thus, a POI feature may be a feature map with values set to zero for all features outside of the bounding box for the POI. A person feature may be a feature map with zero values set to zero for all features outside of the bounding box(es) for the person(s); and likewise for the object feature. The POI feature, the person feature, and the object feature may each have a dimensionality equal to the image feature map 133; which, in this example, may be 256. The feature map, the POI feature, the person feature, and the object feature may be combined using, for example, a concatenation component 240. The features may be combined to form a combined feature map 245 having the same w'×h' of the individual entity feature and a dimensionality equal to the sum of the dimensionalities of each feature; for example, 256 times 4, or 1,024.

The combined feature map 245 can be sent to an encoder-decoder network 250. An encoder-decoder network is a type of neural network that may perform semantic segmentation of an image. The encoder portion of the network may process the combined feature map 245 to generate a rich representation of a collection of feature vectors, but without some or much of the positional information. The decoder portion of the network may take the collection of feature vectors and up-sample them using position information from the combined feature map 245 to produce a segmented output that represents a semantic segmentation of the input. In this case, the encoder-decoder network 250 can be trained to produce a gaze direction probability map 134. The gaze direction probability map 134 can include segments corresponding to bounding boxes around entities; for example, the first region 234a corresponding to the person and the second region 234b corresponding to the object. Values corresponding to those segments can represent a probability that the POI is gazing in the direction of that physical entity. In the example shown in FIGS. 1 and 2, the gaze direction probability map 134 may reflect a higher probability (e.g., closer to 1) that the first user 5a has a gaze directed toward the object 10, relative to a lower probability (e.g., closer to 0) that the first use 5a has a gaze directed toward the person (e.g., the second user 5b).

In some implementations, the encoder-decoder network 250 may be a CNN-based encoder-decoder, where the encoder may consist of two layers of 3×3 convolution layer with a stride 2, followed by a decoder that may consist of two 3×3 transposed-convolution layers also with a stride 2. A final layer of the decoder may have a channel number of 1, and all other layers may have a channel layer of the image feature map 133 (e.g., 256). In some implementations, the encoder-decoder network 250 may have more or fewer convolution layers and/or transposed-convolution layers. The final output of the decoder may be the gaze direction probability map 134, which may have the same w'×h' of the combined feature map 245; for example, 7×7, where the value at each element represents a probability that the POI has a gaze fixed in the direction of the person/object at that position, with zero values at elements not corresponding to a detected person or object. The gaze direction probability map 134 can be used in the gaze prediction 140 to predict gaze prediction data 141.

Figure 3:
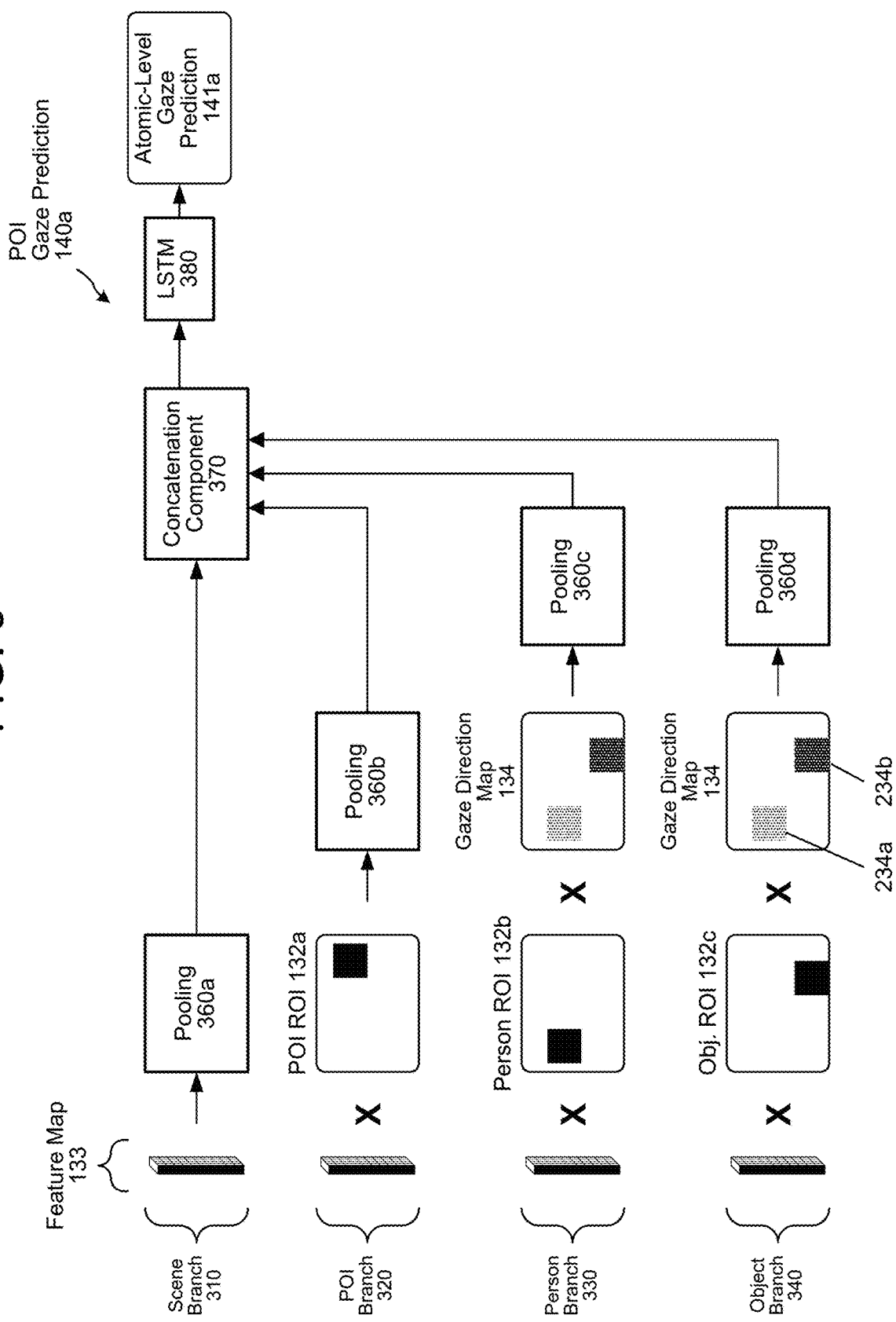
FIG. 3 illustrates example person-of-interest gaze prediction operations of the human gaze prediction system, according to embodiments of the present disclosure.

FIG. 3 illustrates example person-of-interest gaze prediction 140a operations of the gaze prediction system 115, according to embodiments of the present disclosure. The POI gaze prediction 140a may predict gaze prediction data 141. The gaze prediction data 141 may be determined based on the image feature map 133, the ROI masks 132, and the gaze direction probability map 134. The POI gaze prediction 140a may have several branches including a scene branch 310, a POI branch 320, a person branch 330, and/or an object branch 340. Each branch may include a pooling layer 360a, 360b, 360c, and/or 360d (collectively, "pooling layers 360"). Pooling may include consolidating feature data by removing some or all positional information. Pooling may, for example, take a minimum, an average, or a maximum of the values corresponding to individual features in a feature map, and output the min, average, or max values. The result of the pooling operation may be a vector, or an array having smaller w×h than the original feature map, but in either case representing the same number of features. For example, a global pooling layer may take a feature map and, for each respective feature, average the values corresponding to that feature. The output may be a vector having the same dimensionality d as the feature map, but having a w×h of 1×1. Pooling may reduce or remove the positional information from the feature map, and thus reduce the amount of information that the system processes. Pooling may be useful when position of a feature is less important or unimportant for subsequent processing. The pooling layers 360 can receive the feature maps having a size w'×h'×d and output a vector of size d. In some implementations, other manners of reducing the dimensionality of the feature data may be applied, such as convolutional layers. In the scene branch 310, the image feature map 133 may be input to the pooling layer 360a to generate a scene vector. In the POI branch 320, the image feature map 133 may be multiplied by the POI ROI mask 132a to isolate the POI features, which are then input into the pooling layer 360b to generate a POI vector. In the person branch 330, the image feature map 133 may be multiplied by the person ROI mask 132b and the gaze direction probability map 134 to generate a person feature. The pooling layer 360c may process the person feature to determine a person feature vector. Similarly, in the object branch 340, the image feature map 133 may be multiplied by the object ROI mask 132c and the gaze direction probability map 134 to generate an object feature. The pooling layer 360d may process the object feature to determine an object feature vector. The gaze direction probability map 134 can apply weighting factors to physical entity features, where the respective weighting factors correspond to the predicted likelihood that the POI's gaze is directed toward a particular physical entity. The four resulting vectors: the scene vector, the POI vector, the person vector, and the object vector, may have a dimensionality of 256. The vectors may be combined using, for example, a concatenation component 370 to generate a single 1,024-dimensional combined feature vector. The combined feature vector may be used to determine the gaze prediction data 141.

The gaze prediction data 141 may include an atomic-level gaze pattern. An atomic-level gaze pattern may be discernable based on a single image frame or a small number of successive image frames; for example, a Mutual atomic-level gaze pattern may be predicted based on image data 105 showing two users 5 looking at each other in a single image frame or perhaps 5 or 10 successive image frames. Thus, to predict the event pattern, the system may perform some time-dependent processing. One possible mechanism for processing this time dependency is a long short-term memory network (LSTM) 380. An LSTM may be an artificial recurrent neural network architecture with a feedback mechanism. An LSTM may include one or more units, where each unit may include a cell that can remember one or more values for a finite period of time. As the gaze direction prediction 130 and the POI gaze prediction 140a iterate over successive image frames, the LSTM 380 may receive combined feature vectors generated from each successive image frame and predict atomic-level gaze event patterns. In some implementations, the LSTM 380 may include 128 hidden units followed by a 6-output, fully-connected layer to predict an atomic-level gaze label. Each output may yield a predicted probability that the image frame or sequence of images frames correspond to an atomic-level gaze label. For example, for image data 105 showing two users 5 sharing a mutual gaze, an example output of the LSTM 380 may include a value corresponding to Mutual close to 1, with all other values being close to 0.

Image data 105 may include multiple people. Although some gaze patterns apply to two people, gaze prediction can be performed separately for each person. Thus, the gaze direction prediction 130 and the POI gaze prediction 140a may iterate for each person detected in the image data 105. For example, a first iteration may predict a gaze pattern for a first person. The first person will thus be the POI for purposes of the first iteration, and all other people will be people for purposes of the first iteration. A second iteration may predict a gaze pattern for a second person. The second person will thus be the POI for purposes of the second iteration, and all other people (including the POI in the first iteration) will be people for purposes of the second iteration, and so on. The gaze prediction data 141 may be sent to one or more downstream processes 150 for further use or processing.

Figure 4:
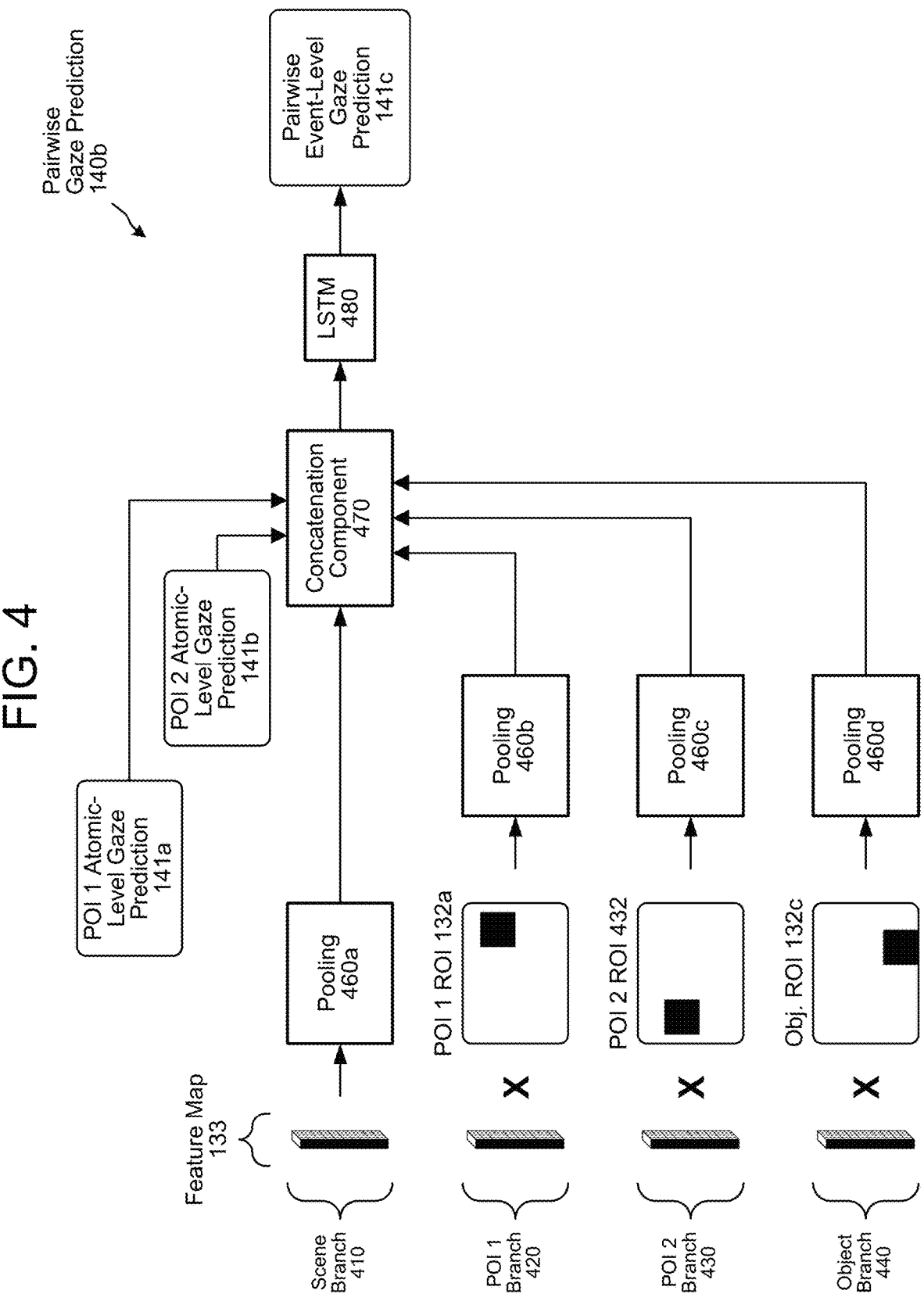
FIG. 4 illustrates example pairwise event-level gaze prediction operations of the human gaze prediction system, according to embodiments of the present disclosure.

FIG. 4 illustrates example operations of pairwise event-level gaze prediction 140b of the gaze pattern prediction system, according to embodiments of the present disclosure. Event-level gaze patterns may occur between two or more people. The operations shown in the pairwise gaze prediction 140b illustrate performing pairwise event-level gaze pattern prediction between two POIs in the image data 105 (e.g., from an image that includes the user 5a and the user 5b). To perform the pairwise gaze prediction 140b, the system 115 may have performed a second iteration of POI gaze prediction 140a with the second user 5b as the POI 2 to generate a POI 2 atomic-level gaze prediction 141b. In contrast with the POI gaze prediction 140a, the pairwise gaze prediction 140b may include a second POI branch 430 in place of the person branch 330. In the second POI branch 430, system 115 may apply a POI 2 ROI mask 432 and a pooling layer 460c to the image feature map 133 to extract a POI 2 feature vector. The POI 2 ROI mask 432 may be the same as a person ROI mask 132b representing a single person. The pairwise gaze prediction 140b may have a scene branch 410, which includes applying a pooling layer 460a to the image feature map 133 to extract the scene feature; a POI 1 branch 420, which includes applying the POI 1 ROI mask 132a and a pooling layer 460b to extract a POI 1 feature vector; a POI 2 branch 430 and a pooling layer 460c to extract a POI 2 feature vector; and an object branch 440, which includes applying the object ROI mask 132c and a pooling layer 460d to extract the object feature vector. Because the pairwise event-level gaze prediction relates to two POIs, the gaze direction probability map 134 may no longer apply.

The pairwise gaze prediction 140b may combine scene feature vector, POI 1 feature vector, POI 2 feature vector, and object feature vector; for example, using a concatenation component 470. The concatenation component 470 may additionally combine the atomic-level gaze prediction 141a for the POI 1 as well as an atomic-level gaze prediction 141b for the POI 2 to generate a combined feature vector. The combined feature vector may be input into an LSTM 480, which may generate a pairwise event-level gaze prediction 141c.

Event-level gaze patterns may involve a time component; for example, a "Gaze Aversion" pattern may involve two or more atomic-level patterns including Mutual, followed by Avert, followed by Single. Generating event-level gaze pattern predictions may include processing long-term temporal relationships among features from successive frames of image data 105. Analogous to the LSTM 380, the LSTM 480 may include a number of hidden units followed by a fully-connected layer having 5 outputs, one for each long-term gaze pattern. The LSTM 480 may be configured to process 5, 10, 30, 60, or more successive image frames.

Figure 5:
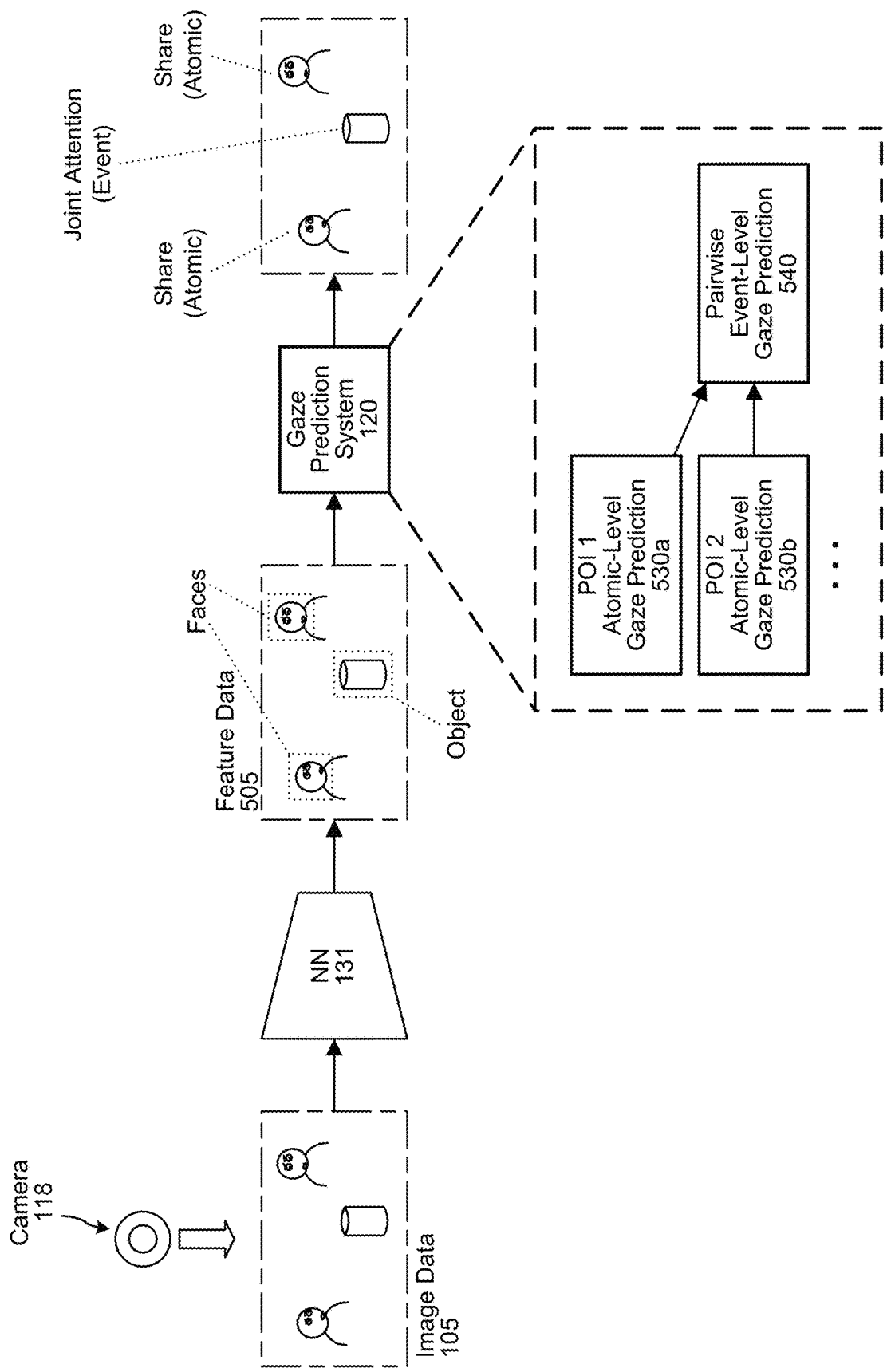
FIG. 5 illustrates example operations of predicting atomic-level and event-level gaze patterns in image data that includes two persons of interest and an object using the human gaze prediction system, according to embodiments of the present disclosure.

FIG. 5 illustrates example operations of predicting atomic-level and event-level gaze patterns in image data that includes two persons of interest and an object using the gaze prediction system 115, according to embodiments of the present disclosure. The camera 118 can capture the image data 105 from a scene including the users 5 and the object 10. The NN 131 may receive the image data 105 and perform face detection and/or object detection. The NN 131 may generate feature data 505 with bounding boxes corresponding to detected faces and/or objects. The gaze prediction system 115 may receive the feature data 505 including the bounding boxes corresponding to detected faces/objects and atomic-level and/or event-level gaze pattern prediction based on one or more POIs. The gaze prediction system 115 can process the feature data 505 by applying gaze direction prediction 130 and gaze prediction 140. The gaze prediction system 115 can output gaze prediction data corresponding to one or more people and/or objects represented in the image data 105.

In example operations based on image data 105 representing two people and one object, the feature data 505 may include detection of two faces, each with a respective bounding box, and an object with a corresponding third bounding box. The gaze prediction system 115 may receive the resulting feature data 505, and may perform an atomic-level gaze prediction 530a and 530b on the feature data 505 to generate a POI 1 atomic-level gaze prediction 141a and a POI 2 atomic-level gaze prediction 141b. The atomic-level gaze prediction 530 may include performing gaze direction prediction 130 for each detected face in turn to generate a first gaze direction probability map 134 corresponding to the first face, and a second gaze direction probability map 134 corresponding to the second face. The atomic-level gaze prediction 530 may further include performing POI gaze prediction 140a for each POI. The POI gaze prediction 140a may be based on the image feature data 133, the POI ROI mask 132a, person ROI mask 132b, and gaze direction probability map 134 for that POI. The gaze prediction system 115 may perform pairwise gaze prediction 540 based on the atomic-level gaze predictions 530a and 530b to generate a pairwise event-level gaze prediction 141c. Based on the image data 105, the gaze prediction system 115 may predict that POI 1 and POI 2 both exhibit a Share atomic-level gaze pattern, and that together they exhibit a Joint Attention pairwise event-level gaze pattern. The operations of the gaze prediction system 115 may be repeated for additional people and/or objects. For example, if different image data includes four faces, the gaze prediction system 115 may perform additional POI atomic-level gaze predictions 530 for a POI 3, POI 4, etc., and additional pairwise gaze predictions 540 for other pairs of POIs (e.g., between POI 1 and POI 3, between POI 3 and POI 4, etc.).

The NN 131, the LSTM 380 and the LSTM 480 may be trained using annotated data sets. In some implementations, the models may be trained using the publicly available VACATION (Video gAze CommunicATION) dataset. The VACATION dataset includes 300 videos cropped from TV shows and movies from YouTube. The videos are stored in MPEG4 format with 640×360 spatial resolution. The length of individual videos ranges from 2.2 to 74.5 seconds, and average 13 seconds. The dataset includes a total of 96,993 frames and is 3,880 seconds long. The dataset includes annotations for, for example, human face and object bounding boxes, the attention of each person in the image (that is, to which person/object it directs its gaze) and both atomic-level and event-level gaze labels for each person in each frame. The NN 131 model may be trained using an Adam optimizer with a learning rate of 0.0001. Multi-class entropy may be chosen as the training loss. The network may learn over 10 epochs, taking 10 hours using a commercially available graphics card. The best model is chosen based on accuracy in processing a validation set. The LSTM 380 may be trained using information from 10 successive frames. During training of the second LSTM 480, more successive frames (e.g., 30, 60, or more) may be used to account for the relatively longer time period over which event-level gaze patterns may occur.

Figure 6:
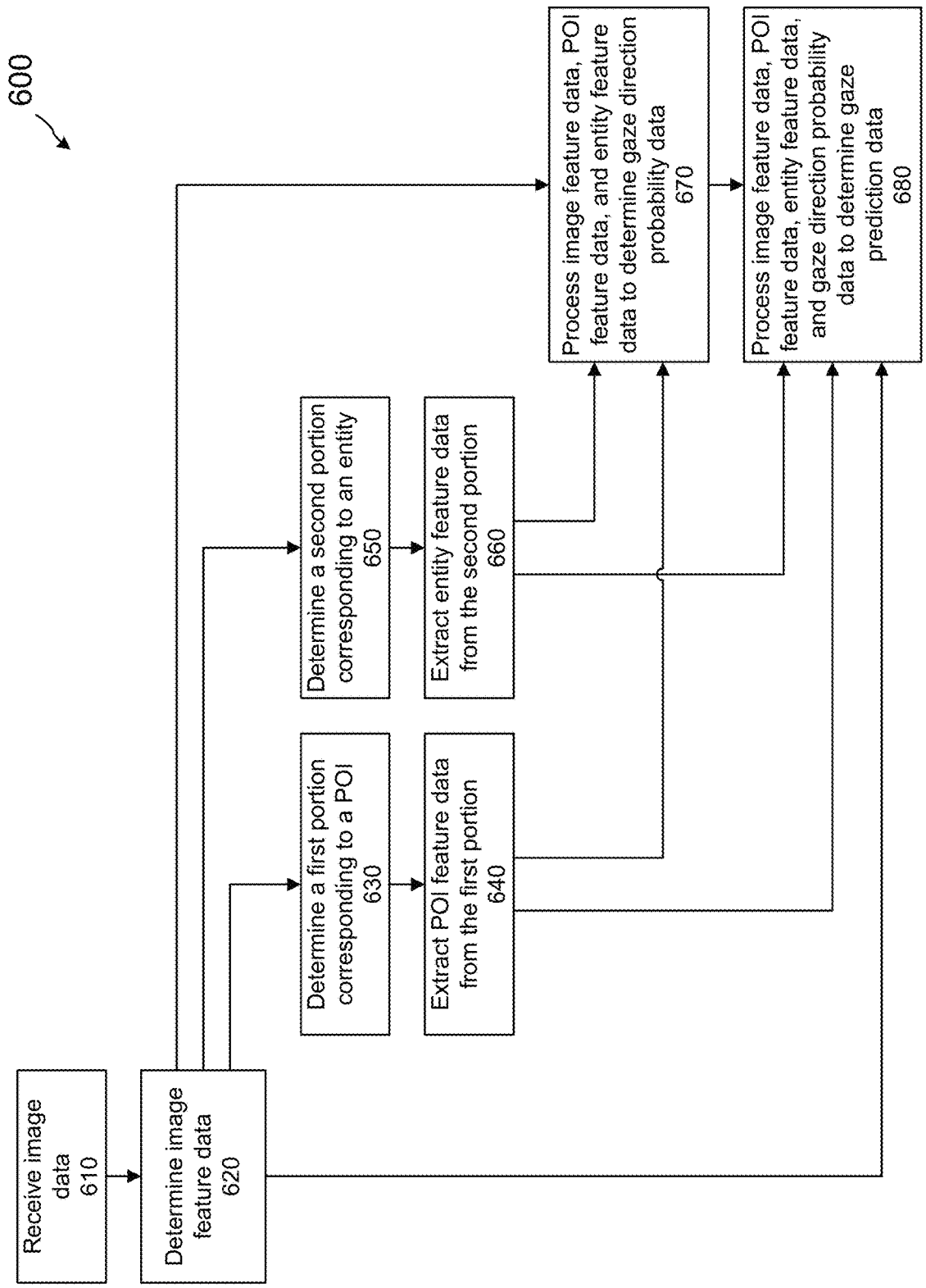
FIG. 6 is a flowchart illustrating example operations of a method of determining gaze prediction data, according to embodiments of the present disclosure.

FIG. 6 is a flowchart illustrating example operations of a method 600 of determining gaze prediction data 141, according to embodiments of the present disclosure. The method includes receiving (stage 610) image data 105; for example, from the camera 118. The method 600 includes determining (stage 620) image feature data 133. The system 100 may determine the image feature data 133 by processing the image data 105 using a neural network, such as the NN 131. In some implementations, the system 100 may resize or otherwise pre-process the image data 105 before processing it to determine the image feature data 133. The features may correspond to classes of object such as face, book, car, house, etc. Thus, the image feature map 133 may include object recognition data that the system 120 can leverage, for example, during entity resolution, NLU hypotheses reranking, or elsewhere. The method 600 may determine (stage 630) a first portion of the image feature data 133 corresponding to a POI (e.g., the POI's face), and determine (stage 650) a second portion of the image feature data 133 corresponding to a physical entity, such as an object or second face, represented in the image feature data. The first portion and the second portion may correspond to bounding boxes for the detected face and entity, respectively, as determined during processing of the image data 105. The method 600 include extracting (stage 640) the POI feature data from the image feature data 133 based on the first portion, and extracting (stage 660) the entity feature data from the image feature data 133 based on the second portion. The method 600 includes combining the image feature data 133, POI feature data, and entity feature data, and processing (stage 670) the combined data to determine gaze direction probability data 134. In some implementations, the processing of stage 670 may include encoding/decoding processing, as described in further detail below with reference to FIG. 7. The method 600 includes combining the image feature data 133, POI feature data, entity feature data, the gaze direction probability data 134, and processing (stage 670) the combined data to determine gaze prediction data 141. The gaze prediction data 141 may include one or more predicted atomic-level and/or event-level gaze patterns. The gaze prediction data 141 may be used by downstream processes such as NLU, entity resolution, reranking, or for use by a skill 1090. In some implementations, the processing of stage 670 may include time-dependent processing, as described in further detail below with reference to FIG. 8.

The method 600 shown in FIG. 6 includes a POI feature data branch and a physical entity feature data branch. In some implementations, the method 600 may include additional branches. For example, the method 600 may include both a person feature data branch (e.g., for feature data corresponding to faces of one or more people detected in the image data other than the POI) and an object feature data branch (e.g., for non-person objects detected in the feature data). In some implementations, neural networks used for certain processing steps of the method 600 such as in the stages 670 and/or 680 are configured and trained to receive data from a fixed number of branches; for example, an image branch, a POI branch, a person branch, and an object branch. However, the person branch and/or the object branch may be able to determine image feature portions corresponding to one or more entities, thus image data including many combinations of faces and/or objects may be processed using the method 600.

Figure 7:
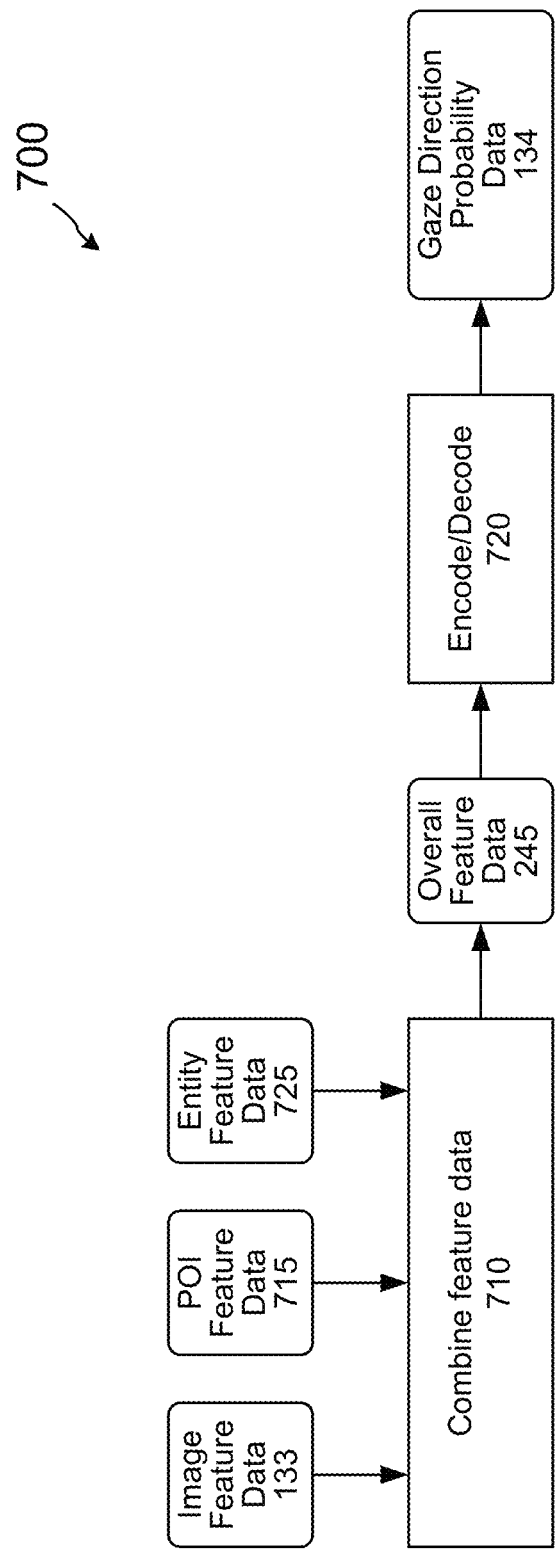
FIG. 7 is a flowchart illustrating example operations for determining gaze direction probability data in the method of FIG. 6, according to embodiments of the present disclosure.

FIG. 7 is a flowchart illustrating example operations 700 for determining the gaze direction probability data 134 during stage 670 of the method 600, according to embodiments of the present disclosure. The operations 700 may include combining (stage 710) the image feature data 133, the POI feature data 715, and the entity feature data 725 to generate combined feature data 245. The gaze prediction system 115 may combine the various feature data by concatenating them; for example, using the concatenation component 240. Concatenating the feature data may, for example, combine three 7×7×d feature maps into a 7×7×3*d feature map (or a 7×7×4*d feature map for gaze prediction having 4 branches: image, POI, person, and object). The operations 700 may include encoding/decoding (stage 720) the combined feature data 245 using, e.g., the encoder-decoder network 250 previously described, to determine the gaze direction probability data 134.

Figure 8:
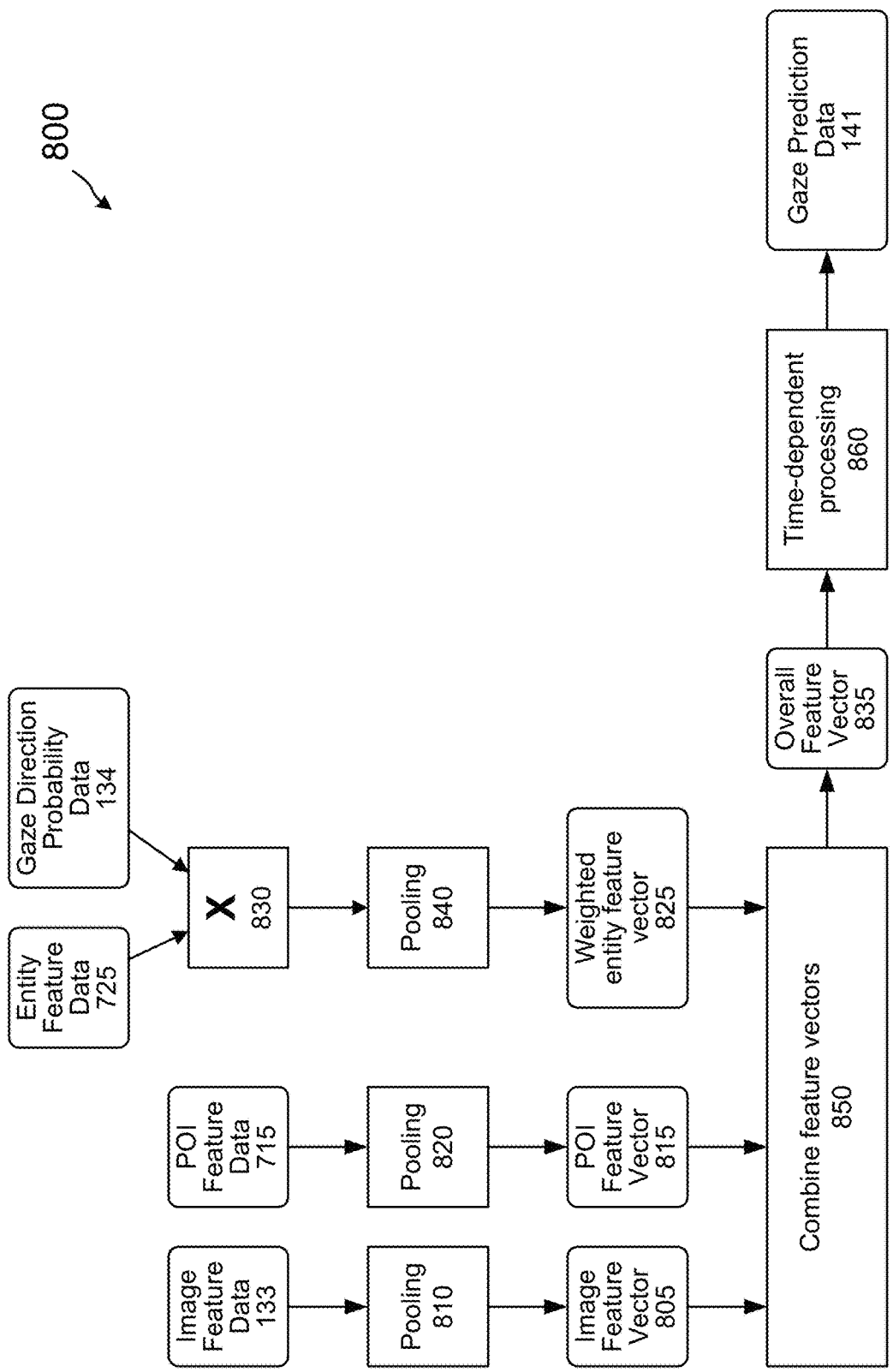
FIG. 8 is a flowchart illustrating example operations for using gaze direction probability data to determine gaze prediction data in the method of FIG. 6, according to embodiments of the present disclosure.

FIG. 8 is a flowchart illustrating example operations for using gaze direction probability data 134 to determine gaze prediction data 141 during stage 680 of the method 600, according to embodiments of the present disclosure. In processing the various feature data and the gaze direction probability data 134, the operations 800 can include performing a pooling operation (stage 810) on the image feature data 133 to determine an image feature vector 805. The operations 800 can include performing a pooling operation (stage 820) on the POI feature data 715 to determine a POI feature vector 815. The operations 800 can include weighting (stage 830) entity feature data 725 based on the gaze direction probability data 134, and performing a pooling operation (stage 840) on the weighted entity feature data to determine a weighted entity feature vector 825. The pooling operations may be global average pooling operations that, for each channel of the feature data, average values across the length and width of the data while preserving the channel dept. For example, the pooling operations may process image feature data 133 having dimensions of 7×7×d to d. The operations 800 may include combining (stage 850) the image feature vector 805, the POI feature vector 815, and the weighted entity feature vector 825 to determine a combined feature vector 835. The gaze prediction system 115 may combine the vectors by concatenating them; for example, using the concatenation component 370. Concatenating the feature vectors may, for example, combine three d vectors into a 3*d vector (or a 4*d vector for gaze prediction having 4 branches: image, POI, person, and object). The operations 800 can include performing time-dependent processing (stage 860) on the combined feature vector 835 to generate the gaze prediction data 141. The time-dependent processing may include processing image data from images frames that are successive or closely related in time. The time-dependent processing may average image features to improve signal to noise, or detect changes in image features over time, such as atomic-level gaze pattern that involves a change in gaze direction. In some implementations, the time-dependent processing may be performed using the LSTM 380.

Figure 9:
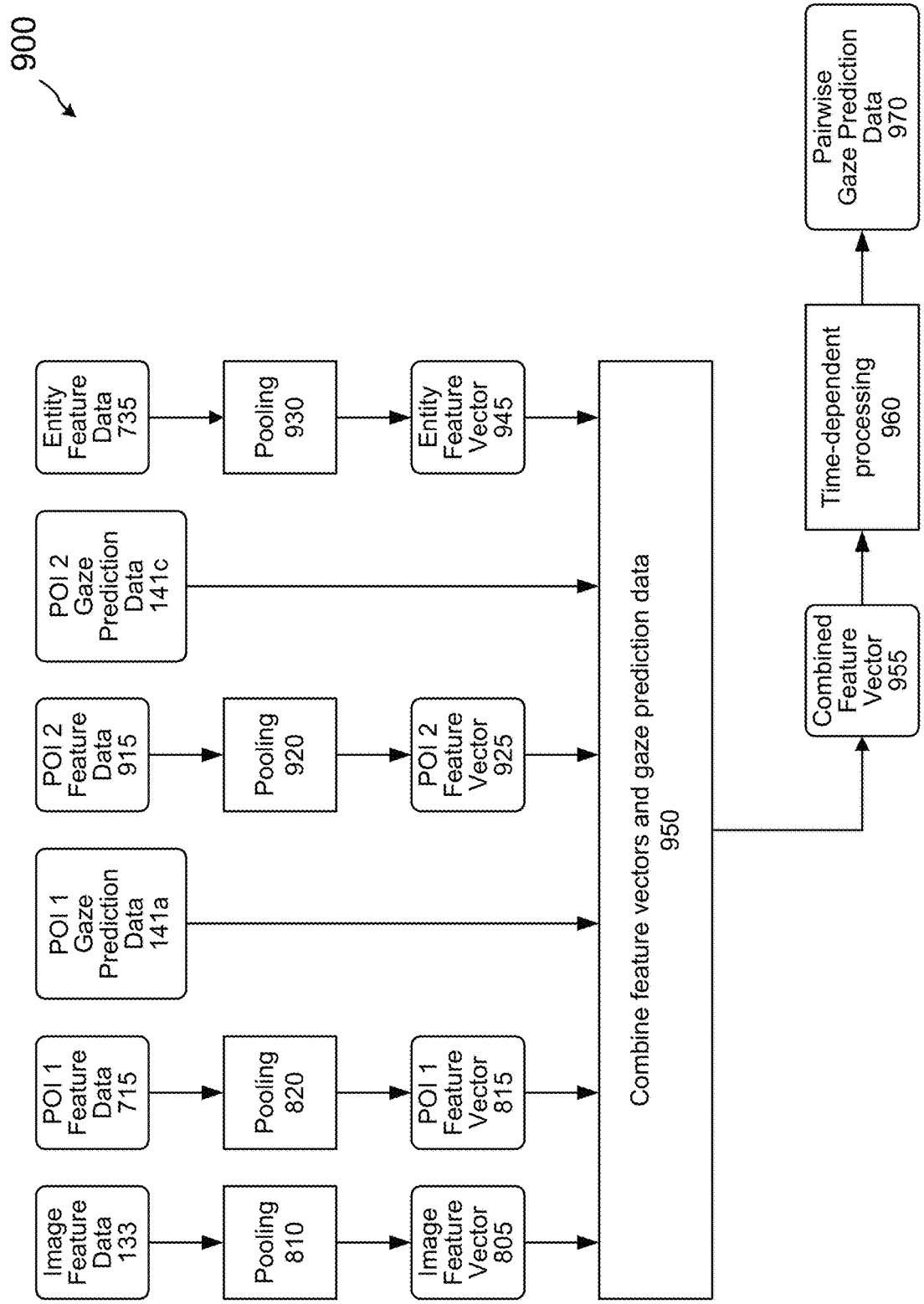
FIG. 9 is a flowchart illustrating example operations of a method of determining pairwise event-level gaze prediction data based on gaze prediction data for two persons of interest, according to embodiments of the present disclosure.

FIG. 9 is a flowchart illustrating example operations of a method 900 of determining pairwise event-level gaze prediction data 970 based on gaze prediction data 141a and 141b for two POIs, according to embodiments of the present disclosure. The operations of the method 900 can follow or otherwise be combined with the operations of the method 600 and/or the operations 700/800. The method 900 can include combining (stage 950) the image feature vector 805, the POI 1 feature vector 815, the POI 1 gaze prediction data 141a, a POI 2 feature vector, POI 2 gaze prediction data 141b, and entity feature vector 945. The method 900 include performing a pooling operation (stage 920) on POI 2 feature data 915 to generate the POI 2 feature vector 925, and performing a pooling operation (stage 930) on the entity feature data 735 to generate the (unweighted) entity feature vector 945. The method 900 can include performing time-dependent processing (stage 960) on the resulting combined feature vector 955 to generate the pairwise gaze prediction data 970. The system 115 may perform the time-dependent processing using, for example, the LSTM 480. The method 900 can be repeated for multiple image frames over time to predict event-level pairwise gaze events.

Figure 10:
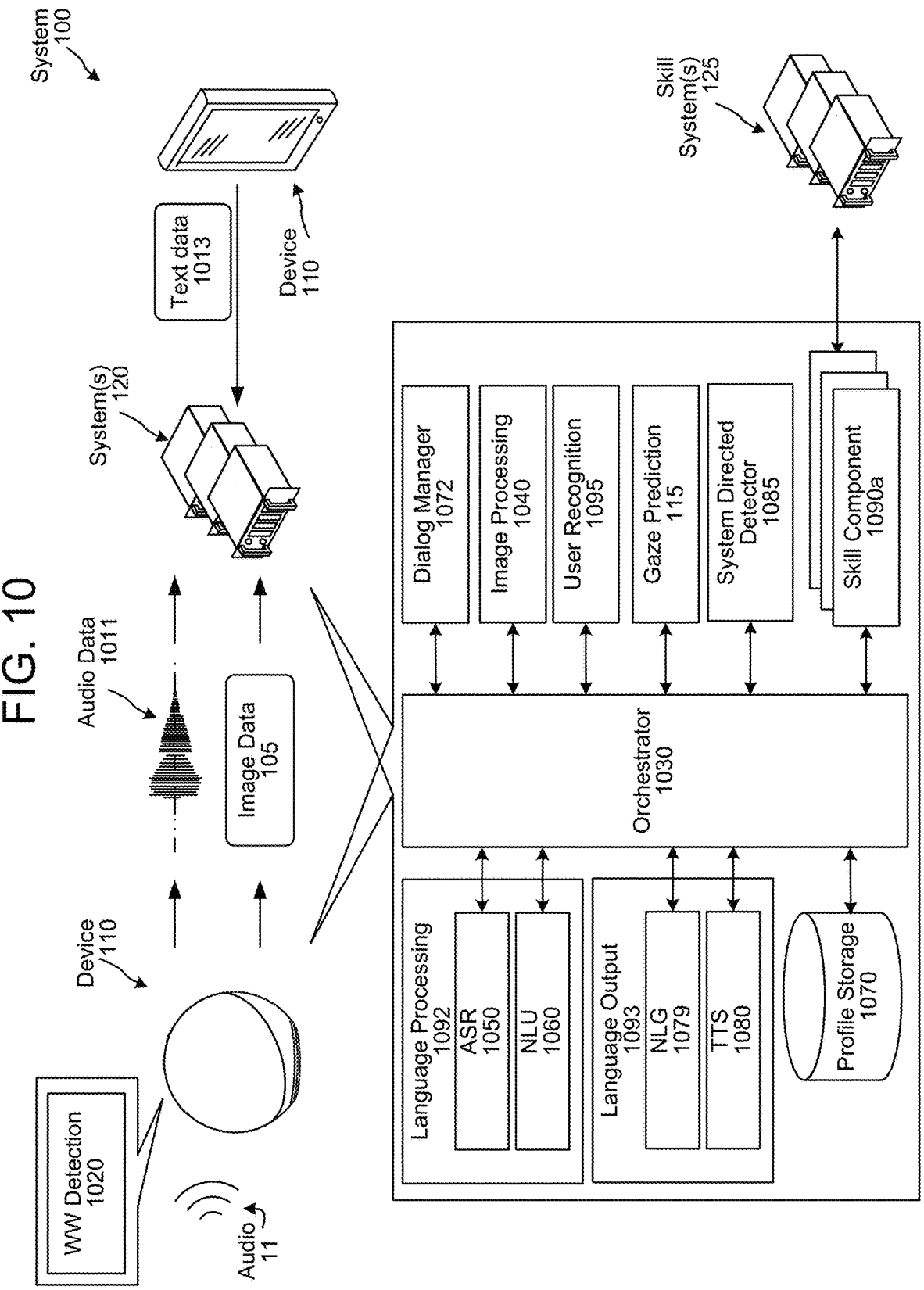
FIG. 10 is a conceptual diagram of components of the system, according to embodiments of the present disclosure.

FIG. 10 is a conceptual diagram of components of the system, according to embodiments of the present disclosure. The system 100 may operate using various components as described in FIG. 10. The various components may be located on same or different physical devices. Communication between various components may occur directly or across a network(s) 199. The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/system 120. In at least some embodiments, such determination may be made using a wakeword detection component 1020. The wakeword detection component 1020 may be configured to detect various wakewords. In at least some examples, each wakeword may correspond to a name of a different digital assistant. An example wakeword/digital assistant name is "Alexa." In another example, input to the system may be in form of text data 1013, for example as a result of a user typing an input into a user interface of device 110. Other input forms may include indication that the user has pressed a physical or virtual button on device 110, the user has made a gesture, etc. The device 110 may also capture images using camera(s) 118 of the device 110 and may process the image data 105 locally and/or send the image data 105 to the system 120. The image data 105 may include raw image data or image data processed by the device 110 before sending to the system 120.

The wakeword detection component 1020 of the device 110 may process the audio data, representing the audio 11, to determine whether speech including a wakeword is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 1020 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 1020 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used. Further, system directed input detector 1085 (discussed in detail below) may also consider whether speech is directed at the device/system. Such a detector may incorporate information from the wakeword detection component 1020 as well as from gaze detection components such as those discussed herein.

Once the wakeword is detected by the wakeword detection component 1020 and/or input is detected by an input detector, the device 110 may "wake" and begin processing audio data 1011, representing the audio 11, locally and/and or sending the audio data 1011 to the system(s) 120. The audio data 1011 may include data corresponding to the wakeword; in other embodiments, the portion of the audio corresponding to the wakeword is removed by the device 110 prior to sending the audio data 1011 to the system(s) 120. In the case of touch input detection or gesture based input detection, the audio data may not include a wakeword.

Upon receipt by device 110 and/or the system(s) 120, the audio data 1011 may be sent to an orchestrator component 1030. The orchestrator component 1030 may include memory and logic that enables the orchestrator component 1030 to transmit various pieces and forms of data to various components of the system, as well as perform other operations as described herein.

The orchestrator component 1030 may send the audio data 1011 to a language processing component 1092. The language processing component 1092 (sometimes also referred to as a spoken language understanding (SLU) component) includes an automatic speech recognition (ASR) component 1050 and a natural language understanding (NLU) component 1060. The ASR component 1050 may transcribe the audio data 1011 into text data. The text data output by the ASR component 1050 represents one or more than one (e.g., in the form of an N-best list) ASR hypotheses representing speech represented in the audio data 1011. The ASR component 1050 interprets the speech in the audio data 1011 based on a similarity between the audio data 1011 and pre-established language models. For example, the ASR component 1050 may compare the audio data 1011 with models for sounds (e.g., acoustic units such as phonemes, senons, phones, etc.) and sequences of sounds to identify words that match the sequence of sounds of the speech represented in the audio data 1011. The ASR component 1050 can send the resulting ASR data 1310 (e.g., text data) generated thereby to an NLU component 1060, via, in some embodiments, the orchestrator component 1030. The ASR data 1310 sent from the ASR component 1050 to the NLU component 1060 may include a single top-scoring ASR hypothesis or may include an N-best list including multiple top-scoring ASR hypotheses. An N-best list may additionally include a respective score associated with each ASR hypothesis represented therein.

The language processing component 1092 may further include a NLU component 1060. The NLU component 1060 may receive the text data from the ASR component. The NLU component 1060 may attempts to make a semantic interpretation of the phrase(s) or statement(s) represented in the text data input therein by determining one or more meanings associated with the phrase(s) or statement(s) represented in the text data. The NLU component 1060 may determine an intent representing an action that a user desires be performed and may determine information that allows a device (e.g., the device 110, the system(s) 120, a skill component 1090, a skill system(s) 125, etc.) to execute the intent. For example, if the text data corresponds to "play the 5$^{th}$ Symphony by Beethoven," the NLU component 1060 may determine an intent that the system output music and may identify "Beethoven" as an artist/composer and "5th Symphony" as the piece of music to be played. For further example, if the text data corresponds to "what is the weather," the NLU component 1060 may determine an intent that the system output weather information associated with a geographic location of the device 110. In another example, if the text data corresponds to "turn off the lights," the NLU component 1060 may determine an intent that the system turn off lights associated with the device 110 or the user 5. However, if the NLU component 1060 is unable to resolve the entity—for example, because the entity is referred to by anaphora such as "this song" or "my next appointment"—the language processing component 1092 can send a decode request to another language processing component 1092 for information regarding the entity mention and/or other context related to the utterance. The language processing component 1092 may augment, correct, or base results data upon the audio data 1011 as well as any data received from the other language processing component 1092.

The NLU component 1060 may return NLU results data 1385/1325 (which may include tagged text data, indicators of intent, etc.) back to the orchestrator component 1030. The orchestrator component 1030 may forward the NLU results data to a skill component(s) 1090. If the NLU results data includes a single NLU hypothesis, the NLU component 1060 and the orchestrator component 1030 may direct the NLU results data to the skill component(s) 1090 associated with the NLU hypothesis. If the NLU results data 1385/1325 includes an N-best list of NLU hypotheses, the NLU component 1060 and the orchestrator component 1030 may direct the top scoring NLU hypothesis to a skill component(s) 1090 associated with the top scoring NLU hypothesis. The system may also include a post-NLU ranker 1065 which may incorporate other information to rank potential interpretations determined by the NLU component 1060. The local device 110 may also include its own post-NLU ranker 1065, which may operate similarly to the post-NLU ranker 1065. The NLU component 1060, post-NLU ranker 1065 and other components are described in greater detail below with regard to FIGS. 13 and 13.

A skill component may be software running on the device 110 and/or the system(s) 120 that is akin to a software application. That is, a skill component 1090 may enable the device 110 and/or the system(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The device 110 and/or system(s) 120 may be configured with more than one skill component 1090. For example, a weather service skill component may enable the system(s) 120 to provide weather information, a car service skill component may enable the system(s) 120 to book a trip with respect to a taxi or ride sharing service, a restaurant skill component may enable the system(s) 120 to order a pizza with respect to the restaurant's online ordering system, etc. A skill component 1090 may operate in conjunction between the system(s) 120 and other devices, such as the device 110, in order to complete certain functions. Inputs to a skill component 1090 may come from speech processing interactions or through other interactions or input sources. A skill component 1090 may include hardware, software, firmware, or the like that may be dedicated to a particular skill component 1090 or shared among different skill components 1090.

A skill support system(s) 125 may communicate with a skill component(s) 1090 within the device 110 and/or the system(s) 120 and/or directly with the orchestrator component 1030 or with other components. A skill support system(s) 125 may be configured to perform one or more actions. An ability to perform such action(s) may sometimes be referred to as a "skill." That is, a skill may enable a skill support system(s) 125 to execute specific functionality in order to provide data or perform some other action requested by a user. For example, a weather service skill may enable a skill support system(s) 125 to provide weather information to the system(s) 120, a car service skill may enable a skill support system(s) 125 to book a trip with respect to a taxi or ride sharing service, an order pizza skill may enable a skill support system(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The device 110 and/or system(s) 120 may be configured with a skill component 1090 dedicated to interacting with the skill support system(s) 125. Unless expressly stated otherwise, reference to a skill, skill device, or skill component may include a skill component 1090 operated by the system(s) 120 and/or skill operated by the skill support system(s) 125. Moreover, the functionality described herein as a skill or skill may be referred to using many different terms, such as an action, bot, app, or the like. The skill 1090 and or skill support system(s) 125 may return output data to the orchestrator component 1030.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system(s) 100 may include a dialog manager 1072 that manages and/or tracks a dialog between a user and a device. As used herein, a "dialog" may refer to data transmissions (such as relating to multiple user inputs and system 100 outputs) between the system 100 and a user (e.g., through device(s) 110) that all relate to a single "conversation" between the system and the user that may have originated with a single user input initiating the dialog. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data 105, gestures, button presses, gaze prediction data 141, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog. The dialog manager 1072 may, based on SDD result data 1142 and/or gaze prediction data 141, determine that an utterance may not relate to an open dialog but rather to an aside to another person in or out of view of the camera 118.

The dialog manager 1072 may associate a dialog session identifier with the dialog upon identifying that the user is engaging in a dialog with the user. The dialog manager 1072 may track a user input and the corresponding system generated response to the user input as a turn. The dialog session identifier may correspond to multiple turns of user input and corresponding system generated response. The dialog manager 1072 may transmit data identified by the dialog session identifier directly to the orchestrator component 1030 or other component. Depending on system configuration the dialog manager 1072 may determine the appropriate system generated response to give to a particular utterance or user input of a turn. Or creation of the system generated response may be managed by another component of the system (e.g., the language output component 1093, NLG 1079, orchestrator component 1030, etc.) while the dialog manager 1072 selects the appropriate responses. Alternatively, another component of the device 110 and/or the system(s) 120 may select responses using techniques discussed herein. The text of a system generated response may be sent to a TTS component 1080 for creation of audio data corresponding to the response. The audio data may then be sent to a user device (e.g., device 110) for ultimate output to the user. Alternatively (or in addition) a dialog response may be returned in text or some other form.

The dialog manager 1072 may receive the ASR hypothesis/hypotheses (i.e., text data) and make a semantic interpretation of the phrase(s) or statement(s) represented therein. That is, the dialog manager 1072 determines one or more meanings associated with the phrase(s) or statement(s) represented in the text data based on words represented in the text data. The dialog manager 1072 determines a goal corresponding to an action that a user desires be performed as well as pieces of the text data that allow a device (e.g., the device 110, the system(s) 120, a skill 1090, a skill system(s) 125, etc.) to execute the intent. If, for example, the text data corresponds to "what is the weather," the dialog manager 1072 may determine that that the system(s) 120 is to output weather information associated with a geographic location of the device 110. In another example, if the text data corresponds to "turn off the lights," the dialog manager 1072 may determine that the system(s) 120 is to turn off lights associated with the device(s) 110 or the user(s) 5.

The dialog manager 1072 may send the results data to one or more skill(s) 1090. If the results data includes a single hypothesis, the orchestrator component 1030 may send the results data to the skill(s) 1090 associated with the hypothesis. If the results data includes an N-best list of hypotheses, the orchestrator component 1030 may send the top scoring hypothesis to a skill(s) 1090 associated with the top scoring hypothesis.

The device 110 and/or the system 120 may include a language output component 1093. The language output component 1093 includes a natural language generation (NLG) component 1079 and a text-to-speech (TTS) component 1080. The NLG component 1079 can generate text for purposes of TTS output to a user. For example the NLG component 1079 may generate text corresponding to instructions corresponding to a particular action for the user to perform. The NLG component 1079 may generate appropriate text for various outputs as described herein. The NLG component 1079 may include one or more trained models configured to output text appropriate for a particular input. The text output by the NLG component 1079 may become input for the TTS component 1080 (e.g., output text data discussed below). Alternatively or in addition, the TTS component 1080 may receive text data from a skill 1090 or other system component for output.

The NLG component 1079 may include a trained model. The NLG component 1079 generates text data from dialog data received by the dialog manager 1072 such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 1080.

The TTS component 1080 may generate audio data (e.g., synthesized speech) from text data using one or more different methods. Text data input to the TTS component 1080 may come from a skill component 1090, the orchestrator component 1030, or another component of the system. In one method of synthesis called unit selection, the TTS component 1080 matches text data against a database of recorded speech. The TTS component 1080 selects matching units of recorded speech and concatenates the units together to form audio data. In another method of synthesis called parametric synthesis, the TTS component 1080 varies parameters such as frequency, volume, and noise to create audio data including an artificial speech waveform. Parametric synthesis uses a computerized voice generator, sometimes called a vocoder.

The device 110 may include still image and/or video capture components such as a camera or cameras 118 to capture one or more images. The device 110 may include circuitry for digitizing the images and/or video for transmission to the system(s) 120 as image data. The device 110 may further include circuitry for voice command-based control of the camera, allowing a user 5 to request capture of image or video data. The device 110 may process the commands locally or send audio data 1011 representing the commands to the system(s) 120 for processing, after which the system(s) 120 may return output data that can cause the device 110 to engage its camera.

Upon receipt by the device 110 and/or system(s) 120, the image data 105 may be sent to an orchestrator component 1030. The orchestrator component 1030 may send the image data 105 to an image processing component 1040. The image processing component 1040 can perform computer vision functions such as object recognition, modeling, reconstruction, etc. For example, the image processing component 1040 may detect a person, face, etc. (which may then be identified using user-recognition component 1095).

In some implementations, the image processing component 1040 can detect the presence of text in an image. In such implementations, the image processing component 1040 can recognize the presence of text, convert the image data to text data, and send the resulting text data via the orchestrator component 1030 to the language processing component 1092 for processing by the NLU component 1060.

The device 110 and/or the system(s) 120 may include a user-recognition component 1095 that recognizes one or more users using a variety of data. The user-recognition component 1095 may take as input the audio data 1011 and/or text data output by the ASR component 1050. The user-recognition component 1095 may perform user recognition by comparing audio characteristics in the audio data 1011 to stored audio characteristics of users. The user-recognition component 1095 may also perform user recognition by comparing biometric data (e.g., fingerprint data, iris data, etc.), received by the system in correlation with the present user input, to stored biometric data of users assuming user permission and previous authorization. The user-recognition component 1095 may further perform user recognition by comparing image data (e.g., including a representation of at least a feature of a user), received by the system in correlation with the present user input, with stored image data including representations of features of different users. The user-recognition component 1095 may perform additional user recognition processes, including those known in the art.

The user-recognition component 1095 determines scores indicating whether user input originated from a particular user. For example, a first score may indicate a likelihood that the user input originated from a first user, a second score may indicate a likelihood that the user input originated from a second user, etc. The user-recognition component 1095 also determines an overall confidence regarding the accuracy of user recognition operations.

Output of the user-recognition component 1095 may include a single user identifier corresponding to the most likely user that originated the user input. Alternatively, output of the user-recognition component 1095 may include an N-best list of user identifiers with respective scores indicating likelihoods of respective users originating the user input. The output of the user-recognition component 1095 may be used to inform NLU processing as well as processing performed by other components of the system.

The system 100 (either on device 110, system 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 1070 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system 120 with permission to allow the skill to execute with respect to the user's natural language user inputs. If a user does not enable a skill, the system 120 may not invoke the skill to execute with respect to the user's natural language user inputs.

The profile storage 1070 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 1070 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The device 110 and/or system 120 may also include a system directed input detector 1085. The system directed input detector 1085 may be configured to determine whether an input to the system (for example speech, a gesture, etc.) is directed to the system or not directed to the system (for example directed to another user, etc.). The system directed input detector 1085 may work in conjunction with the wakeword detection component 1020 and/or the gaze prediction system 115. If the system directed input detector 1085 determines an input is directed to the system, the device 110 may "wake" and begin sending captured data for further processing (for example, processing audio data using the language processing component 1092, processing captured image data using image processing component 1040 or the like). If data is being processed the device 110 may indicate such to the user, for example by activating or changing the color of an illuminated output (such as an LED ring), displaying an indicator on a display (such as a light bar across the display), outputting an audio indicator (such as a beep) or otherwise informing a user that input data is being processed. If the system directed input detector 1085 determines an input is not directed to the system (such as a speech or gesture directed to another user) the device 110 may discard the data and take no further action for processing purposes. In this way the system 100 may prevent processing of data not directed to the system, thus protecting the users' privacy. As an indicator to the user, however, the system may output an audio, visual, or other indicator when the system directed input detector 1085 is determining whether an input is potentially device directed. For example, the system may output an orange indicator while considering an input, and may output a green indicator if a system directed input is detected. Other such configurations are possible. Further details regarding the system directed input detector 1085 are included below with regard to FIG. 11.

The device 110 and/or system 120 may include a gaze prediction system 115 as previously described. The gaze prediction system 115 may process image data 105 to generate gaze prediction data 141 for use in downstream processes 150 such as natural language understanding or entity resolution (such as performed by the NLU component 1060 described further below with reference to FIG. 13) and/or dialog management (such as performed by the dialog manager 1072 previously descried).

Figure 11:
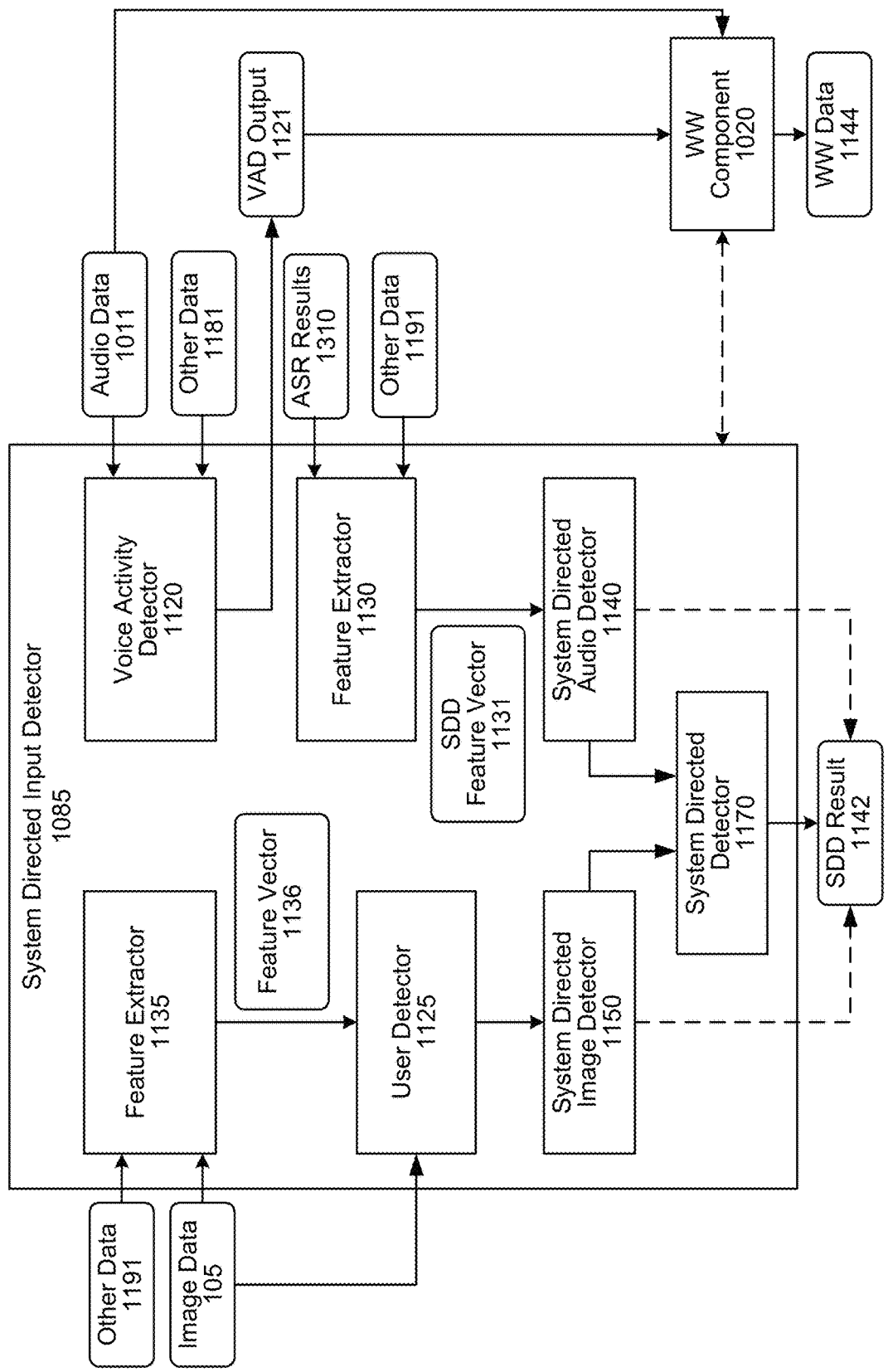
FIG. 11 is a conceptual diagram of components of a system to detect if input audio data includes system directed speech, according to embodiments of the present disclosure.

FIG. 11 is a conceptual diagrams of components of a component 1085 to detect if input audio data includes system directed speech, according to embodiments of the present disclosure. As shown in FIG. 11, the system directed input detector 1085 may include a number of different components to determine if audio data or other data is directed to the device/system. First, the system directed input detector 1085 may include a voice activity detector (VAD) 1120. The VAD 1120 may operate to detect whether the incoming audio data 1011 includes speech or not. The VAD output 1121 may be a binary indicator. Thus, if the incoming audio data 1011 includes speech, the VAD 1120 may output an indicator 1121 that the audio data 1011 does includes speech (e.g., a 1) and if the incoming audio data 1011 does not includes speech, the VAD 1120 may output an indicator 1121 that the audio data 1011 does not includes speech (e.g., a 0). The VAD output 1121 may also be a score (e.g., a number between 0 and 1) corresponding to a likelihood that the audio data 1011 includes speech. The VAD 1120 may also perform start-point detection as well as end-point detection where the VAD 1120 determines when speech starts in the audio data 1011 and when it ends in the audio data 1011. Thus the VAD output 1121 may also include indicators of a speech start point and/or a speech endpoint for use by other components of the system. (For example, the start-point and end-points may demarcate the audio data 1011 that is sent to the speech processing component 240.) The VAD output 1121 may be associated with a same unique ID as the audio data 1011 for purposes of tracking system processing across various components.

The VAD 1120 may operate using a variety of VAD techniques, including those described above with regard to VAD operations performed by device 110. The VAD may be configured to be robust to background noise so as to accurately detect when audio data actually includes speech or not. The VAD 1120 may operate on raw audio data 1011 such as that sent by device 110 or may operate on feature vectors or other data representing the audio data 1011. For example, the VAD 1120 may take the form of a deep neural network (DNN) and may operate on a single feature vector representing the entirety of audio data 1011 received from the device or may operate on multiple feature vectors, for example feature vectors representing frames of audio data where each frame covers a certain amount of time of audio data (e.g., 25 ms). The VAD 1120 may also operate on other data 1181 that may be useful in detecting voice activity in the audio data 1011. For example, the other data 1181 may include results of anchored speech detection where the system takes a representation (such as a voice fingerprint, reference feature vector, etc.) of a reference section of speech (such as speech of a voice that uttered a previous command to the system that included a wakeword) and compares a voice detected in the audio data 1011 to determine if that voice matches a voice in the reference section of speech. If the voices match, that may be an indicator to the VAD 1120 that speech was detected. If not, that may be an indicator to the VAD 1120 that speech was not detected. (For example, a representation may be taken of voice data in the first input audio data which may then be compared to the second input audio data to see if the voices match. If they do (or do not) that information may be considered by the VAD 1120.) The VAD 1120 may also consider other data when determining if speech was detected. The VAD 1120 may also consider speaker ID information (such as may be output by user-recognition component 1095), directionality data that may indicate what direction (relative to the capture device 110) the incoming audio was received from. Such directionality data may be received from the device 110 and may have been determined by a beamformer or other component of device 110. The VAD 1120 may also consider data regarding a previous utterance which may indicate whether the further audio data received by the system is likely to include speech. Other VAD techniques may also be used.

If the VAD output 1121 indicates that no speech was detected the system (through orchestrator component 1030 or some other component) may discontinue processing with regard to the audio data 1011, thus saving computing resources that might otherwise have been spent on other processes (e.g., ASR for the audio data 1011, etc.). If the VAD output 1121 indicates that speech was detected, the system may make a determination as to whether the speech was or was not directed to the speech-processing system. Such a determination may be made by the system directed audio detector 1140. The system directed audio detector 1140 may include a trained model, such as a DNN, that operates on a feature vector which represent certain data that may be useful in determining whether or not speech is directed to the system. To create the feature vector operable by the system directed audio detector 1140, a feature extractor 1130 may be used. The feature extractor 1130 may input ASR results 1310 which include results from the processing of the audio data 1011 by the ASR component 1050. For privacy protection purposes, in certain configurations the ASR results 1310 may be obtained from a language processing component 1092/ASR component 1050 located on device 110 or on a home remote component as opposed to a language processing component 1092/ASR component 1050 located on a cloud or other remote system 120 so that audio data 1011 is not sent remote from the user's home unless the system directed input detector component 1085 has determined that the input is system directed. Though this may be adjusted depending on user preferences/system configuration.

The ASR results 1310 may include an N-best list of top scoring ASR hypotheses and their corresponding scores, portions (or all of) an ASR lattice/trellis with scores, portions (or all of) an ASR search graph with scores, portions (or all of) an ASR confusion network with scores, or other such ASR output. As an example, the ASR results 1310 may include a trellis, which may include a raw search graph as scored during ASR decoding. The ASR results 1310 may also include a lattice, which may be a trellis as scored that has been pruned to remove certain hypotheses that do not exceed a score threshold or number of hypotheses threshold. The ASR results 1310 may also include a confusion network where paths from the lattice have been merged (e.g., merging hypotheses that may share all or a portion of a same word). The confusion network may be a data structure corresponding to a linear graph that may be used as an alternate representation of the most likely hypotheses of the decoder lattice. The ASR results 1310 may also include corresponding respective scores (such as for a trellis, lattice, confusion network, individual hypothesis, N-best list, etc.)

The ASR results 1310 (or other data 1191) may include other ASR result related data such as other features from the ASR system or data determined by another component. For example, the system may determine an entropy of the ASR results (for example a trellis entropy or the like) that indicates a how spread apart the probability mass of the trellis is among the alternate hypotheses. A large entropy (e.g., large spread of probability mass over many hypotheses) may indicate the ASR component 1050 being less confident about its best hypothesis, which in turn may correlate to detected speech not being device directed. The entropy may be a feature included in other data 1191 to be considered by the system directed audio detector 1140.

The system may also determine and consider ASR decoding costs, which may include features from Viterbi decoding costs of the ASR. Such features may indicate how well the input acoustics and vocabulary match with the acoustic models and language models. Higher Viterbi costs may indicate greater mismatch between the model and the given data, which may correlate to detected speech not being device directed. Confusion network feature may also be used. For example, an average number of arcs (where each arc represents a word) from a particular node (representing a potential join between two words) may measure how many competing hypotheses there are in the confusion network. A large number of competing hypotheses may indicate that the ASR component 1050 is less confident about the top hypothesis, which may correlate to detected speech not being device directed. Other such features or data from the ASR results 1310 may also be used as other data 1191.

The ASR results 1310 may be represented in a system directed detector (SDD) feature vector 1131 that can be used to determine whether speech was system-directed. The feature vector 1131 may represent the ASR results 1310 but may also represent audio data 1011 (which may be input to feature extractor 1130) or other information. Such ASR results may be helpful in determining if speech was system-directed. For example, if ASR results include a high scoring single hypothesis, that may indicate that the speech represented in the audio data 1011 is directed at, and intended for, the device 110. If, however, ASR results do not include a single high scoring hypothesis, but rather many lower scoring hypotheses, that may indicate some confusion on the part of the ASR component 1050 and may also indicate that the speech represented in the audio data 1011 was not directed at, nor intended for, the device 110.

The ASR results 1310 may include complete ASR results, for example ASR results corresponding to all speech between a startpoint and endpoint (such as a complete lattice, etc.). In this configuration the system may wait until all ASR processing for a certain input audio has been completed before operating the feature extractor 1130 and system directed audio detector 1140. Thus the system directed audio detector 1140 may receive a feature vector 1131 that includes all the representations of the audio data 1011 created by the feature extractor 1130. The system directed audio detector 1140 may then operate a trained model (such as a DNN) on the feature vector 1131 to determine a score corresponding to a likelihood that the audio data 1011 includes a representation of system-directed speech. If the score is above a threshold, the system directed audio detector 1140 may determine that the audio data 1011 does include a representation of system-directed speech. The SDD result 1142 may include an indicator of whether the audio data includes system-directed speech, a score, and/or some other data.

In one configuration the SDD result 1142 may indicate if a user input/expression is directed at another user. For example, the system directed input detector 1085 may process its various input data to determine that a first user is speaking to a second user. This may be indicated with one identifier corresponding to the speaking user and another identifier corresponding to the user to which the speaking user is addressing. User-recognition component 1095 be used for such purposes. In this manner the SDD result 1142 may identify the source and target of a user expression. This data may be included, for example, in dialog data that may be used by dialog manager 1072 so that the system may track the sources and targets of various expressions of a conversation/dialog.

The ASR results 1310 may also include incomplete ASR results, for example ASR results corresponding to only some speech between a between a startpoint and endpoint (such as an incomplete lattice, etc.). In this configuration the feature extractor 1130/system directed audio detector 1140 may be configured to operate on incomplete ASR results 1310 and thus the system directed audio detector 1140 may be configured to output an SSD result 1142 that provides an indication as to whether the portion of audio data processed (that corresponds to the incomplete ASR results) corresponds to system directed speech. The system may thus be configured to perform ASR at least partially in parallel with the system directed audio detector 1140 to process ASR result data as it is ready and thus continually update an SDD result 1142. Once the system directed input detector 1085 has processed enough ASR results and/or the SDD result 1142 exceeds a threshold, the system may determine that the audio data 1011 includes system-directed speech. Similarly, once the system directed input detector 1085 has processed enough ASR results and/or the SDD result 1142 drops below another threshold, the system may determine that the audio data 1011 does not include system-directed speech.

The SDD result 1142 may be associated with a same unique ID as the audio data 1011 and VAD output 1121 for purposes of tracking system processing across various components.

The feature extractor 1130 may also incorporate in a feature vector 1131 representations of other data 1191. Other data 1191 may include, for example, word embeddings from words output by the ASR component 1050 may be considered. Word embeddings are vector representations of words or sequences of words that show how specific words may be used relative to other words, such as in a large text corpus. A word embedding may be of a different length depending on how many words are in a text segment represented by the word embedding. For purposes of the feature extractor 1130 processing and representing a word embedding in a feature vector 1131 (which may be of a fixed length), a word embedding of unknown length may be processed by a neural network with memory, such as an LSTM (long short term memory) network. Each vector of a word embedding may be processed by the LSTM which may then output a fixed representation of the input word embedding vectors.

Other data 1191 may also include, for example, NLU output from the NLU component 1060 may be considered. Thus, if natural language output data 1385/1325 indicates a high correlation between the audio data 1011 and an out-of-domain indication (e.g., no intent classifier scores from ICs 1364 or overall domain scores from recognizers 1363 reach a certain confidence threshold), this may indicate that the audio data 1011 does not include system-directed speech. Other data 1191 may also include, for example, an indicator of a user/speaker as output user-recognition component 1095. Thus, for example, if the user-recognition component 1095 does not indicate the presence of a known user, or indicates the presence of a user associated with audio data 1011 that was not associated with a previous utterance, this may indicate that the audio data 1011 does not include system-directed speech. The other data 1191 may also include an indication that a voice represented in audio data 1011 is the same (or different) as the voice detected in previous input audio data corresponding to a previous utterance. The other data 1191 may also include directionality data, for example using beamforming or other audio processing techniques to determine a direction/location of a source of detected speech and whether that source direction/location matches a speaking user. The other data 1191 may also include data indicating that a direction of a user's speech is toward a device 110 or away from a device 110, which may indicate whether the speech was system directed or not.

Other data 1191 may also include image data 105. For example, if image data is detected from one or more devices that are nearby to the device 110 (which may include the device 110 itself) that captured the audio data being processed using the system directed input detector (1085), the image data may be processed to determine whether a user is facing an audio capture device for purposes of determining whether speech is system-directed as further explained below.

Other data 1191 may also dialog history data. For example, the other data 1191 may include information about whether a speaker has changed from a previous utterance to the current audio data 1011, whether a topic of conversation has changed from a previous utterance to the current audio data, how NLU results from a previous utterance compare to NLU results obtained using the current audio data 1011, other system context information. The other data 1191 may also include an indicator as to whether the audio data 1011 was received as a result of a wake command or whether the audio data 1011 was sent without the device 110 detecting a wake command (e.g., the device 110 being instructed by remote system 120 and/or determining to send the audio data without first detecting a wake command).

Other data 1191 may also include information from the user profile 270.

Other data 1191 may also include direction data, for example data regarding a direction of arrival of speech detected by the device, for example a beam index number, angle data, or the like. If second audio data is received from a different direction than first audio data, then the system may be less likely to declare the second audio data to include system-directed speech since it is originating from a different location.

Other data 1191 may also include acoustic feature data such as pitch, prosody, intonation, volume, or other data descriptive of the speech in the audio data 1011. As a user may use a different vocal tone to speak with a machine than with another human, acoustic feature information may be useful in determining if speech is device-directed.

Other data 1191 may also include an indicator that indicates whether the audio data 1011 includes a wakeword. For example, if a device 110 detects a wakeword prior to sending the audio data 1011 to the remote system 120, the device 110 may send along an indicator that the device 110 detected a wakeword in the audio data 1011. In another example, the remote system 120 may include another component that processes incoming audio data 1011 to determine if it includes a wakeword. If it does, the component may create an indicator indicating that the audio data 1011 includes a wakeword. The indicator may then be included in other data 1191 to be incorporated in the feature vector 1131 and/or otherwise considered by the system directed audio detector 1140.

Other data 1191 may also include device history data such as information about previous operations related to the device 110 that sent the audio data 1011. For example, the other data 1191 may include information about a previous utterance that was just executed, where the utterance originated with the same device 110 as a current utterance and the previous utterance was within a certain time window of the current utterance. Device history data may be stored in a manner associated with the device identifier (which may also be included in other data 1191), which may also be used to track other information about the device, such as device hardware, capability, location, etc.

The other data 1191 used by the VAD 1120 may include similar data and/or different data from the other data 1191 used by the feature extractor 1130. The other data 1191 may thus include a variety of data corresponding to input audio from a previous utterance. That data may include acoustic data from a previous utterance, speaker ID/voice identification data from a previous utterance, information about the time between a previous utterance and a current utterance, or a variety of other data described herein taken from a previous utterance. A score threshold (for the system directed audio detector 1140 and/or the VAD 1120) may be based on the data from the previous utterance. For example, a score threshold (for the system directed audio detector 1140 and/or the VAD 1120) may be based on acoustic data from a previous utterance.

The feature extractor 1130 may output a single feature vector 1131 for one utterance/instance of input audio data 1011. The feature vector 1131 may consistently be a fixed length, or may be a variable length vector depending on the relevant data available for particular audio data 1011. Thus, the system directed audio detector 1140 may output a single SDD result 1142 per utterance/instance of input audio data 1011. The SDD result 1142 may be a binary indicator. Thus, if the incoming audio data 1011 includes system-directed speech, the system directed audio detector 1140 may output an indicator 1142 that the audio data 1011 does includes system-directed speech (e.g., a 1) and if the incoming audio data 1011 does not includes system-directed speech, the system directed audio detector 1140 may output an indicator 1142 that the audio data 1011 does not system-directed includes speech (e.g., a 0). The SDD result 1142 may also be a score (e.g., a number between 0 and 1) corresponding to a likelihood that the audio data 1011 includes system-directed speech. Although not illustrated in FIG. 11, the flow of data to and from the system directed input detector 1085 may be managed by the orchestrator component 1030 or by one or more other components.

The trained model(s) of the system directed audio detector 1140 may be trained on many different examples of SDD feature vectors that include both positive and negative training samples (e.g., samples that both represent system-directed speech and non-system directed speech) so that the DNN and/or other trained model of the system directed audio detector 1140 may be capable of robustly detecting when speech is system-directed versus when speech is not system-directed.

A further input to the system directed input detector 1085 may include output data from TTS component 1080 to avoid synthesized speech output by the system being confused as system-directed speech spoken by a user. The output from the TTS component 1080 may allow the system to ignore synthesized speech in its considerations of whether speech was system directed. The output from the TTS component 1080 may also allow the system to determine whether a user captured utterance is responsive to the TTS output, thus improving system operation.

The system directed input detector 1085 may also use echo return loss enhancement (ERLE) and/or acoustic echo cancellation (AEC) data to avoid processing of audio data generated by the system.

As shown in FIG. 11, the system directed input detector 1085 may simply use audio data to determine whether an input is system directed (for example, system directed audio detector 1140 may output an SDD result 1142). This may be true particularly when no image data is available (for example for a device without a camera). If image data 105 is available, however, the system may also be configured to use image data 105 to determine if an input is system directed. The image data 105 may include image data captured by device 110 and/or image data captured by other device(s) in the environment of device 110. The audio data 1011, image data 105 and other data 1181 may be time-stamped or otherwise correlated so that the system directed input detector 1085 may determine that the data being analyzed all relates to a same time window so as to ensure alignment of data considered with regard to whether a particular input is system directed. For example, the system directed input detector 1085 may determine system directedness scores for every frame of audio data/every image of a video stream and may align and/or window them to determine a single overall score for a particular input that corresponds to a group of audio frames/images.

Image data 105 along with other data 1181 may be received by feature extractor 1135. The feature extractor may create one or more feature vectors 1136 which may represent the image data 105/other data 1181. In certain examples, other data 1181 may include data from image processing component 1040 which may include information about faces, gesture, etc. detected in the image data 105. For example, user recognition data, motion data, proximity data, etc. For privacy protection purposes, in certain configurations any image processing/results thereof may be obtained from an image processing component 1040 located on device 110 or on a home remote component as opposed to a image processing component 1040 located on a cloud or other remote system 120 so that image data 105 is not sent remote from the user's home unless the system directed input detector component 1085 has determined that the input is system directed. Though this may be adjusted depending on user preferences/system configuration.

The feature vector 1136 may be passed to the user detector 1125. The user detector 1125 (which may use various components/operations of image processing component 1040, user-recognition component 1095, etc.) may be configured to process image data 105 and/or feature vector 1136 to determine information about the user's behavior which in turn may be used to determine if an input is system directed. For example, the user detector 1125 may be configured to determine the user's position/behavior with respect to device 110/system 100. The user detector 1125 may also be configured to determine whether a user's mouth is opening/closing in a manner that suggests the user is speaking. The user detector 1125 may also be configured to determine whether a user is nodding or shaking his/her head. The user detector 1125 may also be configured to determine whether a user's gaze is directed to the device 110, to another user, or to another object. For example, the user detector 1125 may include, or be configured to use data from, a gaze detection component 1265. The user detector 1125 may also be configured to determine gestures of the user such as a shoulder shrug, pointing toward an object, a wave, a hand up to indicate an instruction to stop, or a fingers moving to indicate an instruction to continue, holding up a certain number of fingers, putting a thumb up, etc. The user detector 1125 may also be configured to determine a user's position/orientation such as facing another user, facing the device 110, whether their back is turned, etc. The user detector 1125 may also be configured to determine relative positions of multiple users that appear in image data (and/or are speaking in audio data 1011 which may also be considered by the user detector 1125 along with feature vector 1131), for example which users are closer to a device 110 and which are farther away. The user detector 1125 (and/or other component) may also be configured to identify other objects represented in image data and determine whether objects are relevant to a dialog or system interaction (for example determining if a user is referring to an object through a movement or speech).

The user detector 1125 may operate one or more models (e.g., one or more classifiers) to determine if certain situations are represented in the image data 105. For example the user detector 1125 may employ a visual directedness classifier that may determine, for each face detected in the image data 105 whether that face is looking at the device 110 or not. For example, a light-weight convolutional neural network (CNN) may be used which takes a face image cropped from the result of the face detector as input and output a [0,1] score of how likely the face is directed to the camera or not. Another technique may include to determine a three-dimensional (3D) landmark of each face, estimate the 3d angle of the face and predict a directness score based on the 3d angle.

The user detector 1125 (or other component(s) such as those in image processing component 1040) may be configured to track a face in image data to determine which faces represented may belong to a same person. The system may user IOU based tracker, a mean-shift based tracker, a particle filter based tracker, or other technique.

The user detector 1125 (or other component(s) such as those in user-recognition component 1095) may be configured to determine whether a face represented in image data belongs to a person who is speaking or not, thus performing active speaker detection. The system may take the output from the face tracker and aggregate a sequence of face from the same person as input and predict whether this person is speaking or not. Lip motion, user ID, detected voice data, and other data may be used to determine whether a user is speaking or not.

The system directed image detector 1150 may then determine, based on information from the user detector 1125 as based on the image data whether an input relating to the image data is system directed. The system directed image detector 1150 may also operate on other input data, for example image data including raw image data 105, image data including feature data 1136 based on raw image data, other data 1181, or other data. The determination by the system directed image detector 1150 may result in a score indicating whether the input is system directed based on the image data. If no audio data is available, the indication may be output as SDD result 1142. If audio data is available, the indication may be sent to system directed detector 1170 which may consider information from both system directed audio detector 1140 and system directed image detector 1150. The system directed detector 1170 may then process the data from both system directed audio detector 1140 and system directed image detector 1150 to come up with an overall determination as to whether an input was system directed, which may be output as SDD result 1142. The system directed detector 1170 may consider not only data output from system directed audio detector 1140 and system directed image detector 1150 but also other data/metadata corresponding to the input (for example, image data/feature data 1136, audio data/feature data 1131, image data 105, audio data 1011, or the like discussed with regard to FIG. 11. The system directed detector 1170 may include one or more models which may analyze the various input data to make a determination regarding SDD result 1142.

In one example the determination of the system directed detector 1170 may be based on "AND" logic, for example determining an input is system directed only if affirmative data is received from both system directed audio detector 1140 and system directed image detector 1150. In another example the determination of the system directed detector 1170 may be based on "OR" logic, for example determining an input is system directed if affirmative data is received from either system directed audio detector 1140 or system directed image detector 1150. In another example the data received from system directed audio detector 1140 and system directed image detector 1150 are weighted individually based on other information available to system directed detector 1170 to determine to what extend audio and/or image data should impact the decision of whether an input is system directed.

The system directed input detector 1085 may also receive information from a wakeword detection component 1020. For example, an indication that a wakeword was detected (e.g., WW data 1144) may be considered by the system directed input detector 1085 (e.g., by system directed audio detector 1140, system directed detector 1170, etc.) as part of the overall consideration of whether a system input was device directed. Detection of a wakeword may be considered a strong signal that a particular input was device directed.

If an input is determined to be system directed, the data related to the input may be sent to downstream components for further processing (e.g., to the language processing component 1092). If an input is determined not to be system directed, the system may take no further action regarding the data related to the input and may allow it to be deleted. In certain configurations, to maintain privacy, the operations to determine whether an input is system directed are performed by device 110 (or home server(s) 120) and only if the input is determined to be system directed is further data (such as audio data 1011 or image data 105) sent to a remote system 120 that is outside a user's home or other direct control.

In multi-user dialog mode (MUD) the system may operate as follows to determine whether an input is system directed. The first turn of a MUD interaction begins, for example, with a wakeword triggered utterance to begin MUD mode. For example, "Alexa, begin multi-user dialog mode." The system 120 may then process that utterance using speech processing and determine an intent to enter the MUD mode. The system 120 may then direct the device 110 to enter into MUD mode, which may result in changing a mode of operation of the wakeword detection component 1020 and may also involve a visual or other indicator to be output by the device 110 to indicate that MUD mode is on, such as a different color light ring or line (which may indicate to the user(s) that a wakeword is not necessary for the system to process an input). This may then also activate certain components of the image processing component 1040 and/or system directed input detector 1085 to perform computer vision (CV) processing to identify face(s) in image data, perform gaze detection, etc. Entering MUD mode may also configure the device to more easily detect if a user is speaking during TTS output by the device 110, thus more easily allowing a user to "interrupt" the system.

While MUD mode is active the system directed input detector 1085 may process incoming image data 105, audio data 1011 and other data 1181 to determine if an input is system directed. If a system-directed input is detected, the system 120 may halt TTS output (or lower the volume of an ongoing TTS output) and may send the corresponding input/audio data may be processed by the system (for example by the language processing component 1092, dialog manager 1072, etc.) to determine how to process the input according to the ongoing dialog. The system may also process input data with user-recognition component 1095 to identify a user that is providing the input to the system (e.g., identify which user is speaking). The system may then customize its responses to the user, for example by identifying the user by name, considering the user's preferences to provide output data, etc. For example, if two users are engaged in a MUD dialog the system may say to one whose user profile data indicates a preference for pepperoni pizza "Jenn, for you I recommend the pepperoni pizza" but for another user whose user profile data indicates that the user is a vegetarian, the system may say "Dave, for you I recommend the vegetarian pizza." Upon conclusion of MUD mode, the device 110 may return to normal operation, for example by disabling a visual indicator of MUD mode, returning the wakeword detection component 1020 to normal operation, etc.

Figure 12:
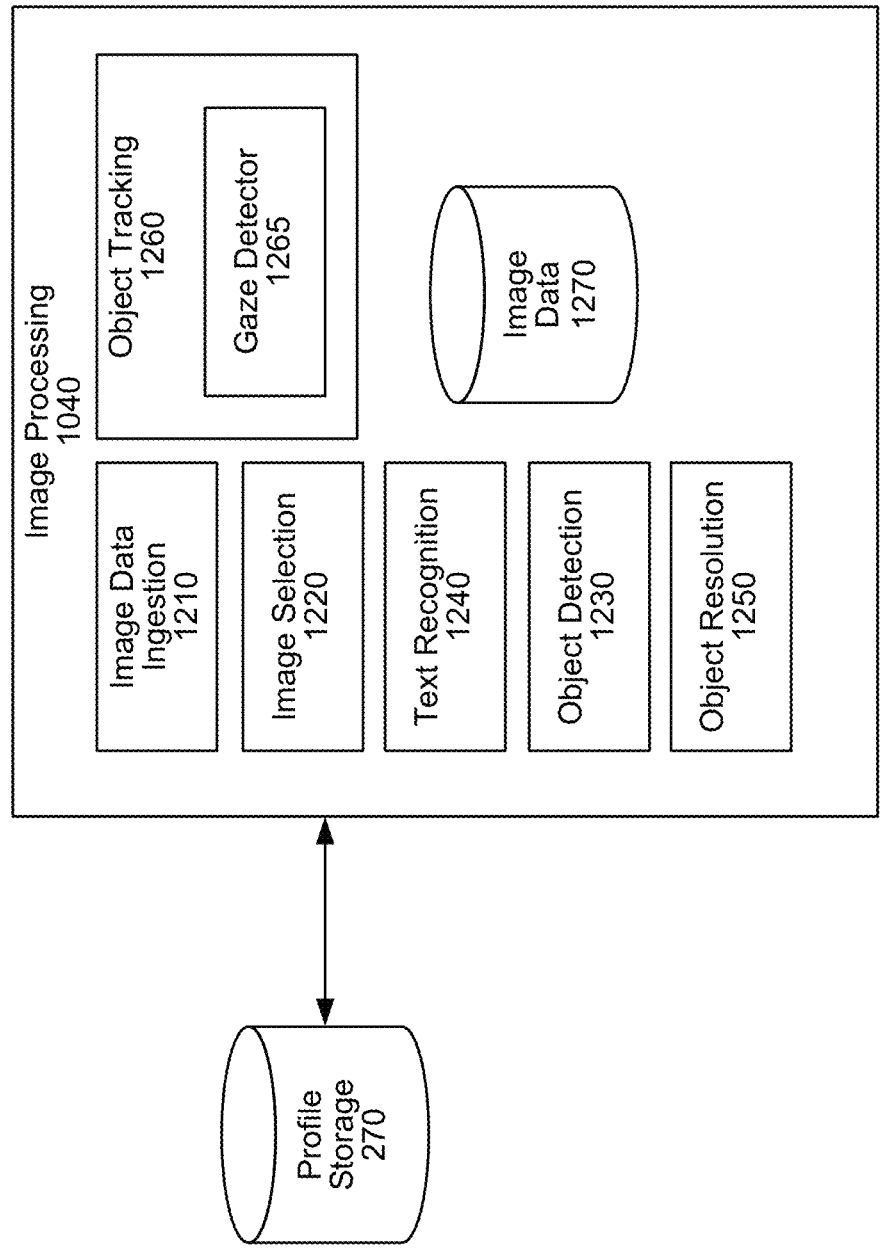
FIG. 12 is a conceptual diagram of components of an image processing component, according to embodiments of the present disclosure.

FIG. 12 is a conceptual diagram of components of an image processing component, according to embodiments of the present disclosure.

As shown in FIG. 12, the system(s) 120 may include image processing component 1040. The image processing component 1040 may located across different physical and/or virtual machines. The image processing component 1040 may receive and analyze image data (which may include single images or a plurality of images such as in a video feed). The image processing component 1040 may work with other components of the system 120 to perform various operations. For example the image processing component 1040 may work with user-recognition component 1095 to assist with user recognition using image data. The image processing component 1040 may also include or otherwise be associated with image data storage 1270 which may store aspects of image data used by image processing component 1040. The image data may be of different formats such as JPEG, GIF, BMP, MPEG, video formats, and the like.

Image matching algorithms, such as those used by image processing component 1040, may take advantage of the fact that an image of an object or scene contains a number of feature points. Feature points are specific points in an image which are robust to changes in image rotation, scale, viewpoint or lighting conditions. This means that these feature points will often be present in both the images to be compared, even if the two images differ. These feature points may also be known as "points of interest." Therefore, a first stage of the image matching algorithm may include finding these feature points in the image. An image pyramid may be constructed to determine the feature points of an image. An image pyramid is a scale-space representation of the image, e.g., it contains various pyramid images, each of which is a representation of the image at a particular scale. The scale-space representation enables the image matching algorithm to match images that differ in overall scale (such as images taken at different distances from an object). Pyramid images may be smoothed and downsampled versions of an original image.

To build a database of object images, with multiple objects per image, a number of different images of an object may be taken from different viewpoints. From those images, feature points may be extracted and pyramid images constructed. Multiple images from different points of view of each particular object may be taken and linked within the database (for example within a tree structure described below). The multiple images may correspond to different viewpoints of the object sufficient to identify the object from any later angle that may be included in a user's query image. For example, a shoe may look very different from a bottom view than from a top view than from a side view. For certain objects, this number of different image angles may be 6 (top, bottom, left side, right side, front, back), for other objects this may be more or less depending on various factors, including how many images should be taken to ensure the object may be recognized in an incoming query image. With different images of the object available, it is more likely that an incoming image from a user may be recognized by the system and the object identified, even if the user's incoming image is taken at a slightly different angle.

This process may be repeated for multiple objects. For large databases, such as an online shopping database where a user may submit an image of an object to be identified, this process may be repeated thousands, if not millions of times to construct a database of images and data for image matching. The database also may continually be updated and/or refined to account for a changing catalog of objects to be recognized.

When configuring the database, pyramid images, feature point data, and/or other information from the images or objects may be used to cluster features and build a tree of objects and images, where each node of the tree will keep lists of objects and corresponding features. The tree may be configured to group visually significant subsets of images/features to ease matching of submitted images for object detection. Data about objects to be recognized may be stored by the system in image data storage 1270, profile storage 270, or other storage component.

Image selection component 1220 may select desired images from input image data to use for image processing at runtime. For example, input image data may come from a series of sequential images, such as a video stream where each image is a frame of the video stream. These incoming images need to be sorted to determine which images will be selected for further object recognition processing as performing image processing on low quality images may result in an undesired user experience. To avoid such an undesirable user experience, the time to perform the complete recognition process, from first starting the video feed to delivering results to the user, should be as short as possible. As images in a video feed may come in rapid succession, the image processing component 1040 may be configured to select or discard an image quickly so that the system can, in turn, quickly process the selected image and deliver results to a user. The image selection component 1220 may select an image for object recognition by computing a metric/feature for each frame in the video feed and selecting an image for processing if the metric exceeds a certain threshold. While FIG. 12 illustrates image selection component 1220 as part of system 120, it may also be located on device 110 so that the device may select only desired image(s) to send to system 120, thus avoiding sending too much image data to system 120 (thus expending unnecessary computing/communication resources). Thus the device may select only the best quality images for purposes of image analysis.

The metrics used to select an image may be general image quality metrics (focus, sharpness, motion, etc.) or may be customized image quality metrics. The metrics may be computed by software components or hardware components. For example, the metrics may be derived from output of device sensors such as a gyroscope, accelerometer, field sensors, inertial sensors, camera metadata, or other components. The metrics may thus be image based (such as a statistic derived from an image or taken from camera metadata like focal length or the like) or may be non-image based (for example, motion data derived from a gyroscope, accelerometer, GPS sensor, etc.). As images from the video feed are obtained by the system, the system, such as a device, may determine metric values for the image. One or more metrics may be determined for each image. To account for temporal fluctuation, the individual metrics for each respective image may be compared to the metric values for previous images in the image feed and thus a historical metric value for the image and the metric may be calculated. This historical metric may also be referred to as a historical metric value. The historical metric values may include representations of certain metric values for the image compared to the values for that metric for a group of different images in the same video feed. The historical metric(s) may be processed using a trained classifier model to select which images are suitable for later processing.

For example, if a particular image is to be measured using a focus metric, which is a numerical representation of the focus of the image, the focus metric may also be computed for the previous N frames to the particular image. N is a configurable number and may vary depending on system constraints such as latency, accuracy, etc. For example, N may be 30 image frames, representing, for example, one second of video at a video feed of 30 frames-per-second. A mean of the focus metrics for the previous N images may be computed, along with a standard deviation for the focus metric. For example, for an image number X+1 in a video feed sequence, the previous N images, may have various metric values associated with each of them. Various metrics such as focus, motion, and contrast are discussed, but others are possible. A value for each metric for each of the N images may be calculated, and then from those individual values, a mean value and standard deviation value may be calculated. The mean and standard deviation (STD) may then be used to calculate a normalized historical metric value, for example STD(metric)/MEAN(metric). Thus, the value of a historical focus metric at a particular image may be the STD divided by the mean for the focus metric for the previous N frames. For example, historical metrics (HIST) for focus, motion, and contrast may be expressed as:

$$HIST_{Focus} = \frac{STD_{Focus}}{MEAN_{Focus}}$$

$$HIST_{Motion} = \frac{STD_{Motion}}{MEAN_{Motion}}$$

$$HIST_{Contrast} = \frac{STD_{Contrast}}{MEAN_{Contrast}}$$

In one embodiment the historical metric may be further normalized by dividing the above historical metrics by the number of frames N, particularly in situations where there are small number of frames under consideration for the particular time window. The historical metrics may be recalculated with each new image frame that is received as part of the video feed. Thus each frame of an incoming video feed may have a different historical metric from the frame before. The metrics for a particular image of a video feed may be compared historical metrics to select a desirable image on which to perform image processing.

Image selection component 1220 may perform various operations to identify potential locations in an image that may contain recognizable text. This process may be referred to as glyph region detection. A glyph is a text character that has yet to be recognized. If a glyph region is detected, various metrics may be calculated to assist the eventual optical character recognition (OCR) process. For example, the same metrics used for overall image selection may be re-used or recalculated for the specific glyph region. Thus, while the entire image may be of sufficiently high quality, the quality of the specific glyph region (i.e. focus, contrast, intensity, etc.) may be measured. If the glyph region is of poor quality, the image may be rejected for purposes of text recognition.

Image selection component 1220 may generate a bounding box that bounds a line of text. The bounding box may bound the glyph region. Value(s) for image/region suitability metric(s) may be calculated for the portion of the image in the bounding box. Value(s) for the same metric(s) may also be calculated for the portion of the image outside the bounding box. The value(s) for inside the bounding box may then be compared to the value(s) outside the bounding box to make another determination on the suitability of the image. This determination may also use a classifier.

Additional features may be calculated for determining whether an image includes a text region of sufficient quality for further processing. The values of these features may also be processed using a classifier to determine whether the image contains true text character/glyphs or is otherwise suitable for recognition processing. To locally classify each candidate character location as a true text character/glyph location, a set of features that capture salient characteristics of the candidate location is extracted from the local pixel pattern. Such features may include aspect ratio (bounding box width/bounding box height), compactness ($4*\pi*$candidate glyph area/(perimeter)$^2$), solidity (candidate glyph area/bounding box area), stroke-width to width ratio (maximum stroke width/bounding box width), stroke-width to height ratio (maximum stroke width/bounding box height), convexity (convex hull perimeter/perimeter), raw compactness ($4*\pi*$(candidate glyph number of pixels)/(perimeter)$^2$), number of holes in candidate glyph, or other features. Other candidate region identification techniques may be used. For example, the system may use techniques involving maximally stable extremal regions (MSERs). Instead of MSERs (or in conjunction with MSERs), the candidate locations may be identified using histogram of oriented gradients (HoG) and Gabor features.

If an image is sufficiently high quality it may be selected by image selection 1220 for sending to another component (e.g., from device to system 120) and/or for further processing, such as text recognition, object detection/resolution, etc.

The feature data calculated by image selection component 1220 may be sent to other components such as text recognition component 1240, object detection component 1230, object resolution component 1250, etc. so that those components may use the feature data in their operations. Other preprocessing operations such as masking, binarization, etc. may be performed on image data prior to recognition/resolution operations. Those preprocessing operations may be performed by the device prior to sending image data or by system 120.

Object detection component 1230 may be configured to analyze image data to identify one or more objects represented in the image data. Various approaches can be used to attempt to recognize and identify objects, as well as to determine the types of those objects and applications or actions that correspond to those types of objects, as is known or used in the art. For example, various computer vision algorithms can be used to attempt to locate, recognize, and/or identify various types of objects in an image or video sequence. Computer vision algorithms can utilize various different approaches, as may include edge matching, edge detection, recognition by parts, gradient matching, histogram comparisons, interpretation trees, and the like.

The object detection component 1230 may process at least a portion of the image data to determine feature data. The feature data is indicative of one or more features that are depicted in the image data. For example, the features may be face data, or other objects, for example as represented by stored data in profile storage 270. Other examples of features may include shapes of body parts or other such features that identify the presence of a human. Other examples of features may include edges of doors, shadows on the wall, texture on the walls, portions of artwork in the environment, and so forth to identify a space. The object detection component 1230 may compare detected features to stored data (e.g., in profile storage 270, image data storage 1270, or other storage) indicating how detected features may relate to known objects for purposes of object detection.

Various techniques may be used to determine the presence of features in image data. For example, one or more of a Canny detector, Sobel detector, difference of Gaussians, features from accelerated segment test (FAST) detector, scale-invariant feature transform (SIFT), speeded up robust features (SURF), color SIFT, local binary patterns (LBP), trained convolutional neural network, or other detection methodologies may be used to determine features in the image data. A feature that has been detected may have an associated descriptor that characterizes that feature. The descriptor may comprise a vector value in some implementations. For example, the descriptor may comprise data indicative of the feature with respect to many (e.g., 256) different dimensions.

One statistical algorithm that may be used for geometric matching of images is the Random Sample Consensus (RANSAC) algorithm, although other variants of RANSAC-like algorithms or other statistical algorithms may also be used. In RANSAC, a small set of putative correspondences is randomly sampled. Thereafter, a geometric transformation is generated using these sampled feature points. After generating the transformation, the putative correspondences that fit the model are determined. The putative correspondences that fit the model and are geometrically consistent and called "inliers." The inliers are pairs of feature points, one from each image, that may correspond to each other, where the pair fits the model within a certain comparison threshold for the visual (and other) contents of the feature points, and are geometrically consistent (as explained below relative to motion estimation). A total number of inliers may be determined. The above mentioned steps may be repeated until the number of repetitions/trials is greater than a predefined threshold or the number of inliers for the image is sufficiently high to determine an image as a match (for example the number of inliers exceeds a threshold). The RANSAC algorithm returns the model with the highest number of inliers corresponding to the model.

To further test pairs of putative corresponding feature points between images, after the putative correspondences are determined, a topological equivalence test may be performed on a subset of putative correspondences to avoid forming a physically invalid transformation. After the transformation is determined, an orientation consistency test may be performed. An offset point may be determined for the feature points in the subset of putative correspondences in one of the images. Each offset point is displaced from its corresponding feature point in the direction of the orientation of that feature point. The transformation is discarded based on orientation of the feature points obtained from the feature points in the subset of putative correspondences if any one of the images being matched and its offset point differs from an estimated orientation by a predefined limit. Subsequently, motion estimation may be performed using the subset of putative correspondences which satisfy the topological equivalence test.

Motion estimation (also called geometric verification) may determine the relative differences in position between corresponding pairs of putative corresponding feature points. A geometric relationship between putative corresponding feature points may determine where in one image (e.g., the image input to be matched) a particular point is found relative to that potentially same point in the putatively matching image (i.e., a database image). The geometric relationship between many putatively corresponding feature point pairs may also be determined, thus creating a potential map between putatively corresponding feature points across images. Then the geometric relationship of these points may be compared to determine if a sufficient number of points correspond (that is, if the geometric relationship between point pairs is within a certain threshold score for the geometric relationship), thus indicating that one image may represent the same real-world physical object, albeit from a different point of view. Thus, the motion estimation may determine that the object in one image is the same as the object in another image, only rotated by a certain angle or viewed from a different distance, etc.

The above processes of image comparing feature points and performing motion estimation across putative matching images may be performed multiple times for a particular query image to compare the query image to multiple potential matches among the stored database images. Dozens of comparisons may be performed before one (or more) satisfactory matches that exceed the relevant thresholds (for both matching feature points and motion estimation) may be found. The thresholds may also include a confidence threshold, which compares each potential matching image with a confidence score that may be based on the above processing. If the confidence score exceeds a certain high threshold, the system may stop processing additional candidate matches and simply select the high confidence match as the final match. Or if, the confidence score of an image is within a certain range, the system may keep the candidate image as a potential match while continuing to search other database images for potential matches. In certain situations, multiple database images may exceed the various matching/confidence thresholds and may be determined to be candidate matches. In this situation, a comparison of a weight or confidence score may be used to select the final match, or some combination of candidate matches may be used to return results. The system may continue attempting to match an image until a certain number of potential matches are identified, a certain confidence score is reached (either individually with a single potential match or among multiple matches), or some other search stop indicator is triggered. For example, a weight may be given to each object of a potential matching database image. That weight may incrementally increase if multiple query images (for example, multiple frames from the same image stream) are found to be matches with database images of a same object. If that weight exceeds a threshold, a search stop indicator may be triggered and the corresponding object selected as the match.

Once an object is detected by object detection component 1230 the system may determine which object is actually seen using object resolution component 1250. Thus one component, such as object detection component 1230, may detect if an object is represented in an image while another component, object resolution component 1250 may determine which object is actually represented. Although illustrated as separate components, the system may also be configured so that a single component may perform both object detection and object resolution.

For example, when a database image is selected as a match to the query image, the object in the query image may be determined to be the object in the matching database image. An object identifier associated with the database image (such as a product ID or other identifier) may be used to return results to a user, along the lines of "I see you holding object X" along with other information, such giving the user information about the object. If multiple potential matches are returned (such as when the system can't determine exactly what object is found or if multiple objects appear in the query image) the system may indicate to the user that multiple potential matching objects are found and may return information/options related to the multiple objects.

In another example, object detection component 1230 may determine that a type of object is represented in image data and object resolution component 1250 may then determine which specific object is represented. The object resolution component 1250 may also make available specific data about a recognized object to further components so that further operations may be performed with regard to the resolved object.

Object detection component 1230 may be configured to process image data to detect a representation of an approximately two-dimensional (2D) object (such as a piece of paper) or a three-dimensional (3D) object (such as a face). Such recognition may be based on available stored data (e.g., 270, 1270, etc.) which in turn may have been provided through an image data ingestion process managed by image data ingestion component 1210. Various techniques may be used to determine the presence of features in image data. For example, one or more of a Canny detector, Sobel detector, difference of Gaussians, features from accelerated segment test (FAST) detector, scale-invariant feature transform (SIFT), speeded up robust features (SURF), color SIFT, local binary patterns (LBP), trained convolutional neural network, or other detection methodologies may be used to determine features in the image data. A feature that has been detected may have an associated descriptor that characterizes that feature. The descriptor may comprise a vector value in some implementations. For example, the descriptor may comprise data indicative of the feature with respect to many (e.g., 256) different dimensions.

In various embodiments, the object detection component 1230 may be configured to detect a user or a portion of a user (e.g., head, face, hands) in image data and determine an initial position and/or orientation of the user in the image data. Various approaches can be used to detect a user within the image data. Techniques for detecting a user can sometimes be characterized as either feature-based or appearance-based. Feature-based approaches generally involve extracting features from an image and applying various rules, metrics, or heuristics to determine whether a person is present in an image. Extracted features can be low-level image features, such as points (e.g., line intersections, high variance points, local curvature discontinuities of Gabor wavelets, inflection points of curves, local extrema of wavelet transforms, Harris corners, Shi Tomasi points), edges (e.g., Canny edges, Shen-Castan (ISEF) edges), or regions of interest (e.g., blobs, Laplacian of Gaussian blobs, Difference of Gaussian blobs, Hessian blobs, maximally stable extremum regions (MSERs)). An example of a low-level image feature-based approach for user detection is the grouping of edges method. In the grouping of edges method, an edge map (generated via, e.g., a Canny detector, Sobel filter, Marr-Hildreth edge operator) and heuristics are used to remove and group edges from an input image so that only the edges of the contour of a face remain. A box or ellipse is then fit to the boundary between the head region and the background. Low-level feature-based methods can also be based on gray level information or skin color. For example, facial features such as eyebrows, pupils, and lips generally appear darker than surrounding regions of the face and this observation can be used to detect a face within an image. In one such approach, a low resolution Gaussian or Laplacian of an input image is utilized to locate linear sequences of similarly oriented blobs and streaks, such as two dark blobs and three light blobs to represent eyes, cheekbones, and nose and streaks to represent the outline of the face, eyebrows, and lips. Geometric rules can be applied to analyze the spatial relationships among the blobs and streaks to verify whether a person is located in the image. Skin color can also be used as a basis for detecting and/or tracking a user because skin color comprises a limited range of the color spectrum that can be relatively efficient to locate in an image.

Extracted features can also be based on higher-level characteristics or features of a user, such as eyes, nose, and/or mouth. Certain high-level feature-based methods can be characterized as top-down or bottom-up. A top-down approach first attempts to detect a particular user feature (e.g., head or face) and then validates existence of a person in an image by detecting constituent components of that user feature (e.g., eyes, nose, mouth). In contrast, a bottom-up approach begins by extracting the constituent components first and then confirming the presence of a person based on the constituent components being correctly arranged. For example, one top-down feature-based approach is the multi-resolution rule-based method. In this embodiment, a person is detected as present within an image by generating from the image a set of pyramidal or hierarchical images that are convolved and subsampled at each ascending level of the image pyramid or hierarchy (e.g., Gaussian pyramid, Difference of Gaussian pyramid, Laplacian pyramid). At the highest level, comprising the lowest resolution image of the image pyramid or hierarchy, the most general set of rules can be applied to find whether a user is represented. An example set of rules for detecting a face may include the upper round part of a face comprising a set of pixels of uniform intensity, the center part of a face comprising a set of pixels of a second uniform intensity, and the difference between the intensities of the upper round part and the center part of the face being within a threshold intensity difference. The image pyramid or hierarchy is descended and face candidates detected at a higher level conforming to the rules for that level can be processed at finer resolutions at a lower level according to a more specific set of rules. An example set of rules at a lower level or higher resolution image of the pyramid or hierarchy can be based on local histogram equalization and edge detection, and rules for the lowest level or highest resolution image of the pyramid or hierarchy can be based on facial feature metrics. In another top-down approach, face candidates are located based on the Kanade projection method for locating the boundary of a face. In the projection method, an intensity profile of an input image is first analyzed along the horizontal axis, and two local minima are determined to be candidates for the left and right side of a head. The intensity profile along the vertical axis is then evaluated and local minima are determined to be candidates for the locations of the mouth, nose, and eyes. Detection rules for eyebrow/eyes, nostrils/nose, and mouth or similar approaches can be used to validate whether the candidate is indeed a face.

Some feature-based and appearance-based methods use template matching to determine whether a user is represented in an image. Template matching is based on matching a pre-defined face pattern or parameterized function to locate the user within an image. Templates are typically prepared manually "offline." In template matching, correlation values for the head and facial features are obtained by comparing one or more templates to an input image, and the presence of a face is determined from the correlation values. One template-based approach for detecting a user within an image is the Yuille method, which matches a parameterized face template to face candidate regions of an input image. Two additional templates are used for matching the eyes and mouth respectively. An energy function is defined that links edges, peaks, and valleys in the image intensity profile to the corresponding characteristics in the templates, and the energy function is minimized by iteratively adjusting the parameters of the template to the fit to the image. Another template-matching method is the active shape model (ASM). ASMs statistically model the shape of the deformable object (e.g., user's head, face, other user features) and are built offline with a training set of images having labeled landmarks. The shape of the deformable object can be represented by a vector of the labeled landmarks. The shape vector can be normalized and projected onto a low dimensional subspace using principal component analysis (PCA). The ASM is used as a template to determine whether a person is located in an image. The ASM has led to the use of Active Appearance Models (AAMs), which further include defining a texture or intensity vector as part of the template. Based on a point distribution model, images in the training set of images can be transformed to the mean shape to produce shape-free patches. The intensities from these patches can be sampled to generate the intensity vector, and the dimensionality of the intensity vector may be reduced using PCA. The parameters of the AAM can be optimized and the AAM can be fit to an object appearing in the new image using, for example, a gradient descent technique or linear regression.

Various other appearance-based methods can also be used to locate whether a user is represented in an image. Appearance-based methods typically use classifiers that are trained from positive examples of persons represented in images and negative examples of images with no persons. Application of the classifiers to an input image can determine whether a user exists in an image. Appearance-based methods can be based on PCA, neural networks, support vector machines (SVMs), naïve Bayes classifiers, the Hidden Markov model (HMM), inductive learning, adaptive boosting (Adaboost), among others. Eigenfaces are an example of an approach based on PCA. PCA is performed on a training set of images known to include faces to determine the eigenvectors of the covariance matrix of the training set. The Eigenfaces span a subspace called the "face space." Images of faces are projected onto the subspace and clustered. To detect a face of a person in an image, the distance between a region of the image and the "face space" is computed for all location in the image. The distance from the "face space" is used as a measure of whether image subject matter comprises a face and the distances from "face space" form a "face map." A face can be detected from the local minima of the "face map."

Neural networks are inspired by biological neural networks and consist of an interconnected group of functions or classifiers that process information using a connectionist approach. Neural networks change their structure during training, such as by merging overlapping detections within one network and training an arbitration network to combine the results from different networks. Examples of neural network-based approaches include Rowley's multilayer neural network, the autoassociative neural network, the probabilistic decision-based neural network (PDBNN), the sparse network of winnows (SNoW). A variation of neural networks are deep belief networks (DBNs) which use unsupervised pre-training to generate a neural network to first learn useful features, and training the DBN further by backpropagation with trained data.

Support vector machines (SVMs) operate under the principle of structural risk minimization, which aims to minimize an upper bound on the expected generalization error. An SVM seeks to find the optimal separating hyperplane constructed by support vectors, and is defined as a quadratic programming problem. The Naïve Bayes classifier estimates the local appearance and position of face patterns at multiple resolutions. At each scale, a face image is decomposed into subregions and the subregions are further decomposed according to space, frequency, and orientation. The statistics of each projected subregion are estimated from the projected samples to learn the joint distribution of object and position. A face is determined to be within an image if the likelihood ratio is greater than the ratio of prior probabilities; for example, if $$\frac{P(\text{image} \mid \text{object})}{P(\text{image} \mid \text{non-object})} > \frac{P(\text{non-object})}{P(\text{object})}.$$

In HMM-based approaches, face patterns are treated as sequences of observation vectors each comprising a strip of pixels. Each strip of pixels is treated as an observation or state of the HMM and boundaries between strips of pixels are represented by transitions between observations or states according to statistical modeling. Inductive learning approaches, such as those based on Quinlan's C4.5 algorithm or Mitchell's Find-S algorithm, can also be used to detect the presence of persons in images.

AdaBoost is a machine learning boosting algorithm which finds a highly accurate hypothesis (i.e., low error rate) from a combination of many "weak" hypotheses (i.e., substantial error rate). Given a data set comprising examples within a class and not within the class and weights based on the difficulty of classifying an example and a weak set of classifiers, AdaBoost generates and calls a new weak classifier in each of a series of rounds. For each call, the distribution of weights is updated that indicates the importance of examples in the data set for the classification. On each round, the weights of each incorrectly classified example are increased, and the weights of each correctly classified example is decreased so the new classifier focuses on the difficult examples (i.e., those examples have not been correctly classified). An example of an AdaBoost-based approach is the Viola-Jones detector.

After at least a portion of a user has been detected in image data captured by a computing device, approaches in accordance with various embodiments track the detected portion of the user, for example using object tracking component 1260. The object tracking component 1260, gaze detection component 1265, or other component(s), may use user recognition data or other information related to the user-recognition component to identify and/or track a user using image data.

Object tracking component 1260 may also include a gaze detection component 1265. The gaze detection component 1265 may also be located elsewhere in the system design. The gaze detection component 1265 may include a classifier or other component (for example including one or more trained model(s)) that is configured to track the gaze of a user using image data and/or feature data corresponding to image data. The gaze detection component 1265 may output data indicating that a user is looking at a device or looking elsewhere (for example at another user). If operated on device 110, the gaze detection component 1265 may process image data (which may including raw image data captured by a camera or may include feature data representing raw image data) to determine that the user is gazing at a camera of the device. If operated on another device, the gaze detection component 1265 may process image data to determine a user is looking at device 110, for example looking at device 110 while speaking an utterance. In this manner processing by a second device may be used to determine that a user is looking at a first device while speaking to the first device. Thus, for example, in a smart-home situation image data from a camera removed from a speech-capture device (e.g., device 110) may be used to determine a user was looking at the speech-capture device when speaking. Data from the gaze detection component 1265 may be used, for example, by system directed input detector 1085.

Figure 13:
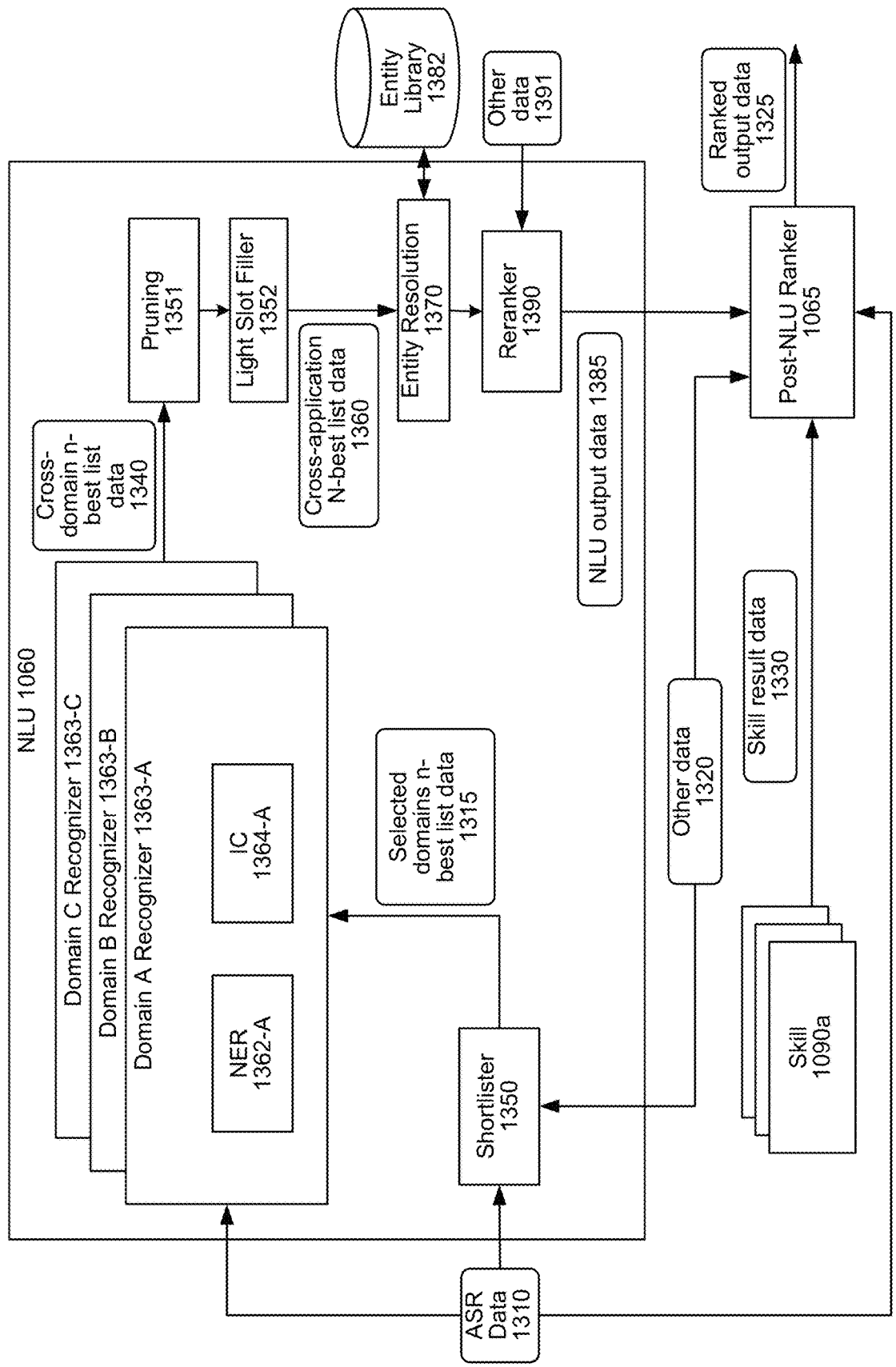
FIG. 13 is a conceptual diagram of how natural language processing is performed, according to embodiments of the present disclosure.

FIG. 13 is a conceptual diagram of how natural language processing is performed, according to embodiments of the present disclosure. The NLU component 1060 may process text data including several ASR hypotheses of a single user input. For example, if the ASR component 1050 outputs text data including an n-best list of ASR hypotheses, the NLU component 1060 may process the text data with respect to all (or a portion of) the ASR hypotheses represented therein.

The NLU component 1060 may annotate text data by parsing and/or tagging the text data. For example, for the text data "tell me the weather for Seattle," the NLU component 1060 may tag "tell me the weather for Seattle" as an <OutputWeather> intent as well as separately tag "Seattle" as a location for the weather information.

The NLU component 1060 may include a shortlister component 1350. The shortlister component 1350 selects skills that may execute with respect to ASR output data 1310 input to the NLU component 1060 (e.g., applications that may execute with respect to the user input). The ASR output data 1310 (which may also be referred to as ASR data 1310) may include representations of text of an utterance, such as words, subword units, or the like. The shortlister component 1350 thus limits downstream, more resource intensive NLU processes to being performed with respect to skills that may execute with respect to the user input.

Without a shortlister component 1350, the NLU component 1060 may process ASR output data 1310 input thereto with respect to every skill of the system, either in parallel, in series, or using some combination thereof. By implementing a shortlister component 1350, the NLU component 1060 may process ASR output data 1310 with respect to only the skills that may execute with respect to the user input. This reduces total compute power and latency attributed to NLU processing.

The shortlister component 1350 may include one or more trained models. The model(s) may be trained to recognize various forms of user inputs that may be received by the system(s) 120. For example, during a training period skill system(s) 125 associated with a skill may provide the system(s) 120 with training text data representing sample user inputs that may be provided by a user to invoke the skill. For example, for a ride sharing skill, a skill system(s) 125 associated with the ride sharing skill may provide the system(s) 120 with training text data including text corresponding to "get me a cab to [location]," "get me a ride to [location]," "book me a cab to [location]," "book me a ride to [location]," etc. The one or more trained models that will be used by the shortlister component 1350 may be trained, using the training text data representing sample user inputs, to determine other potentially related user input structures that users may try to use to invoke the particular skill. During training, the system(s) 120 may solicit the skill system(s) 125 associated with the skill regarding whether the determined other user input structures are permissible, from the perspective of the skill system(s) 125, to be used to invoke the skill. The alternate user input structures may be derived by one or more trained models during model training and/or may be based on user input structures provided by different skills. The skill system(s) 125 associated with a particular skill may also provide the system(s) 120 with training text data indicating grammar and annotations. The system(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 1350 may be trained with respect to a different skill. Alternatively, the shortlister component 1350 may use one trained model per domain, such as one trained model for skills associated with a weather domain, one trained model for skills associated with a ride sharing domain, etc.

The system(s) 120 may use the sample user inputs provided by a skill system(s) 125, and related sample user inputs potentially determined during training, as binary examples to train a model associated with a skill associated with the skill system(s) 125. The model associated with the particular skill may then be operated at runtime by the shortlister component 1350. For example, some sample user inputs may be positive examples (e.g., user inputs that may be used to invoke the skill). Other sample user inputs may be negative examples (e.g., user inputs that may not be used to invoke the skill).

As described above, the shortlister component 1350 may include a different trained model for each skill of the system, a different trained model for each domain, or some other combination of trained model(s). For example, the shortlister component 1350 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 1350 to output indications of only a portion of the skills that the ASR output data 1310 may relate to. For example, a user input may correspond to "tell me about Tom Collins." If the model is clustered based on domain, the shortlister component 1350 may determine the user input corresponds to a recipe skill (e.g., a drink recipe) even though the user input may also correspond to an information skill (e.g., including information about a person named Tom Collins).

The NLU component 1060 may include one or more recognizers 1363. In at least some embodiments, a recognizer 1363 may be associated with a skill system 125 (e.g., the recognizer may be configured to interpret text data to correspond to the skill system 125). In at least some other examples, a recognizer 1363 may be associated with a domain such as smart home, video, music, weather, custom, etc. (e.g., the recognizer may be configured to interpret text data to correspond to the domain).

If the shortlister component 1350 determines ASR output data 1310 is potentially associated with multiple domains, the recognizers 1363 associated with the domains may process the ASR output data 1310, while recognizers 1363 not indicated in the shortlister component 1350's output may not process the ASR output data 1310. The "shortlisted" recognizers 1363 may process the ASR output data 1310 in parallel, in series, partially in parallel, etc. For example, if ASR output data 1310 potentially relates to both a communications domain and a music domain, a recognizer associated with the communications domain may process the ASR output data 1310 in parallel, or partially in parallel, with a recognizer associated with the music domain processing the ASR output data 1310.

Each recognizer 1363 may include a named entity recognition (NER) component 1362. The NER component 1362 attempts to identify grammars and lexical information that may be used to construe meaning with respect to text data input therein. The NER component 1362 identifies portions of text data that correspond to a named entity associated with a domain, associated with the recognizer 1363 implementing the NER component 1362. The NER component 1362 (or other component of the NLU component 1060) may also determine whether a word refers to an entity whose identity is not explicitly mentioned in the text data, for example "him," "her," "it" or other anaphora, exophora, or the like.

A downstream process called entity resolution (discussed in detail elsewhere herein) links a slot of text data to a specific entity known to the system. To perform entity resolution, the NLU component 1060 may utilize gazetteer information stored in an entity library storage 1382. The gazetteer information may be used to match text data (representing a portion of the user input) with text data representing known entities, such as song titles, contact names, etc. Gazetteers may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 1363 may also include an intent classification (IC) component 1364. An IC component 1364 parses text data to determine an intent(s) (associated with the domain associated with the recognizer 1363 implementing the IC component 1364) that potentially represents the user input. An intent represents to an action a user desires be performed. An IC component 1364 may communicate with a database 1374 of words linked to intents. For example, a music intent database may link words and phrases such as "quiet," "volume off," and "mute" to a <Mute> intent. An IC component 1364 identifies potential intents by comparing words and phrases in text data (representing at least a portion of the user input) to the words and phrases in an intents database 1374 (associated with the domain that is associated with the recognizer 1363 implementing the IC component 1364).

The intents identifiable by a specific IC component 1364 are linked to domain-specific (i.e., the domain associated with the recognizer 1363 implementing the IC component 1364) grammar frameworks with "slots" to be filled. Each slot of a grammar framework corresponds to a portion of text data that the system believes corresponds to an entity. For example, a grammar framework corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks may not be structured as sentences, but rather based on associating slots with grammatical tags.

For example, an NER component 1362 may parse text data to identify words as subject, object, verb, preposition, etc. based on grammar rules and/or models prior to recognizing named entities in the text data. An IC component 1364 (implemented by the same recognizer 1363 as the NER component 1362) may use the identified verb to identify an intent. The NER component 1362 may then determine a grammar model associated with the identified intent. For example, a grammar model for an intent corresponding to <PlayMusic> may specify a list of slots applicable to play the identified "object" and any object modifier (e.g., a prepositional phrase), such as {Artist Name}, {Album Name}, {Song name}, etc. The NER component 1362 may then search corresponding fields in a lexicon (associated with the domain associated with the recognizer 1363 implementing the NER component 1362), attempting to match words and phrases in text data the NER component 1362 previously tagged as a grammatical object or object modifier with those identified in the lexicon.

An NER component 1362 may perform semantic tagging, which is the labeling of a word or combination of words according to their type/semantic meaning. An NER component 1362 may parse text data using heuristic grammar rules, or a model may be constructed using techniques such as Hidden Markov Models, maximum entropy models, log linear models, conditional random fields (CRF), and the like. For example, an NER component 1362 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 1362 identifies "Play" as a verb based on a word database associated with the music domain, which an IC component 1364 (also implemented by the music domain recognizer) may determine corresponds to a <PlayMusic> intent. At this stage, no determination has been made as to the meaning of "mother's little helper" or "the rolling stones," but based on grammar rules and models, the NER component 1362 has determined the text of these phrases relates to the grammatical object (i.e., entity) of the user input represented in the text data.

An NER component 1362 may tag text data to attribute meaning thereto. For example, an NER component 1362 may tag "play mother's little helper by the rolling stones" as: {domain} Music, {intent}<PlayMusic>, {artist name} rolling stones, {media type} SONG, and {song title} mother's little helper. For further example, the NER component 1362 may tag "play songs by the rolling stones" as: {domain} Music, {intent}<PlayMusic>, {artist name} rolling stones, and {media type} SONG.

The shortlister component 1350 may receive ASR output data 1310 output from the ASR component 1050 or output from the device 110b (as illustrated in FIG. 13). The ASR component 1050 may embed the ASR output data 1310 into a form processable by a trained model(s) using sentence embedding techniques as known in the art. Sentence embedding results in the ASR output data 1310 including text in a structure that enables the trained models of the shortlister component 1350 to operate on the ASR output data 1310. For example, an embedding of the ASR output data 1310 may be a vector representation of the ASR output data 1310.

The shortlister component 1350 may make binary determinations (e.g., yes or no) regarding which domains relate to the ASR output data 1310. The shortlister component 1350 may make such determinations using the one or more trained models described herein above. If the shortlister component 1350 implements a single trained model for each domain, the shortlister component 1350 may simply run the models that are associated with enabled domains as indicated in a user profile associated with the device 110 and/or user that originated the user input.

The shortlister component 1350 may generate n-best list data 1315 representing domains that may execute with respect to the user input represented in the ASR output data 1310. The size of the n-best list represented in the n-best list data 1315 is configurable. In an example, the n-best list data 1315 may indicate every domain of the system as well as contain an indication, for each domain, regarding whether the domain is likely capable to execute the user input represented in the ASR output data 1310. In another example, instead of indicating every domain of the system, the n-best list data 1315 may only indicate the domains that are likely to be able to execute the user input represented in the ASR output data 1310. In yet another example, the shortlister component 1350 may implement thresholding such that the n-best list data 1315 may indicate no more than a maximum number of domains that may execute the user input represented in the ASR output data 1310. In an example, the threshold number of domains that may be represented in the n-best list data 1315 is ten. In another example, the domains included in the n-best list data 1315 may be limited by a threshold a score, where only domains indicating a likelihood to handle the user input is above a certain score (as determined by processing the ASR output data 1310 by the shortlister component 1350 relative to such domains) are included in the n-best list data 1315.

The ASR output data 1310 may correspond to more than one ASR hypothesis. When this occurs, the shortlister component 1350 may output a different n-best list (represented in the n-best list data 1315) for each ASR hypothesis. Alternatively, the shortlister component 1350 may output a single n-best list representing the domains that are related to the multiple ASR hypotheses represented in the ASR output data 1310.

As indicated above, the shortlister component 1350 may implement thresholding such that an n-best list output therefrom may include no more than a threshold number of entries. If the ASR output data 1310 includes more than one ASR hypothesis, the n-best list output by the shortlister component 1350 may include no more than a threshold number of entries irrespective of the number of ASR hypotheses output by the ASR component 1050. Alternatively or in addition, the n-best list output by the shortlister component 1350 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 1310, the shortlister component 1350 may generate confidence scores representing likelihoods that domains relate to the ASR output data 1310. If the shortlister component 1350 implements a different trained model for each domain, the shortlister component 1350 may generate a different confidence score for each individual domain trained model that is run. If the shortlister component 1350 runs the models of every domain when ASR output data 1310 is received, the shortlister component 1350 may generate a different confidence score for each domain of the system. If the shortlister component 1350 runs the models of only the domains that are associated with skills indicated as enabled in a user profile associated with the device 110 and/or user that originated the user input, the shortlister component 1350 may only generate a different confidence score for each domain associated with at least one enabled skill. If the shortlister component 1350 implements a single trained model with domain specifically trained portions, the shortlister component 1350 may generate a different confidence score for each domain who's specifically trained portion is run. The shortlister component 1350 may perform matrix vector modification to obtain confidence scores for all domains of the system in a single instance of processing of the ASR output data 1310.

N-best list data 1315 including confidence scores that may be output by the shortlister component 1350 may be represented as, for example:

Search domain, 0.67
Recipe domain, 0.62
Information domain, 0.57
Shopping domain, 0.42

As indicated, the confidence scores output by the shortlister component 1350 may be numeric values. The confidence scores output by the shortlister component 1350 may alternatively be binned values (e.g., high, medium, low).

The n-best list may only include entries for domains having a confidence score satisfying (e.g., equaling or exceeding) a minimum threshold confidence score. Alternatively, the shortlister component 1350 may include entries for all domains associated with user enabled skills, even if one or more of the domains are associated with confidence scores that do not satisfy the minimum threshold confidence score.

The shortlister component 1350 may consider other data 1320 when determining which domains may relate to the user input represented in the ASR output data 1310 as well as respective confidence scores. The other data 1320 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 1320 may include an indicator of the user associated with the ASR output data 1310, for example as determined by the user-recognition component 1095.

The other data 1320 may be character embedded prior to being input to the shortlister component 1350. The other data 1320 may alternatively be embedded using other techniques known in the art prior to being input to the shortlister component 1350.

The other data 1320 may also include data indicating the domains associated with skills that are enabled with respect to the device 110 and/or user that originated the user input. The shortlister component 1350 may use such data to determine which domain-specific trained models to run. That is, the shortlister component 1350 may determine to only run the trained models associated with domains that are associated with user-enabled skills. The shortlister component 1350 may alternatively use such data to alter confidence scores of domains.

As an example, considering two domains, a first domain associated with at least one enabled skill and a second domain not associated with any user-enabled skills of the user that originated the user input, the shortlister component 1350 may run a first model specific to the first domain as well as a second model specific to the second domain. Alternatively, the shortlister component 1350 may run a model configured to determine a score for each of the first and second domains. The shortlister component 1350 may determine a same confidence score for each of the first and second domains in the first instance. The shortlister component 1350 may then alter those confidence scores based on which domains is associated with at least one skill enabled by the present user. For example, the shortlister component 1350 may increase the confidence score associated with the domain associated with at least one enabled skill while leaving the confidence score associated with the other domain the same. Alternatively, the shortlister component 1350 may leave the confidence score associated with the domain associated with at least one enabled skill the same while decreasing the confidence score associated with the other domain. Moreover, the shortlister component 1350 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 1070. When the shortlister component 1350 receives the ASR output data 1310, the shortlister component 1350 may determine whether profile data associated with the user and/or device 110 that originated the command includes an indication of enabled skills.

The other data 1320 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 1350 may use such data to determine which domain-specific trained models to run. For example, if the device 110 corresponds to a displayless type device, the shortlister component 1350 may determine not to run trained models specific to domains that output video data. The shortlister component 1350 may alternatively use such data to alter confidence scores of domains.

As an example, considering two domains, one that outputs audio data and another that outputs video data, the shortlister component 1350 may run a first model specific to the domain that generates audio data as well as a second model specific to the domain that generates video data. Alternatively the shortlister component 1350 may run a model configured to determine a score for each domain. The shortlister component 1350 may determine a same confidence score for each of the domains in the first instance. The shortlister component 1350 may then alter the original confidence scores based on the type of the device 110 that originated the user input corresponding to the ASR output data 1310. For example, if the device 110 is a displayless device, the shortlister component 1350 may increase the confidence score associated with the domain that generates audio data while leaving the confidence score associated with the domain that generates video data the same. Alternatively, if the device 110 is a displayless device, the shortlister component 1350 may leave the confidence score associated with the domain that generates audio data the same while decreasing the confidence score associated with the domain that generates video data. Moreover, if the device 110 is a displayless device, the shortlister component 1350 may increase the confidence score associated with the domain that generates audio data as well as decrease the confidence score associated with the domain that generates video data.

The type of device information represented in the other data 1320 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 1320 may represent the smart TV of other display device, and not the displayless device that captured the spoken user input.

The other data 1320 may also include data indicating the user input originating device's speed, location, or other mobility information. For example, the device may correspond to a vehicle including a display. If the vehicle is moving, the shortlister component 1350 may decrease the confidence score associated with a domain that generates video data as it may be undesirable to output video content to a user while the user is driving. The device may output data to the system(s) 120 indicating when the device is moving.

The other data 1320 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 1350 may use such data to alter confidence scores of domains. For example, the shortlister component 1350 may run a first model specific to a first domain as well as a second model specific to a second domain. Alternatively, the shortlister component 1350 may run a model configured to determine a score for each domain. The shortlister component 1350 may also determine a same confidence score for each of the domains in the first instance. The shortlister component 1350 may then alter the original confidence scores based on the first domain being invoked to cause the system to output content while the current user input was received. Based on the first domain being invoked, the shortlister component 1350 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 1315 generated by the shortlister component 1350 as well as the different types of other data 1320 considered by the shortlister component 1350 are configurable. For example, the shortlister component 1350 may update confidence scores as more other data 1320 is considered. For further example, the n-best list data 1315 may exclude relevant domains if thresholding is implemented. Thus, for example, the shortlister component 1350 may include an indication of a domain in the n-best list 1315 unless the shortlister component 1350 is one hundred percent confident that the domain may not execute the user input represented in the ASR output data 1310 (e.g., the shortlister component 1350 determines a confidence score of zero for the domain).

The shortlister component 1350 may send the ASR output data 1310 to recognizers 1363 associated with domains represented in the n-best list data 1315. Alternatively, the shortlister component 1350 may send the n-best list data 1315 or some other indicator of the selected subset of domains to another component (such as the orchestrator component 1030) which may in turn send the ASR output data 1310 to the recognizers 1363 corresponding to the domains included in the n-best list data 1315 or otherwise indicated in the indicator. If the shortlister component 1350 generates an n-best list representing domains without any associated confidence scores, the shortlister component 1350/orchestrator component 1030 may send the ASR output data 1310 to recognizers 1363 associated with domains that the shortlister component 1350 determines may execute the user input. If the shortlister component 1350 generates an n-best list representing domains with associated confidence scores, the shortlister component 1350/orchestrator component 1030 may send the ASR output data 1310 to recognizers 1363 associated with domains associated with confidence scores satisfying (e.g., meeting or exceeding) a threshold minimum confidence score.

A recognizer 1363 may output tagged text data generated by an NER component 1362 and an IC component 1364, as described herein above. The NLU component 1060 may compile the output tagged text data of the recognizers 1363 into a single cross-domain n-best list 1340 and may send the cross-domain n-best list 1340 to a pruning component 1351.

Each entry of tagged text (e.g., each NLU hypothesis) represented in the cross-domain n-best list data 1340 may be associated with a respective score indicating a likelihood that the NLU hypothesis corresponds to the domain associated with the recognizer 1363 from which the NLU hypothesis was output. For example, the cross-domain n-best list data 1340 may be represented as (with each line corresponding to a different NLU hypothesis):

[0.95] Intent: <PlayMusic> ArtistName: Beethoven SongName: Waldstein Sonata

[0.70] Intent: <PlayVideo> ArtistName: Beethoven VideoName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 1351 may sort the NLU hypotheses represented in the cross-domain n-best list data 1340 according to their respective scores. The pruning component 1351 may perform score thresholding with respect to the cross-domain NLU hypotheses. For example, the pruning component 1351 may select NLU hypotheses associated with scores satisfying (e.g., meeting and/or exceeding) a threshold score. The pruning component 1351 may also or alternatively perform number of NLU hypothesis thresholding. For example, the pruning component 1351 may select the top scoring NLU hypothesis(es). The pruning component 1351 may output a portion of the NLU hypotheses input thereto. The purpose of the pruning component 1351 is to create a reduced list of NLU hypotheses so that downstream, more resource intensive, processes may only operate on the NLU hypotheses that most likely represent the user's intent.

The NLU component 1060 may include a light slot filler component 1352. The light slot filler component 1352 can take text from slots represented in the NLU hypotheses output by the pruning component 1351 and alter them to make the text more easily processed by downstream components. The light slot filler component 1352 may perform low latency operations that do not involve heavy operations such as reference to a knowledge base (e.g., 1372. The purpose of the light slot filler component 1352 is to replace words with other words or values that may be more easily understood by downstream components. For example, if a NLU hypothesis includes the word "tomorrow," the light slot filler component 1352 may replace the word "tomorrow" with an actual date for purposes of downstream processing. Similarly, the light slot filler component 1352 may replace the word "CD" with "album" or the words "compact disc." The replaced words are then included in the cross-domain n-best list data 1360.

The cross-domain n-best list data 1360 may be input to an entity resolution component 1370. The entity resolution component 1370 can apply rules or other instructions to standardize labels or tokens from previous stages into an intent/slot representation. The precise transformation may depend on the domain. For example, for a travel domain, the entity resolution component 1370 may transform text corresponding to "Boston airport" to the standard BOS three-letter code referring to the airport. The entity resolution component 1370 can refer to a knowledge base (e.g., 1372) that is used to specifically identify the precise entity referred to in each slot of each NLU hypothesis represented in the cross-domain n-best list data 1360. Specific intent/slot combinations may also be tied to a particular source, which may then be used to resolve the text. In the example "play songs by the stones," the entity resolution component 1370 may reference a personal music catalog, Amazon Music account, a user profile, or the like. The entity resolution component 1370 may output an altered n-best list that is based on the cross-domain n-best list 1360 but that includes more detailed information (e.g., entity IDs) about the specific entities mentioned in the slots and/or more detailed slot data that can eventually be used by a skill. The NLU component 1060 may include multiple entity resolution components 1370 and each entity resolution component 1370 may be specific to one or more domains.

The entity resolution component 1370 may leverage object recognition data and/or gaze prediction data 141 in resolving entities in a natural language input. For example, the entity resolution component 1370 can use this data to resolve pronouns such as "him," "her," "this," "that," "it," etc. Gaze prediction data 141 indicating that the user 5 may be directing their gaze towards another person or an object (e.g., a user 5 exhibiting a Single, Refer, Share, etc. gaze pattern) may indicate that a partial name, nickname, or pronoun refers to that person or object. The object recognition data may indicate that an object referred to ambiguously is more likely to be one possible meaning (e.g., whether a "bike" is a bicycle or a motorcycle, whether a "text" is a book or an SMS message, etc.). Alternatively or additionally, the object recognition data and/or the gaze prediction data 141 may be included in the other data 1391 used by the reranker 1390 component in scoring NLU hypotheses.

The NLU component 1060 may include a reranker 1390. The reranker 1390 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 1370.

The reranker 1390 may apply re-scoring, biasing, or other techniques. The reranker 1390 may consider not only the data output by the entity resolution component 1370, but may also consider other data 1391. The other data 1391 may include a variety of information. For example, the other data 1391 may include object recognition and/or gaze prediction data 141. The reranker 1390 may use the gaze prediction data 141 to increase a rank of an NLU hypothesis that reflects or relates the user's 5 attention to a person or object in the image data 105. The other data 1391 may include skill rating or popularity data. For example, if one skill has a high rating, the reranker 1390 may increase the score of a NLU hypothesis that may be processed by the skill. The other data 1391 may also include information about skills that have been enabled by the user that originated the user input. For example, the reranker 1390 may assign higher scores to NLU hypothesis that may be processed by enabled skills than NLU hypothesis that may be processed by non-enabled skills. The other data 1391 may also include data indicating user usage history, such as if the user that originated the user input regularly uses a particular skill or does so at particular times of day. The other data 1391 may additionally include data indicating date, time, location, weather, type of device 110, user identifier, context, as well as other information. For example, the reranker 1390 may consider when any particular skill is currently active (e.g., music being played, a game being played, etc.).

As illustrated and described, the entity resolution component 1370 is implemented prior to the reranker 1390. The entity resolution component 1370 may alternatively be implemented after the reranker 1390. Implementing the entity resolution component 1370 after the reranker 1390 limits the NLU hypotheses processed by the entity resolution component 1370 to only those hypotheses that successfully pass through the reranker 1390.

The reranker 1390 may be a global reranker (e.g., one that is not specific to any particular domain). Alternatively, the NLU component 1060 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 1060 may perform NLU processing described above with respect to domains associated with skills wholly implemented as part of the system(s) 120 (e.g., designated 1090 in FIG. 10). The NLU component 1060 may separately perform NLU processing described above with respect to domains associated with skills that are at least partially implemented as part of the skill system(s) 125. In an example, the shortlister component 1350 may only process with respect to these latter domains. Results of these two NLU processing paths may be merged into NLU results data 1385, which may be sent to a post-NLU ranker 1065, which may be implemented by the system(s) 120.

The post-NLU ranker 1065 may include a statistical component that produces a ranked list of intent/skill pairs with associated confidence scores. Each confidence score may indicate an adequacy of the skill's execution of the intent with respect to NLU results data associated with the skill. The post-NLU ranker 1065 may operate one or more trained models configured to process the NLU results data 1385, skill result data 1330, and the other data 1320 in order to output ranked output data 1325. The ranked output data 1325 may include an n-best list where the NLU hypotheses in the NLU results data 1385 are reordered such that the n-best list in the ranked output data 1325 represents a prioritized list of skills to respond to a user input as determined by the post-NLU ranker 1065. The ranked output data 1325 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 1065 enables the system to better determine the best skill to execute the user input. For example, first and second NLU hypotheses in the NLU results data 1385 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 1065 (or other scheduling component such as orchestrator component 1030) may solicit the first skill and the second skill to provide potential result data 1330 based on the first NLU hypothesis and the second NLU hypothesis, respectively. For example, the post-NLU ranker 1065 may send the first NLU hypothesis to the first skill 1090a along with a request for the first skill 1090a to at least partially execute with respect to the first NLU hypothesis. The post-NLU ranker 1065 may also send the second NLU hypothesis to the second skill 1090b along with a request for the second skill 1090b to at least partially execute with respect to the second NLU hypothesis. The post-NLU ranker 1065 receives, from the first skill 1090a, first result data 1330a generated from the first skill 1090a's execution with respect to the first NLU hypothesis. The post-NLU ranker 1065 also receives, from the second skill 1090b, second results data 1330b generated from the second skill 1090b's execution with respect to the second NLU hypothesis.

The result data 1330 may include various portions. For example, the result data 1330 may include content (e.g., audio data, text data, and/or video data) to be output to a user. The result data 1330 may also include a unique identifier used by the system(s) 120 and/or the skill system(s) 125 to locate the data to be output to a user. The result data 1330 may also include an instruction. For example, if the user input corresponds to "turn on the light," the result data 1330 may include an instruction causing the system to turn on a light associated with a profile of the device (110a/110b) and/or user 5.

The post-NLU ranker 1065 may consider the first result data 1330a and the second result data 1330b to alter the first confidence score and the second confidence score of the first NLU hypothesis and the second NLU hypothesis, respectively. That is, the post-NLU ranker 1065 may generate a third confidence score based on the first result data 1330a and the first confidence score. The third confidence score may correspond to how likely the post-NLU ranker 1065 determines the first skill will correctly respond to the user input. The post-NLU ranker 1065 may also generate a fourth confidence score based on the second result data 1330b and the second confidence score. One skilled in the art will appreciate that a first difference between the third confidence score and the fourth confidence score may be greater than a second difference between the first confidence score and the second confidence score. The post-NLU ranker 1065 may also consider the other data 1320 to generate the third confidence score and the fourth confidence score. While it has been described that the post-NLU ranker 1065 may alter the confidence scores associated with first and second NLU hypotheses, one skilled in the art will appreciate that the post-NLU ranker 1065 may alter the confidence scores of more than two NLU hypotheses. The post-NLU ranker 1065 may select the result data 1330 associated with the skill 1090 with the highest altered confidence score to be the data output in response to the current user input. The post-NLU ranker 1065 may also consider the ASR output data 1310 to alter the NLU hypotheses confidence scores.

The orchestrator component 1030 may, prior to sending the NLU results data 1385 to the post-NLU ranker 1065, associate intents in the NLU hypotheses with skills 1090. For example, if a NLU hypothesis includes a <PlayMusic> intent, the orchestrator component 1030 may associate the NLU hypothesis with one or more skills 1090 that can execute the <PlayMusic> intent. Thus, the orchestrator component 1030 may send the NLU results data 1385, including NLU hypotheses paired with skills 1090, to the post-NLU ranker 1065. In response to ASR output data 1310 corresponding to "what should I do for dinner today," the orchestrator component 1030 may generates pairs of skills 1090 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 1065 queries each skill 1090, paired with a NLU hypothesis in the NLU results data 1385, to provide result data 1330 based on the NLU hypothesis with which it is associated. That is, with respect to each skill, the post-NLU ranker 1065 colloquially asks the each skill "if given this NLU hypothesis, what would you do with it." According to the above example, the post-NLU ranker 1065 may send skills 1090 the following data:

Skill 1: First NLU hypothesis including <Help> intent indicator
Skill 2: Second NLU hypothesis including <Order> intent indicator
Skill 3: Third NLU hypothesis including <DishType> intent indicator The post-NLU ranker 1065 may query each of the skills 1090 in parallel or substantially in parallel.

A skill 1090 may provide the post-NLU ranker 1065 with various data and indications in response to the post-NLU ranker 1065 soliciting the skill 1090 for result data 1330. A skill 1090 may simply provide the post-NLU ranker 1065 with an indication of whether or not the skill can execute with respect to the NLU hypothesis it received. A skill 1090 may also or alternatively provide the post-NLU ranker 1065 with output data generated based on the NLU hypothesis it received. In some situations, a skill 1090 may need further information in addition to what is represented in the received NLU hypothesis to provide output data responsive to the user input. In these situations, the skill 1090 may provide the post-NLU ranker 1065 with result data 1330 indicating slots of a framework that the skill 1090 further needs filled or entities that the skill 1090 further needs resolved prior to the skill 1090 being able to provided result data 1330 responsive to the user input. The skill 1090 may also provide the post-NLU ranker 1065 with an instruction and/or computer-generated speech indicating how the skill 1090 recommends the system solicit further information needed by the skill 1090. The skill 1090 may further provide the post-NLU ranker 1065 with an indication of whether the skill 1090 will have all needed information after the user provides additional information a single time, or whether the skill 1090 will need the user to provide various kinds of additional information prior to the skill 1090 having all needed information. According to the above example, skills 1090 may provide the post-NLU ranker 1065 with the following:

Skill 1: indication representing the skill can execute with respect to a NLU hypothesis including the <Help> intent indicator
Skill 2: indication representing the skill needs to the system to obtain further information
Skill 3: indication representing the skill can provide numerous results in response to the third NLU hypothesis including the <DishType> intent indicator Result data 1330 includes an indication provided by a skill 1090 indicating whether or not the skill 1090 can execute with respect to a NLU hypothesis; data generated by a skill 1090 based on a NLU hypothesis; as well as an indication provided by a skill 1090 indicating the skill 1090 needs further information in addition to what is represented in the received NLU hypothesis.

The post-NLU ranker 1065 uses the result data 1330 provided by the skills 1090 to alter the NLU processing confidence scores generated by the reranker 1390. That is, the post-NLU ranker 1065 uses the result data 1330 provided by the queried skills 1090 to create larger differences between the NLU processing confidence scores generated by the reranker 1390. Without the post-NLU ranker 1065, the system may not be confident enough to determine an output in response to a user input, for example when the NLU hypotheses associated with multiple skills are too close for the system to confidently determine a single skill 1090 to invoke to respond to the user input. For example, if the system does not implement the post-NLU ranker 1065, the system may not be able to determine whether to obtain output data from a general reference information skill or a medical information skill in response to a user input corresponding to "what is acne."

The post-NLU ranker 1065 may prefer skills 1090 that provide result data 1330 responsive to NLU hypotheses over skills 1090 that provide result data 1330 corresponding to an indication that further information is needed, as well as skills 1090 that provide result data 1330 indicating they can provide multiple responses to received NLU hypotheses. For example, the post-NLU ranker 1065 may generate a first score for a first skill 1090a that is greater than the first skill's NLU confidence score based on the first skill 1090a providing result data 1330a including a response to a NLU hypothesis. For further example, the post-NLU ranker 1065 may generate a second score for a second skill 1090b that is less than the second skill's NLU confidence score based on the second skill 1090b providing result data 1330b indicating further information is needed for the second skill 1090b to provide a response to a NLU hypothesis. Yet further, for example, the post-NLU ranker 1065 may generate a third score for a third skill 1090c that is less than the third skill's NLU confidence score based on the third skill 1090c providing result data 1330c indicating the third skill 1090c can provide multiple responses to a NLU hypothesis.

The post-NLU ranker 1065 may consider other data 1320 in determining scores. The other data 1320 may include rankings associated with the queried skills 1090. A ranking may be a system ranking or a user-specific ranking. A ranking may indicate a veracity of a skill from the perspective of one or more users of the system. For example, the post-NLU ranker 1065 may generate a first score for a first skill 1090a that is greater than the first skill's NLU processing confidence score based on the first skill 1090a being associated with a high ranking. For further example, the post-NLU ranker 1065 may generate a second score for a second skill 1090b that is less than the second skill's NLU processing confidence score based on the second skill 1090b being associated with a low ranking.

The other data 1320 may include information indicating whether or not the user that originated the user input has enabled one or more of the queried skills 1090. For example, the post-NLU ranker 1065 may generate a first score for a first skill 1090a that is greater than the first skill's NLU processing confidence score based on the first skill 1090a being enabled by the user that originated the user input. For further example, the post-NLU ranker 1065 may generate a second score for a second skill 1090b that is less than the second skill's NLU processing confidence score based on the second skill 1090b not being enabled by the user that originated the user input. When the post-NLU ranker 1065 receives the NLU results data 1385, the post-NLU ranker 1065 may determine whether profile data, associated with the user and/or device that originated the user input, includes indications of enabled skills.

The other data 1320 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 1065 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 1065 may increase the NLU processing confidence score associated with a first skill configured to output visual data and/or decrease the NLU processing confidence score associated with a second skill configured to output audio data.

The other data 1320 may include information indicating the veracity of the result data 1330 provided by a skill 1090. For example, if a user says "tell me a recipe for pasta sauce," a first skill 1090*a* may provide the post-NLU ranker 1065 with first result data 1330*a* corresponding to a first recipe associated with a five star rating and a second skill 1090*b* may provide the post-NLU ranker 1065 with second result data 1330*b* corresponding to a second recipe associated with a one star rating. In this situation, the post-NLU ranker 1065 may increase the NLU processing confidence score associated with the first skill 1090*a* based on the first skill 1090*a* providing the first result data 1330*a* associated with the five star rating and/or decrease the NLU processing confidence score associated with the second skill 1090*b* based on the second skill 1090*b* providing the second result data 1330*b* associated with the one star rating.

The other data 1320 may include information indicating the type of device that originated the user input. For example, the device may correspond to a "hotel room" type if the device is located in a hotel room. If a user inputs a command corresponding to "order me food" to the device located in the hotel room, the post-NLU ranker 1065 may increase the NLU processing confidence score associated with a first skill 1090*a* corresponding to a room service skill associated with the hotel and/or decrease the NLU processing confidence score associated with a second skill 1090*b* corresponding to a food skill not associated with the hotel.

The other data 1320 may include information indicating a location of the device and/or user that originated the user input. The system may be configured with skills 1090 that may only operate with respect to certain geographic locations. For example, a user may provide a user input corresponding to "when is the next train to Portland." A first skill 1090*a* may operate with respect to trains that arrive at, depart from, and pass through Portland, Oreg. A second skill 1090*b* may operate with respect to trains that arrive at, depart from, and pass through Portland, Me. If the device and/or user that originated the user input is located in Seattle, Wash., the post-NLU ranker 1065 may increase the NLU processing confidence score associated with the first skill 1090*a* and/or decrease the NLU processing confidence score associated with the second skill 1090*b*. Likewise, if the device and/or user that originated the user input is located in Boston, Mass., the post-NLU ranker 1065 may increase the NLU processing confidence score associated with the second skill 1090*b* and/or decrease the NLU processing confidence score associated with the first skill 1090*a*.

The other data 1320 may include information indicating a time of day. The system may be configured with skills 1090 that operate with respect to certain times of day. For example, a user may provide a user input corresponding to "order me food." A first skill 1090*a* may generate first result data 1330*a* corresponding to breakfast. A second skill 1090*b* may generate second result data 1330*b* corresponding to dinner. If the system(s) 120 receives the user input in the morning, the post-NLU ranker 1065 may increase the NLU processing confidence score associated with the first skill 1090*a* and/or decrease the NLU processing score associated with the second skill 1090*b*. If the system(s) 120 receives the user input in the afternoon or evening, the post-NLU ranker 1065 may increase the NLU processing confidence score associated with the second skill 1090*b* and/or decrease the NLU processing confidence score associated with the first skill 1090*a*.

The other data 1320 may include information indicating user preferences. The system may include multiple skills 1090 configured to execute in substantially the same manner. For example, a first skill 1090*a* and a second skill 1090*b* may both be configured to order food from respective restaurants. The system may store a user preference (e.g., in the profile storage 1070) that is associated with the user that provided the user input to the system(s) 120 as well as indicates the user prefers the first skill 1090*a* over the second skill 1090*b*. Thus, when the user provides a user input that may be executed by both the first skill 1090*a* and the second skill 1090*b*, the post-NLU ranker 1065 may increase the NLU processing confidence score associated with the first skill 1090*a* and/or decrease the NLU processing confidence score associated with the second skill 1090*b*.

The other data 1320 may include information indicating system usage history associated with the user that originated the user input. For example, the system usage history may indicate the user originates user inputs that invoke a first skill 1090*a* more often than the user originates user inputs that invoke a second skill 1090*b*. Based on this, if the present user input may be executed by both the first skill 1090*a* and the second skill 1090*b*, the post-NLU ranker 1065 may increase the NLU processing confidence score associated with the first skill 1090*a* and/or decrease the NLU processing confidence score associated with the second skill 1090*b*.

The other data 1320 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 1065 may increase the NLU processing confidence score associated with a first skill 1090*a* that generates audio data. The post-NLU ranker 1065 may also or alternatively decrease the NLU processing confidence score associated with a second skill 1090*b* that generates image data or video data.

The other data 1320 may include information indicating how long it took a skill 1090 to provide result data 1330 to the post-NLU ranker 1065. When the post-NLU ranker 1065 multiple skills 1090 for result data 1330, the skills 1090 may respond to the queries at different speeds. The post-NLU ranker 1065 may implement a latency budget. For example, if the post-NLU ranker 1065 determines a skill 1090 responds to the post-NLU ranker 1065 within a threshold amount of time from receiving a query from the post-NLU ranker 1065, the post-NLU ranker 1065 may increase the NLU processing confidence score associated with the skill 1090. Conversely, if the post-NLU ranker 1065 determines a skill 1090 does not respond to the post-NLU ranker 1065 within a threshold amount of time from receiving a query from the post-NLU ranker 1065, the post-NLU ranker 1065 may decrease the NLU processing confidence score associated with the skill 1090.

It has been described that the post-NLU ranker 1065 uses the other data 1320 to increase and decrease NLU processing confidence scores associated with various skills 1090 that the post-NLU ranker 1065 has already requested result data from. Alternatively, the post-NLU ranker 1065 may use the other data 1320 to determine which skills 1090 to request result data from. For example, the post-NLU ranker 1065 may use the other data 1320 to increase and/or decrease NLU processing confidence scores associated with skills 1090 associated with the NLU results data 1385 output by the NLU component 1060. The post-NLU ranker 1065 may select n-number of top scoring altered NLU processing confidence scores. The post-NLU ranker 1065 may then request result data 1330 from only the skills 1090 associated with the selected n-number of NLU processing confidence scores.

As described, the post-NLU ranker 1065 may request result data 1330 from all skills 1090 associated with the NLU results data 1385 output by the NLU component 1060. Alternatively, the system(s) 120 may prefer result data 1330 from skills implemented entirely by the system(s) 120 rather than skills at least partially implemented by the skill system(s) 125. Therefore, in the first instance, the post-NLU ranker 1065 may request result data 1330 from only skills associated with the NLU results data 1385 and entirely implemented by the system(s) 120. The post-NLU ranker 1065 may only request result data 1330 from skills associated with the NLU results data 1385, and at least partially implemented by the skill system(s) 125, if none of the skills, wholly implemented by the system(s) 120, provide the post-NLU ranker 1065 with result data 1330 indicating either data response to the NLU results data 1385, an indication that the skill can execute the user input, or an indication that further information is needed.

As indicated above, the post-NLU ranker 1065 may request result data 1330 from multiple skills 1090. If one of the skills 1090 provides result data 1330 indicating a response to a NLU hypothesis and the other skills provide result data 1330 indicating either they cannot execute or they need further information, the post-NLU ranker 1065 may select the result data 1330 including the response to the NLU hypothesis as the data to be output to the user. If more than one of the skills 1090 provides result data 1330 indicating responses to NLU hypotheses, the post-NLU ranker 1065 may consider the other data 1320 to generate altered NLU processing confidence scores, and select the result data 1330 of the skill associated with the greatest score as the data to be output to the user.

A system that does not implement the post-NLU ranker 1065 may select the highest scored NLU hypothesis in the NLU results data 1385. The system may send the NLU hypothesis to a skill 1090 associated therewith along with a request for output data. In some situations, the skill 1090 may not be able to provide the system with output data. This results in the system indicating to the user that the user input could not be processed even though another skill associated with lower ranked NLU hypothesis could have provided output data responsive to the user input.

The post-NLU ranker 1065 reduces instances of the aforementioned situation. As described, the post-NLU ranker 1065 queries multiple skills associated with the NLU results data 1385 to provide result data 1330 to the post-NLU ranker 1065 prior to the post-NLU ranker 1065 ultimately determining the skill 1090 to be invoked to respond to the user input. Some of the skills 1090 may provide result data 1330 indicating responses to NLU hypotheses while other skills 1090 may providing result data 1330 indicating the skills cannot provide responsive data. Whereas a system not implementing the post-NLU ranker 1065 may select one of the skills 1090 that could not provide a response, the post-NLU ranker 1065 only selects a skill 1090 that provides the post-NLU ranker 1065 with result data corresponding to a response, indicating further information is needed, or indicating multiple responses can be generated.

The post-NLU ranker 1065 may select result data 1330, associated with the skill 1090 associated with the highest score, for output to the user. Alternatively, the post-NLU ranker 1065 may output ranked output data 1325 indicating skills 1090 and their respective post-NLU ranker rankings. Since the post-NLU ranker 1065 receives result data 1330, potentially corresponding to a response to the user input, from the skills 1090 prior to post-NLU ranker 1065 selecting one of the skills or outputting the ranked output data 1325, little to no latency occurs from the time skills provide result data 1330 and the time the system outputs responds to the user.

If the post-NLU ranker 1065 selects result audio data to be output to a user and the system determines content should be output audibly, the post-NLU ranker 1065 (or another component of the system(s) 120) may cause the device 110*a* and/or the device 110*b* to output audio corresponding to the result audio data. If the post-NLU ranker 1065 selects result text data to output to a user and the system determines content should be output visually, the post-NLU ranker 1065 (or another component of the system(s) 120) may cause the device 110*b* to display text corresponding to the result text data. If the post-NLU ranker 1065 selects result audio data to output to a user and the system determines content should be output visually, the post-NLU ranker 1065 (or another component of the system(s) 120) may send the result audio data to the ASR component 1050. The ASR component 1050 may generate output text data corresponding to the result audio data. The system(s) 120 may then cause the device 110*b* to display text corresponding to the output text data. If the post-NLU ranker 1065 selects result text data to output to a user and the system determines content should be output audibly, the post-NLU ranker 1065 (or another component of the system(s) 120) may send the result text data to the TTS component 1080. The TTS component 1080 may generate output audio data (corresponding to computer-generated speech) based on the result text data. The system(s) 120 may then cause the device 110*a* and/or the device 110*b* to output audio corresponding to the output audio data.

As described, a skill 1090 may provide result data 1330 either indicating a response to the user input, indicating more information is needed for the skill 1090 to provide a response to the user input, or indicating the skill 1090 cannot provide a response to the user input. If the skill 1090 associated with the highest post-NLU ranker score provides the post-NLU ranker 1065 with result data 1330 indicating a response to the user input, the post-NLU ranker 1065 (or another component of the system(s) 120, such as the orchestrator component 1030) may simply cause content corresponding to the result data 1330 to be output to the user. For example, the post-NLU ranker 1065 may send the result data 1330 to the orchestrator component 1030. The orchestrator component 1030 may cause the result data 1330 to be sent to the device (110*a*/110*b*), which may output audio and/or display text corresponding to the result data 1330. The orchestrator component 1030 may send the result data 1330 to the ASR component 1050 to generate output text data and/or may send the result data 1330 to the TTS component 1080 to generate output audio data, depending on the situation.

The skill 1090 associated with the highest post-NLU ranker score may provide the post-NLU ranker 1065 with result data 1330 indicating more information is needed as well as instruction data. The instruction data may indicate how the skill 1090 recommends the system obtain the needed information. For example, the instruction data may correspond to text data or audio data (i.e., computer-generated speech) corresponding to "please indicate _____." The instruction data may be in a format (e.g., text data or audio data) capable of being output by the device (110a/110b). When this occurs, the post-NLU ranker 1065 may simply cause the received instruction data be output by the device (110a/110b). Alternatively, the instruction data may be in a format that is not capable of being output by the device (110a/110b). When this occurs, the post-NLU ranker 1065 may cause the ASR component 1050 or the TTS component 1080 to process the instruction data, depending on the situation, to generate instruction data that may be output by the device (110a/110b). Once the user provides the system with all further information needed by the skill 1090, the skill 1090 may provide the system with result data 1330 indicating a response to the user input, which may be output by the system as detailed above.

The system may include "informational" skills 1090 that simply provide the system with information, which the system outputs to the user. The system may also include "transactional" skills 1090 that require a system instruction to execute the user input. Transactional skills 1090 include ride sharing skills, flight booking skills, etc. A transactional skill 1090 may simply provide the post-NLU ranker 1065 with result data 1330 indicating the transactional skill 1090 can execute the user input. The post-NLU ranker 1065 may then cause the system to solicit the user for an indication that the system is permitted to cause the transactional skill 1090 to execute the user input. The user-provided indication may be an audible indication or a tactile indication (e.g., activation of a virtual button or input of text via a virtual keyboard). In response to receiving the user-provided indication, the system may provide the transactional skill 1090 with data corresponding to the indication. In response, the transactional skill 1090 may execute the command (e.g., book a flight, book a train ticket, etc.). Thus, while the system may not further engage an informational skill 1090 after the informational skill 1090 provides the post-NLU ranker 1065 with result data 1330, the system may further engage a transactional skill 1090 after the transactional skill 1090 provides the post-NLU ranker 1065 with result data 1330 indicating the transactional skill 1090 may execute the user input.

In some instances, the post-NLU ranker 1065 may generate respective scores for first and second skills that are too close (e.g., are not different by at least a threshold difference) for the post-NLU ranker 1065 to make a confident determination regarding which skill should execute the user input. When this occurs, the system may request the user indicate which skill the user prefers to execute the user input. The system may output TTS-generated speech to the user to solicit which skill the user wants to execute the user input.

Figure 14:
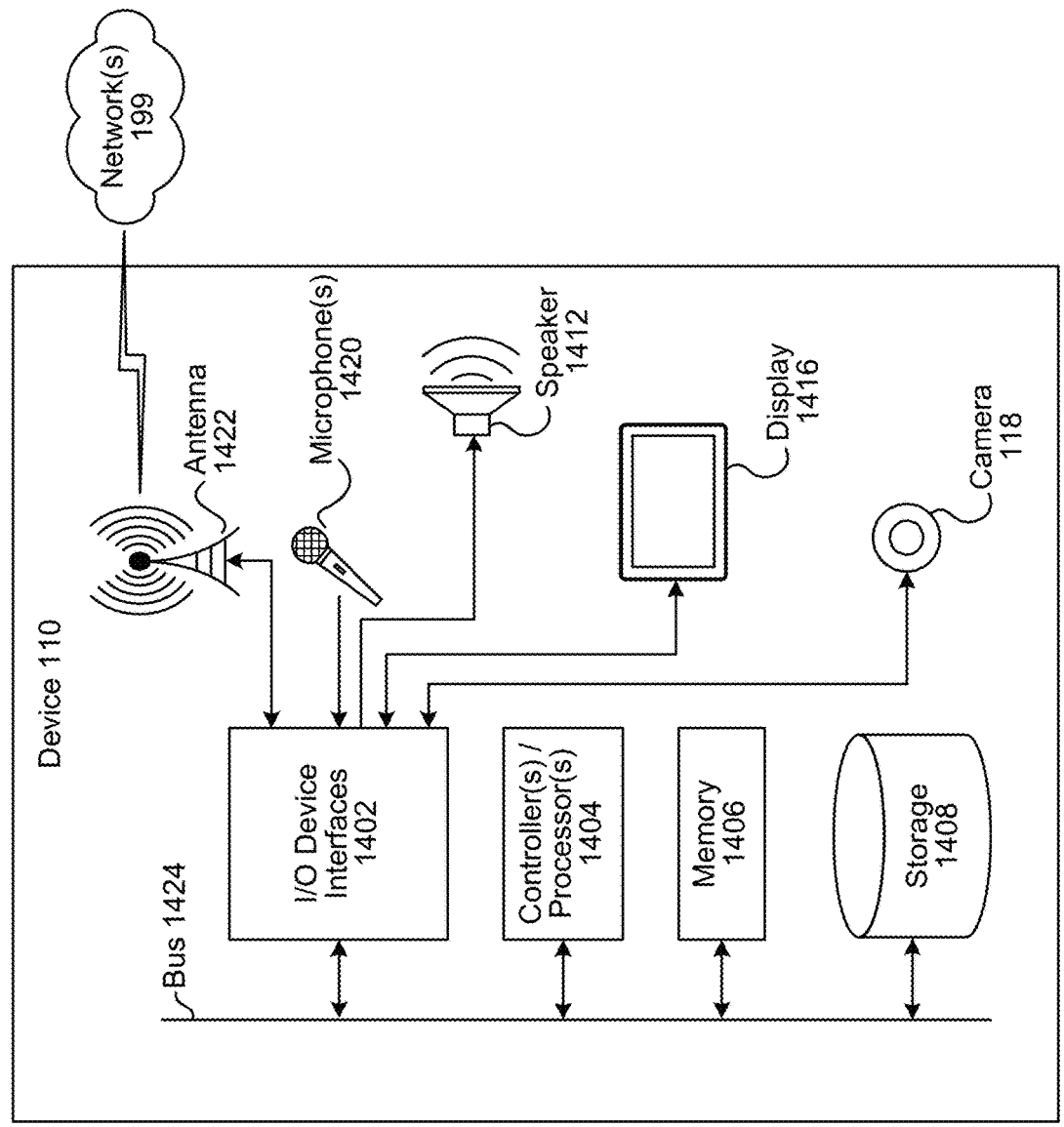
FIG. 14 is a block diagram conceptually illustrating example components of a device, according to embodiments of the present disclosure.

FIG. 14 is a block diagram conceptually illustrating a device 110 that may be used with the system. FIG. 15 is a block diagram conceptually illustrating example components of a remote device, such as the natural language command processing system 120, which may assist with ASR processing, NLU processing, etc., and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more natural language processing systems 120 for performing ASR processing, one or more natural language processing systems 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (1404/1504), which may each include a central processing unit (CPU) for processing data and computer-readable instructions, and a memory (1406/1506) for storing data and instructions of the respective device. The memories (1406/1506) may individually include volatile random access memory (RAM), non-volatile read only memory (ROM), non-volatile magnetoresistive memory (MRAM), and/or other types of memory. Each device (110/120/125) may also include a data storage component (1408/1508) for storing data and controller/processor-executable instructions. Each data storage component (1408/1508) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1402/1502).

Computer instructions for operating each device (110/120/125) and its various components may be executed by the respective device's controller(s)/processor(s) (1404/1504), using the memory (1406/1506) as temporary "working" storage at runtime. A device's computer instructions may be stored in a non-transitory manner in non-volatile memory (1406/1506), storage (1408/1508), or an external device(s). Alternatively, some or all of the executable instructions may be embedded in hardware or firmware on the respective device in addition to or instead of software.

Each device (110/120/125) includes input/output device interfaces (1402/1502). A variety of components may be connected through the input/output device interfaces (1402/1502), as will be discussed further below. Additionally, each device (110/120/125) may include an address/data bus (1424/1524) for conveying data among components of the respective device. Each component within a device (110/120/125) may also be directly connected to other components in addition to (or instead of) being connected to other components across the bus (1424/1524).

Referring to FIG. 14, the device 110 may include input/output device interfaces 1402 that connect to a variety of components such as an audio output component such as a speaker 1412, a wired headset or a wireless headset (not illustrated), or other component capable of outputting audio. The device 110 may also include an audio capture component. The audio capture component may be, for example, a microphone 1420 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1416 for displaying content. The device 110 may further include a camera 118.

Via antenna(s) 1422, the input/output device interfaces 1402 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1402/1502) may also include communication components that allow data to be exchanged between devices such as different physical servers in a collection of servers or other components.

The components of the device(s) 110, the natural language command processing system 120, or a skill system 125 may include their own dedicated processors, memory, and/or storage. Alternatively, one or more of the components of the device(s) 110, the natural language command processing system 120, or a skill system 125 may utilize the I/O interfaces (1402/1502), processor(s) (1404/1504), memory (1406/1506), and/or storage (1408/1508) of the device(s) 110, natural language command processing system 120, or the skill system 125, respectively. Thus, the ASR component 1050 may have its own I/O interface(s), processor(s), memory, and/or storage; the NLU component 1060 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 120, and a skill system 125, as described herein, are illustrative, and may be located as a stand-alone device or may be included, in whole or in part, as a component of a larger device or system.

As illustrated in FIG. 16, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, etc. (e.g., a device such as a FireTV stick, Echo Auto or the like) may be connected to the network(s) 199 through a wireless service provider, over a Wi-Fi or cellular network connection, or the like. Other devices are included as network-connected support devices, such as the natural language command processing system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 1050, the NLU component 1060, etc. of the natural language command processing system 120.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    receiving first data representing an image captured by a camera of a device;
    processing the first data to determine feature data representing image features detected in the first data;
    determining a first portion of the feature data corresponding to a first region of the image that includes a representation of a first face;
    determining a second portion of the feature data corresponding to a second region of the image that includes a representation of a second face;
    determining a third portion of the feature data corresponding to a third region of the image that includes a representation of an object;
    determining first combined feature data using the feature data, the first portion of the feature data, the second portion of the feature data, and the third portion of the feature data;
    processing the first combined feature data determine first gaze direction probability data representing a first association between the second region and a first likelihood that the first face is gazing at the second face and a second association between the third region and a second probability that the first face is gazing at the object; and
    processing the feature data, the first portion of the feature data, the second portion of the feature data, the third portion of the feature data, and the first gaze direction probability data determine second data representing a first prediction that the first face is exhibiting a first gaze behavior with respect to the second face.

2. The computer-implemented method of claim 1, further comprising:
    determining second combined feature data using the feature data, the second portion of the feature data, the first portion of the feature data, and the third portion of the feature data;
    processing the second combined feature data to determine second gaze direction probability data representing a second likelihood that the second face is gazing at the first face; and
    processing the feature data, the first portion of the feature data, the second portion of the feature data, the third portion of the feature data, and the second gaze direction probability data to determine third data representing a second prediction that the second face is exhibiting a second gaze behavior with respect to the first face.

3. The computer-implemented method of claim 1, further comprising:
    processing the feature data using global average pooling to determine a first feature vector;
    processing the first portion of the feature data using global average pooling to determine a second feature vector;
    processing the second portion of the feature data and the first gaze direction probability data to determine first feature data;
    processing the first feature data using global average pooling to determine a third feature vector; and
    determining a combined feature vector using the first feature vector, the second feature vector, and the third feature vector, wherein determining the second data includes processing the combined feature vector using a long short-term memory network.

4. The computer-implemented method of claim 1, further comprising:
    determining second combined feature data using the feature data, the second portion of the feature data, and the first portion of the feature data;
    processing the second combined feature data to determine second gaze direction probability data, wherein the second gaze direction probability data represents a second likelihood that the second face is gazing at the first face;

processing the feature data, the second portion of the feature data, the first portion of the feature data, and the second gaze direction probability data to determine third data representing a second prediction that the second face is exhibiting a second gaze behavior with respect to the first face; and processing the second data and the third data to determine fourth data representing a prediction that the first face and the second face are exhibiting a pairwise gaze behavior.

5. A computer-implemented method comprising:
receiving first data representing a first image;
processing the first data to determine feature data representing image features detected in the first data;
determining a first portion of the feature data corresponding to a first region of the first image that includes a representation of a first face;
determining a second portion of the feature data corresponding to a second region of the first image that includes a representation of at least a first physical entity, wherein the at least the first physical entity includes one or more of an object or a second face;
determining a third portion of the feature data corresponding to a third region of the first image that includes a representation of a second physical entity; and
processing the feature data, the first portion of the feature data, the second portion of the feature data, and the third portion of the feature data to generate second data representing a first association between the second region and a first probability that the first face is gazing at the first physical entity and a second association between the third region and a second probability that the first face is gazing at the second physical entity.

6. The computer-implemented method of claim 5, further comprising:
concatenating the feature data, the first portion of the feature data, and the second portion of the feature data to determine combined feature data; and
processing the combined feature data using a neural network encoder-decoder to determine the second data.

7. The computer-implemented method of claim 5, further comprising:
processing the feature data to determine a first feature vector;
processing the first portion of the feature data to determine a second feature vector;
processing the second portion of the feature data and the second data to determine a third feature vector;
concatenating the first feature vector, the second feature vector, and the third feature vector to determine a first combined feature vector; and
processing the first combined feature vector to determine first output data representing a prediction that the first face is exhibiting a first gaze behavior with respect to the first physical entity.

8. The computer-implemented method of claim 7, further comprising:
receiving third data representing a second image;
processing the third data to determine fourth data representing a third probability that the first face is gazing at the first physical entity;
determining, using the fourth data, a second combined feature vector corresponding to the third data; and
processing the first combined feature vector and the second combined feature vector to determine second output data representing a prediction that the first face is exhibiting an event-level gaze behavior with respect to the first physical entity.

9. The computer-implemented method of claim 8, wherein determining the second output data includes:
processing at least the first combined feature vector and the second combined feature vector to generate successive inputs to a long short-term memory neural network to determine the second output data.

10. The computer-implemented method of claim 5, wherein the first physical entity is the second face, the method further comprising:
processing the feature data, the second portion of the feature data and the first portion of the feature data to generate third data representing a second probability the second face is gazing at the first face; and
processing the second data and the third data to determine fourth data representing a prediction that the first face and the second face are exhibiting a pairwise gaze behavior.

11. The computer-implemented method of claim 5, further comprising:
processing a natural language input to determine a natural language understanding (NLU) hypothesis;
determining a first entity potentially corresponding to a slot of the NLU hypothesis; and
performing, based on the second data, an action with respect to the first entity.

12. The computer-implemented method of claim 5, wherein the second data indicates an association between the first probability and the second region.

13. A system, comprising:
at least one processor; and
at least one memory comprising instructions that, when executed by the at least one processor, cause the system to:
receive first data representing a first image;
process the first data to determine feature data representing image features detected in the first data;
determine a first portion of the feature data corresponding to a first region of the first image that includes a representation of a first face;
determine a second portion of the feature data corresponding to a second region of the first image that includes a representation of at least a first physical entity, wherein the at least the first physical entity includes one or more of an object or a second face;
determine a third portion of the feature data corresponding to a third region of the first image that includes a representation of a second physical entity; and
process the feature data, the first portion of the feature data, the second portion of the feature data, and the third portion of the feature data to generate second data representing a first association between the second region and a first probability that the first face is gazing at the first physical entity and a second association between the third region and a second probability that the first face is gazing at the second physical entity.

14. The system of claim 13, wherein the second data indicates an association between the first probability and the second region.

15. The system of claim 14, wherein the at least one memory further comprises instructions that, when executed by the at least one processor, further cause the system to:

concatenate the feature data, the first portion of the feature data, and the second portion of the feature data to determine combined feature data; and process the combined feature data using a neural network encoder-decoder to determine the second data.

16. The system of claim 14, wherein the at least one memory further comprises instructions that, when executed by the at least one processor, further cause the system to:

process the feature data to determine a first feature vector;

process the first portion of the feature data to determine a second feature vector;

process the second portion of the feature data and the second data to determine a third feature vector;

concatenate the first feature vector, the second feature vector, and the third feature vector to determine a first combined feature vector; and process the first combined feature vector to determine first output data representing a prediction that the first face is exhibiting a first gaze behavior with respect to the first physical entity.

17. The system of claim 16, wherein the at least one memory further comprises instructions that, when executed by the at least one processor, further cause the system to:

receive third data representing a second image;

process the third data to determine fourth data representing a third probability that the first face is gazing at the first physical entity;

determine, using the fourth data, a second combined feature vector corresponding to the third data; and process the first combined feature vector and the second combined feature vector to determine second output data representing a prediction that the first face is exhibiting an event-level gaze behavior with respect to the first physical entity.

18. The system of claim 17, wherein the at least one memory further comprises instructions that, when executed by the at least one processor, further cause the system to:

process at least the first combined feature vector and the second combined feature vector to generate successive inputs to a long short-term memory neural network to determine the second output data.

19. The system of claim 14, wherein the first physical entity is the second face, and the at least one memory further comprises instructions that, when executed by the at least one processor, further cause the system to:

process the feature data, the second portion of the feature data, and the first portion of the feature data to generate third data representing a second probability the second face is gazing at the first face; and process the second data and the third data to determine fourth data representing a prediction that the first face and the second face are exhibiting a pairwise gaze behavior.

20. The system of claim 14, wherein the at least one memory further comprises instructions that, when executed by the at least one processor, further cause the system to:

process a natural language input to determine a natural language understanding (NLU) hypothesis;

determine a first entity potentially corresponding to a slot of the NLU hypothesis; and perform, based on the second data, an action with respect to the first entity.

21. The computer-implemented method of claim 5 further comprising:

processing the feature data, the first portion of the feature data, the second portion of the feature data, the third portion of the feature data, and the second data determine third data representing a first prediction that the first face is exhibiting a first gaze behavior with respect to the first physical entity.

22. The system of claim 14, wherein the at least one memory further comprises instructions that, when executed by the at least one processor, further cause the system to:

process the feature data, the first portion of the feature data, the second portion of the feature data, the third portion of the feature data, and the second data determine third data representing a first prediction that the first face is exhibiting a first gaze behavior with respect to the first physical entity.

* * * * *